(12) United States Patent
McNelley et al.

(10) Patent No.: US 8,199,185 B2
(45) Date of Patent: *Jun. 12, 2012

(54) REFLECTED CAMERA IMAGE EYE CONTACT TERMINAL

(75) Inventors: Steve H. McNelley, San Juan Capistrano, CA (US); Jeffrey Machtig, Lake Forest, CA (US)

(73) Assignee: Videotronic Systems, San Juan Capistrano, CA (US)

( * ) Notice: Subject to any disclaimer, the term of this patent is extended or adjusted under 35 U.S.C. 154(b) by 1323 days.

This patent is subject to a terminal disclaimer.

(21) Appl. No.: 11/377,139

(22) Filed: Mar. 16, 2006

(65) Prior Publication Data

US 2006/0181607 A1 Aug. 17, 2006

Related U.S. Application Data

(63) Continuation-in-part of application No. 10/785,820, filed on Feb. 24, 2004, now Pat. No. 7,209,160, which is a continuation-in-part of application No. 10/033,655, filed on Dec. 27, 2001, now Pat. No. 6,710,797, which is a continuation-in-part of application No. 09/878,813, filed on Jun. 11, 2001, now Pat. No. 6,481,851, which is a continuation-in-part of application No. 09/777,145, filed on Feb. 5, 2001, now abandoned, which is a continuation-in-part of application No. 09/262,974, filed on May 17, 1999, now Pat. No. 6,243,130, which is a continuation-in-part of application No. 09/108,476, filed on Jul. 1, 1998, now Pat. No. 5,953,052, which is a continuation-in-part of application No. 08/530,880, filed on Sep. 20, 1995, now Pat. No. 5,777,665.

(51) Int. Cl.
*H04N 7/14* (2006.01)

(52) U.S. Cl. .................................................. 348/14.16
(58) Field of Classification Search ................ 348/14.16, 348/14.01, 14.08, 14.09
See application file for complete search history.

(56) References Cited

U.S. PATENT DOCUMENTS

| 3,755,623 A | 8/1973 | Cassagne |
| 4,400,725 A | 8/1983 | Tanigaki |

(Continued)

FOREIGN PATENT DOCUMENTS

DE 3625646 A1 2/1988

(Continued)

*Primary Examiner* — Stella Woo
(74) *Attorney, Agent, or Firm* — Venable LLP; Stefan J. Kirchanski

(57) ABSTRACT

The present invention enables eye contact between conferees during a teleconference using a terminal equipped with a beamsplitter for reflecting an image of a conferee. In one embodiment the image of the conferee appears to be in a backdrop. The display is positioned behind the viewing side of the beam-splitter so that the conferee views the display through the beamsplitter. The invention can be configured to create the appearance that a life-size teleconference image of a remote conferee appears in the same room as the local conferee apparently sitting on the other side of the desk or table—creating the experience of telepresence with eye contact. Additional embodiments include adaptable features of the present invention which enable it to be configured into many specific types of eye contact display products. The invention further teaches the design of a telepresence network, linking numerous terminals sharing a commonality in configuration. The invention also includes many additional versatility embodiments for desktop and group videoconferencing, as well as other videoconferencing applications.

5 Claims, 41 Drawing Sheets

U.S. PATENT DOCUMENTS

| | | | |
|---|---|---|---|
| 4,414,609 A | 11/1983 | Shemitz | |
| 4,598,973 A | 7/1986 | Greenleaf | |
| 4,653,875 A | 3/1987 | Hines | |
| 4,663,562 A | 5/1987 | Miller et al. | |
| 4,738,522 A | 4/1988 | Lunde et al. | |
| 4,805,895 A | 2/1989 | Rogers | |
| 4,821,307 A | 4/1989 | Flint, III | |
| 4,928,301 A | 5/1990 | Smoot | |
| 5,104,210 A | 4/1992 | Tokas | |
| 5,117,285 A | 5/1992 | Nelson et al. | |
| 5,159,445 A | 10/1992 | Gitlin et al. | |
| 5,170,427 A | 12/1992 | Guichard et al. | |
| 5,194,955 A | 3/1993 | Yoneta et al. | |
| 5,243,413 A | 9/1993 | Gitlin et al. | |
| 5,278,681 A | 1/1994 | Gitlin et al. | |
| 5,317,405 A | 5/1994 | Kuriki et al. | |
| 5,422,683 A | 6/1995 | Tanigaki | |
| 5,438,357 A | 8/1995 | McNelley | |
| 5,532,736 A | 7/1996 | Kuriki et al. | |
| 5,573,325 A | 11/1996 | Lekowski | |
| 5,639,151 A | 6/1997 | McNelley et al. | |
| 5,774,109 A | 6/1998 | Winksy et al. | |
| 5,777,665 A | 7/1998 | McNelley et al. | |
| 5,782,547 A | 7/1998 | Machtig et al. | |
| 5,890,787 A | 4/1999 | McNelley et al. | |
| 5,923,469 A | 7/1999 | Machtig et al. | |
| 5,953,052 A | 9/1999 | McNelley et al. | |
| 6,042,235 A | 3/2000 | Machtig et al. | |
| 6,104,424 A | 8/2000 | McNelley | |
| 6,243,130 B1 | 6/2001 | McNelley et al. | |
| 6,257,727 B1 | 7/2001 | Melville | |
| 6,290,359 B1 | 9/2001 | Shriver | |
| 6,554,433 B1 | 4/2003 | Holler | |
| 6,710,797 B1 * | 3/2004 | McNelley et al. | 348/14.16 |
| 6,853,398 B2 * | 2/2005 | Malzbender et al. | 348/14.16 |
| 6,882,358 B1 | 4/2005 | Schuster et al. | |
| 7,209,160 B2 * | 4/2007 | McNelley et al. | 348/14.16 |
| 2001/0013891 A1 | 8/2001 | Hamilton | |
| 2003/0174292 A1 | 9/2003 | White | |
| 2005/0237382 A1 * | 10/2005 | White | 348/14.16 |

FOREIGN PATENT DOCUMENTS

| | | |
|---|---|---|
| JP | 63228890 A | 9/1988 |
| WO | WO-98/19458 A1 | 5/1998 |

* cited by examiner

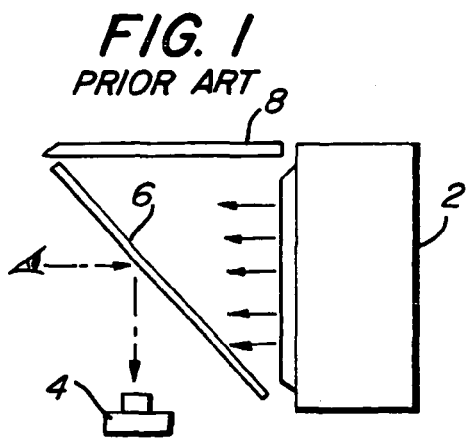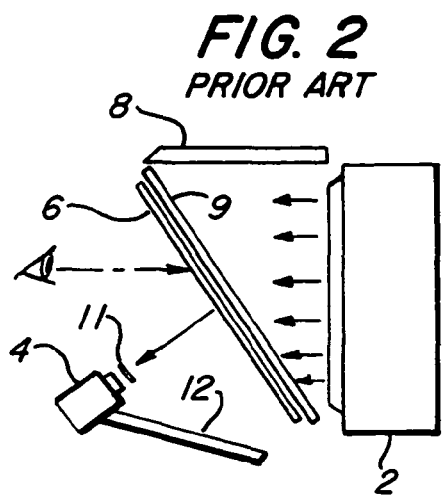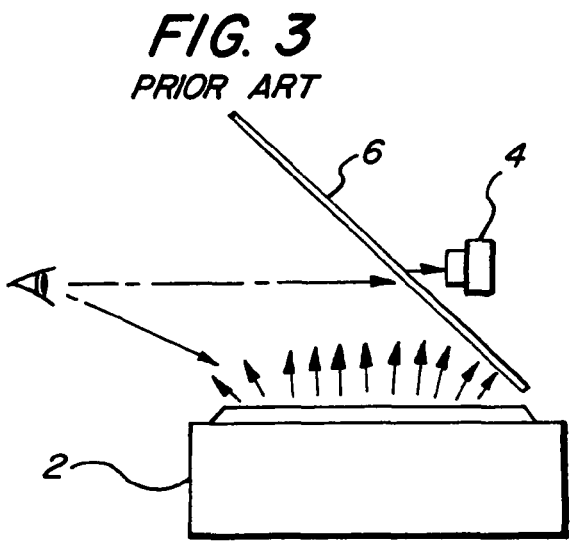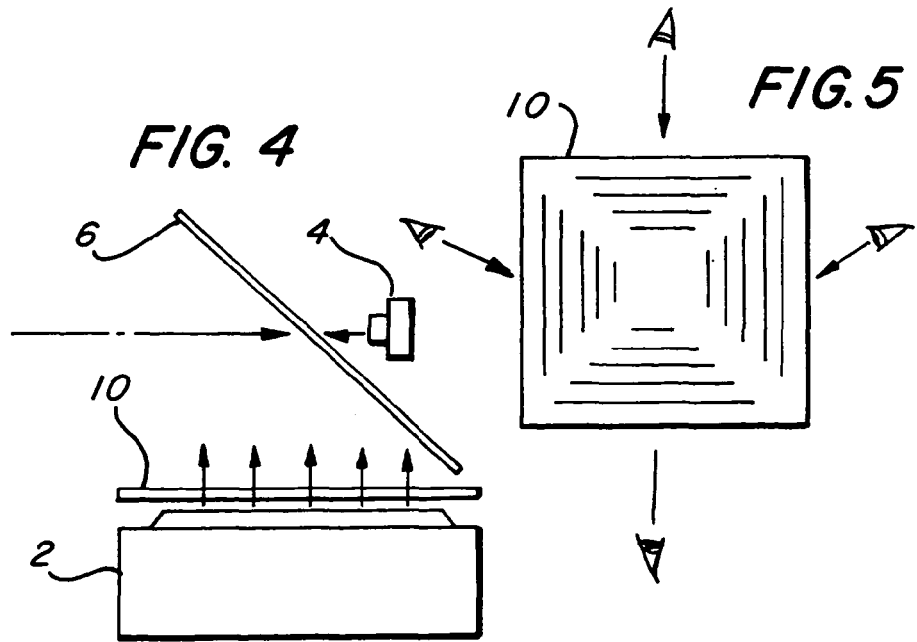

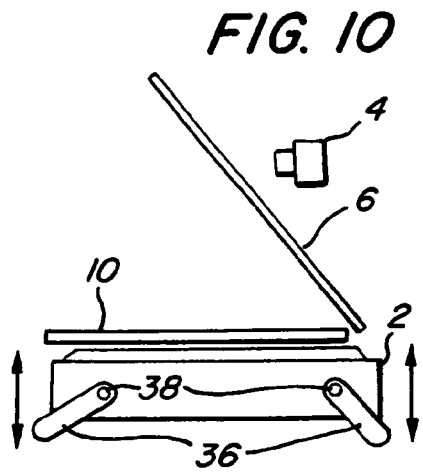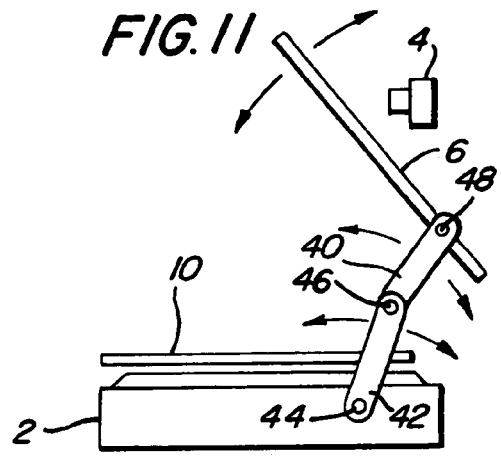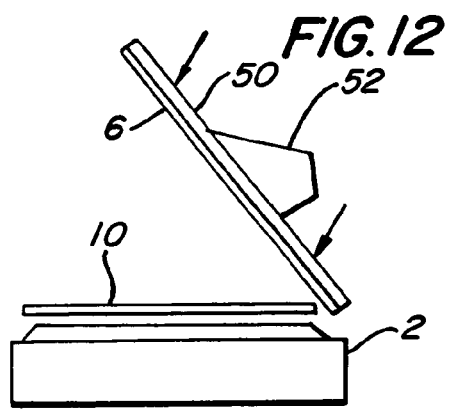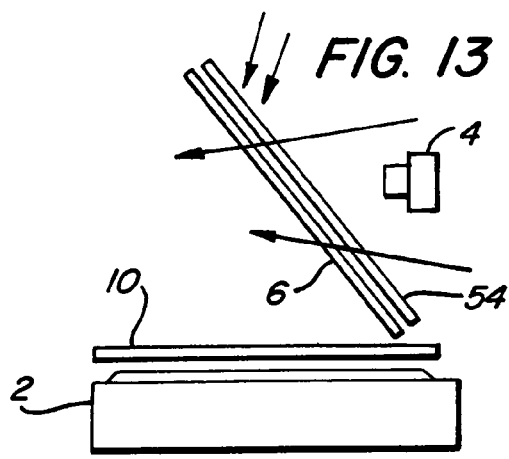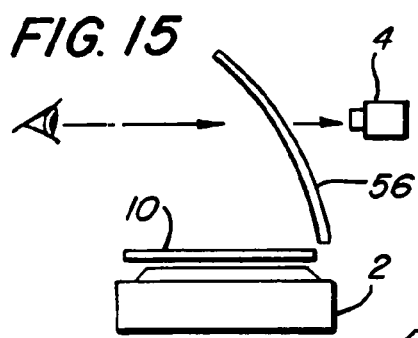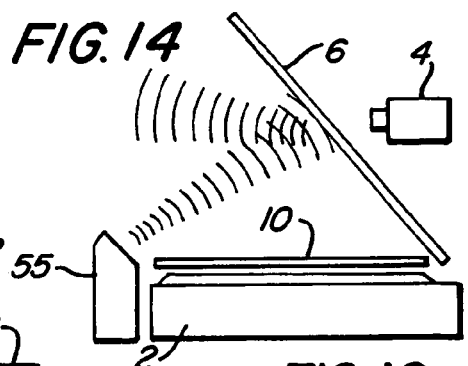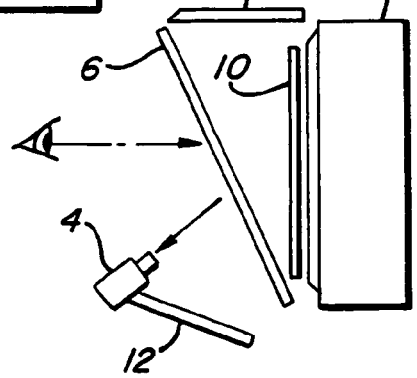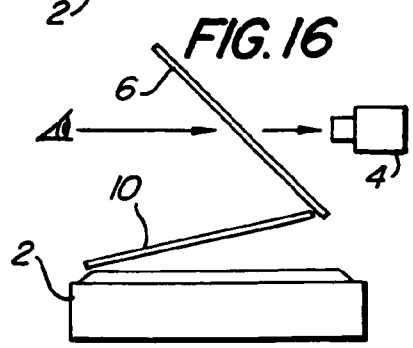

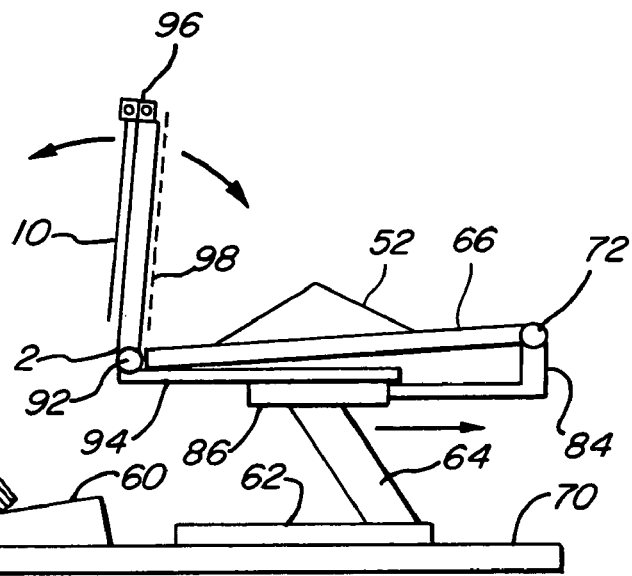
FIG. 22
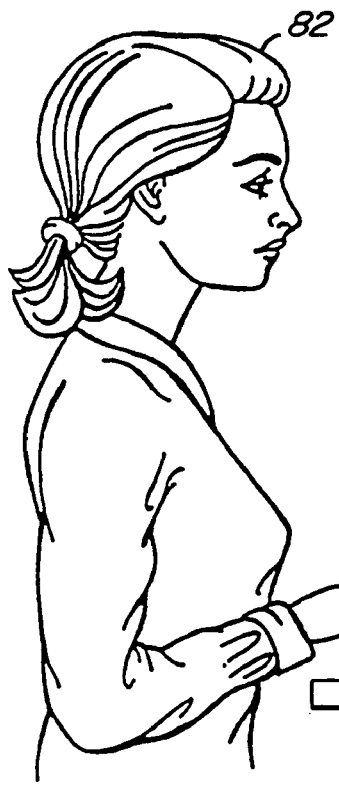
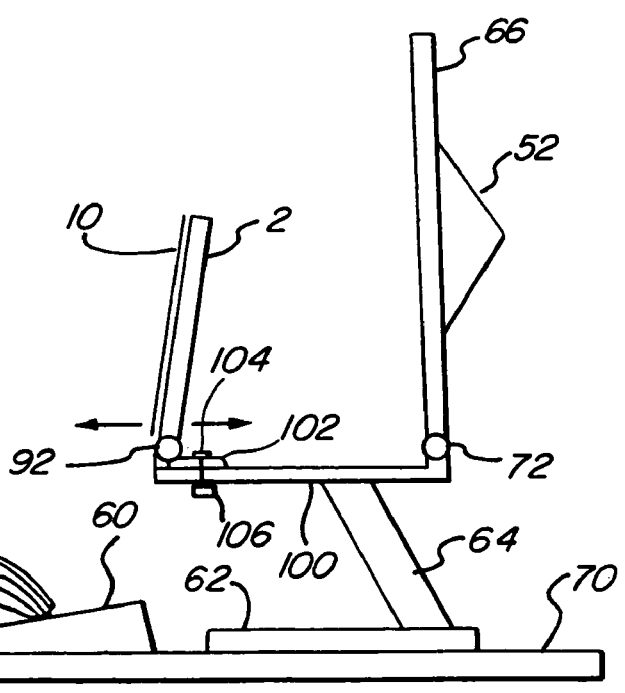
FIG. 23

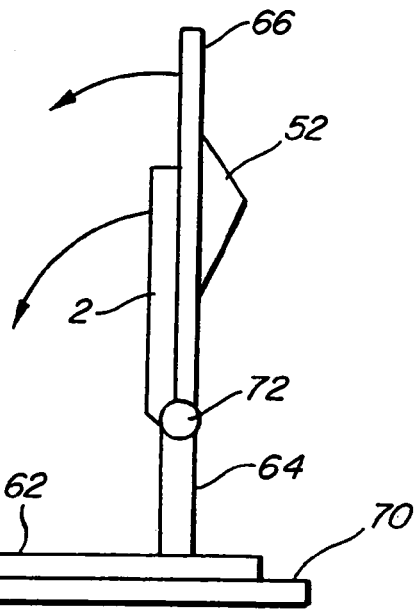
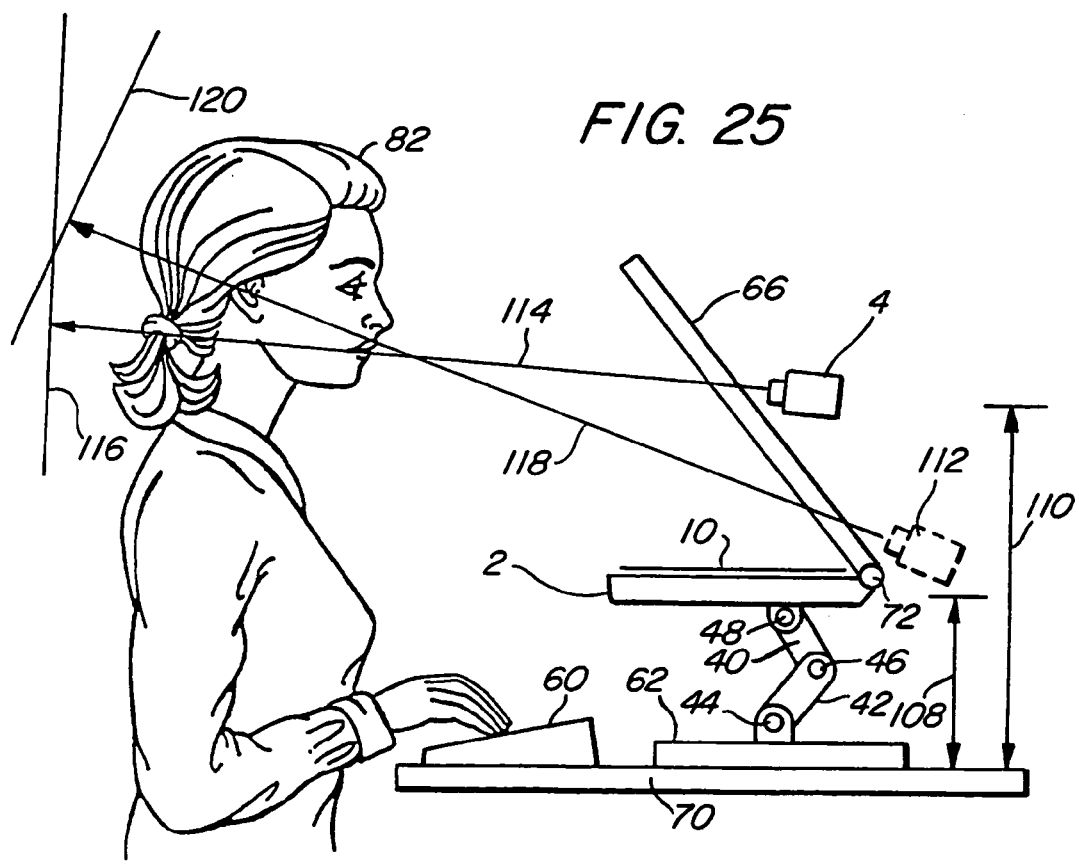

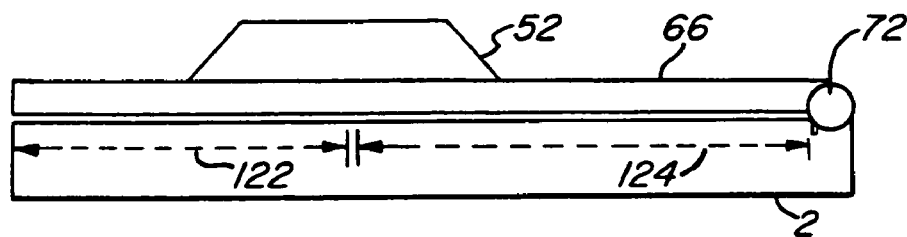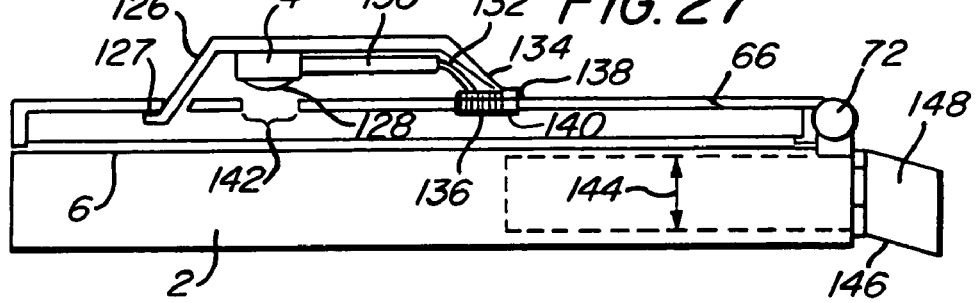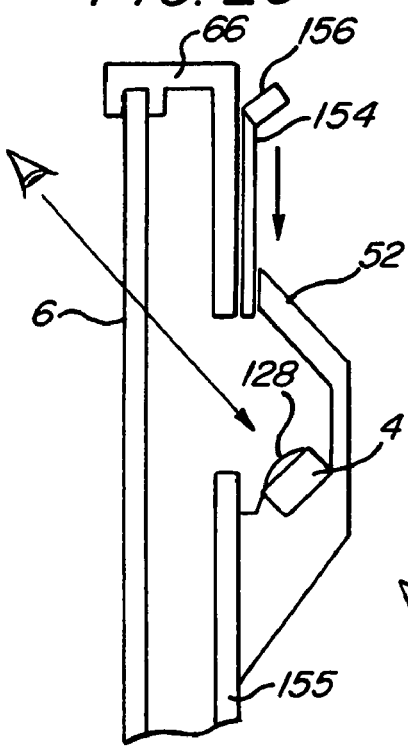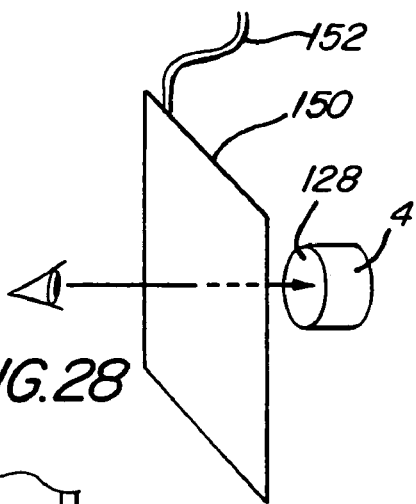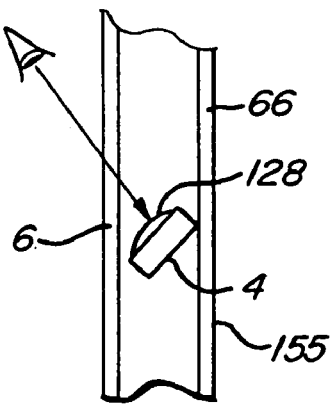

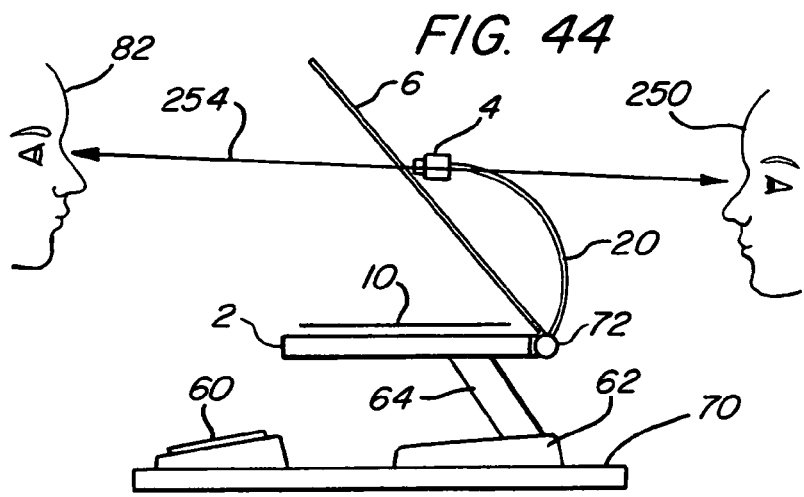
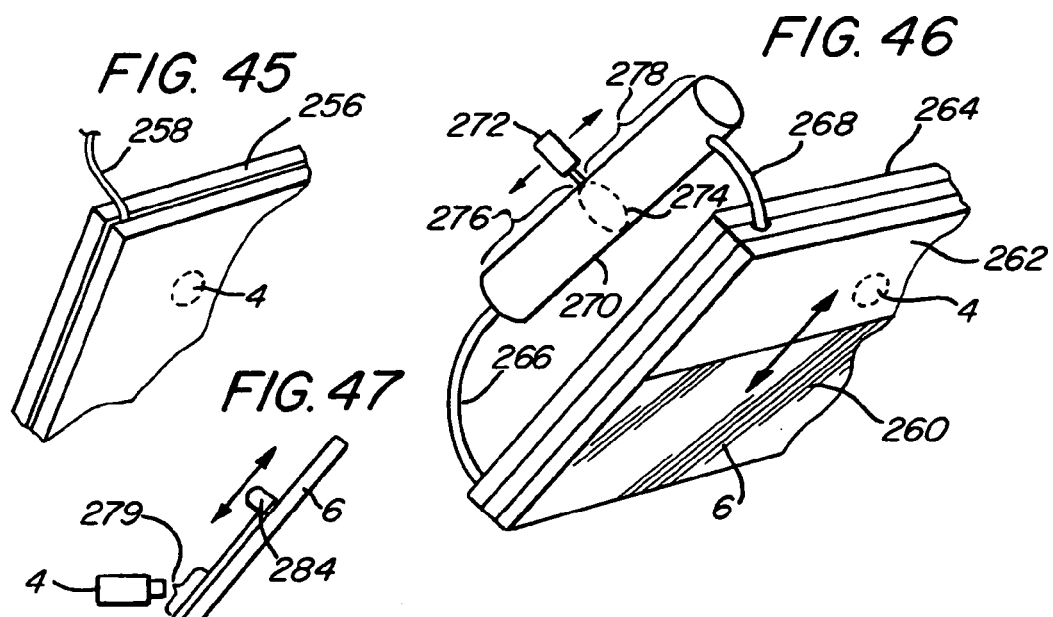
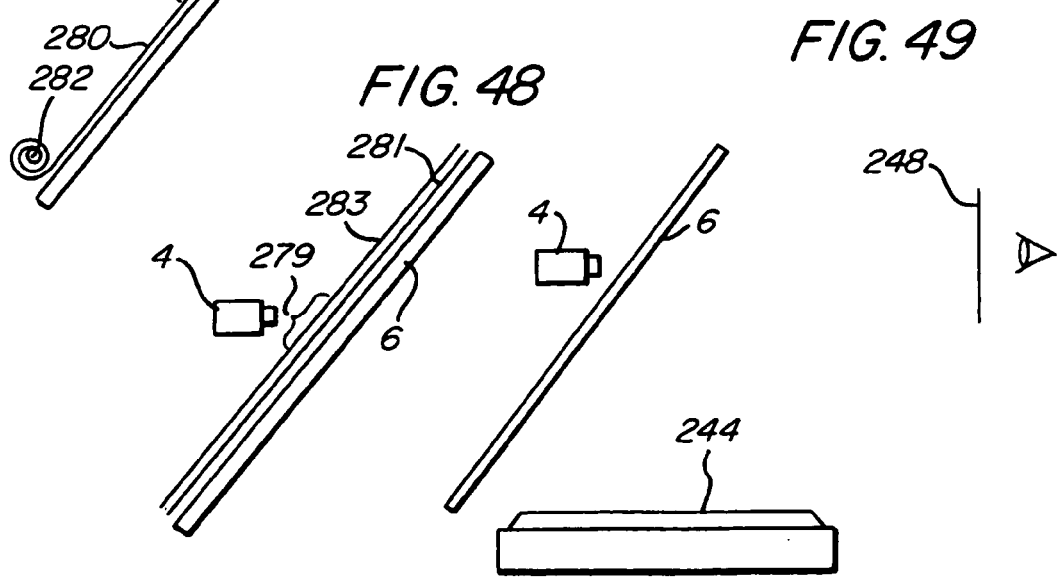

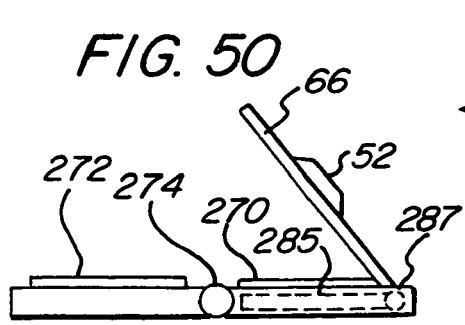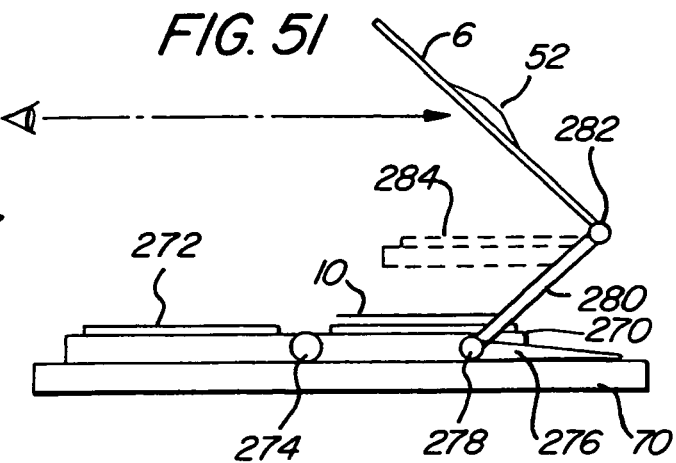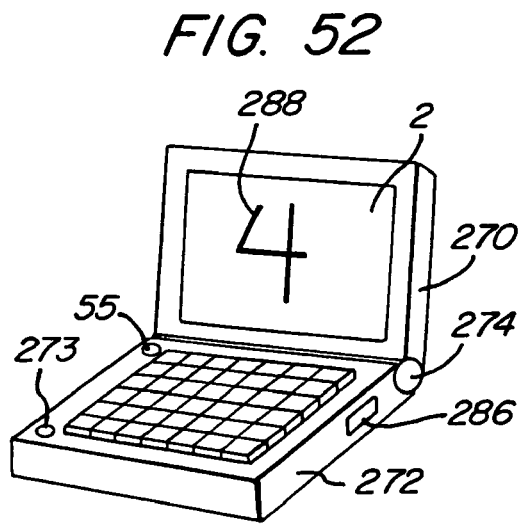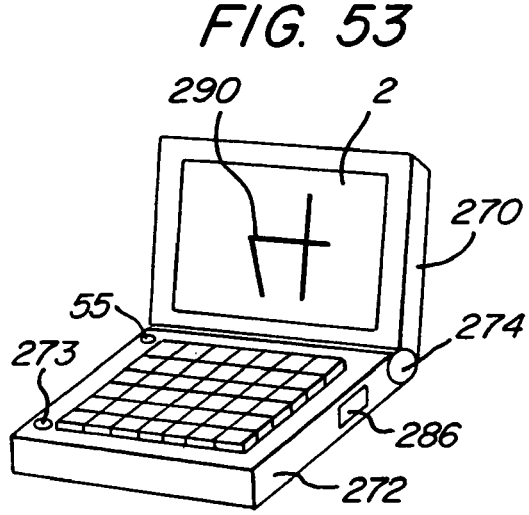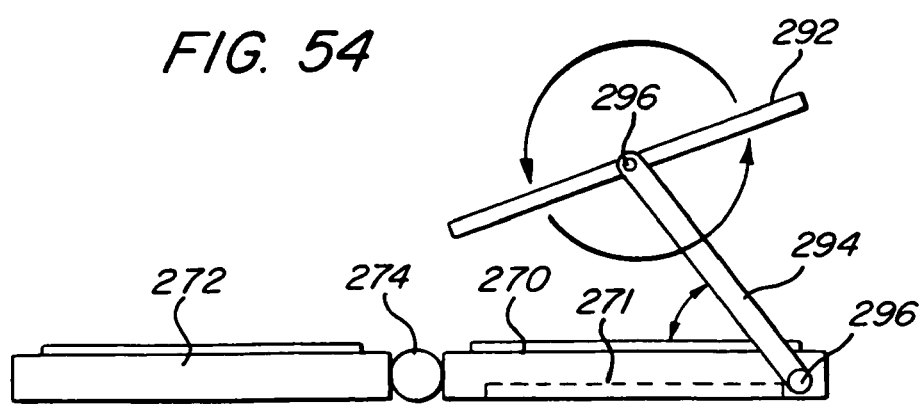

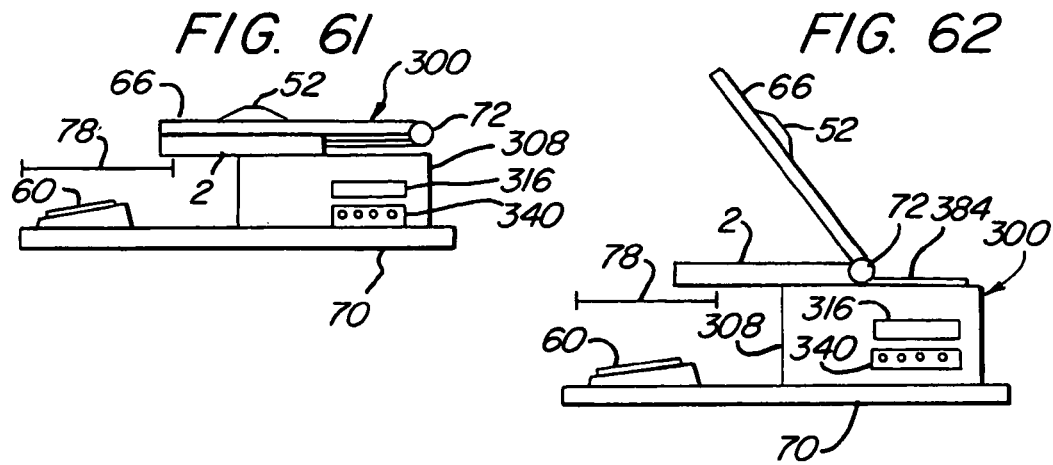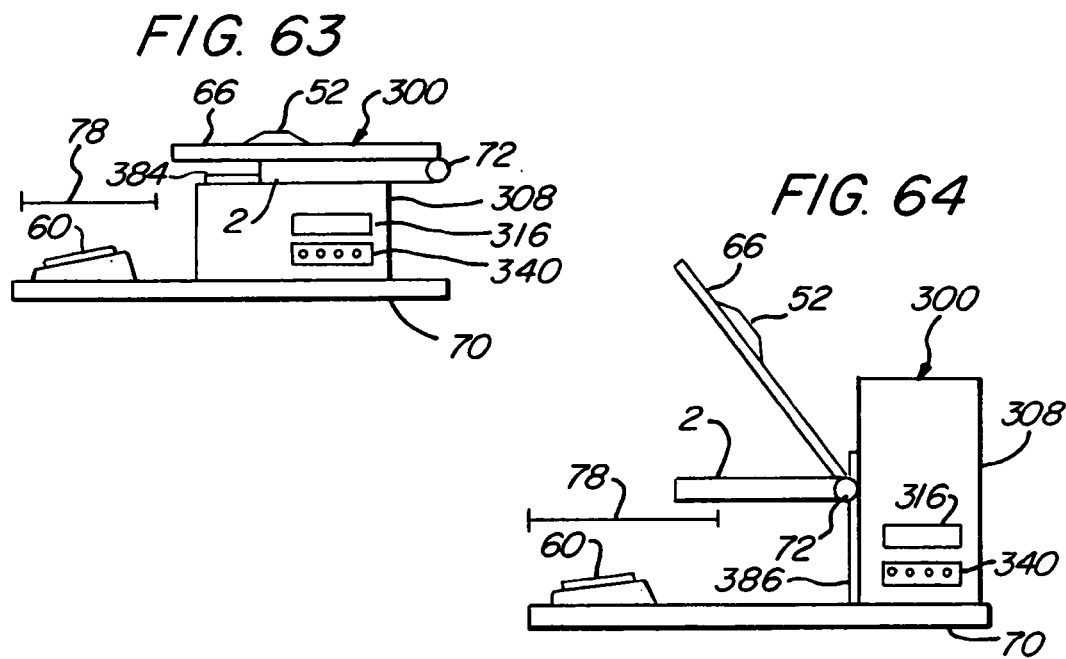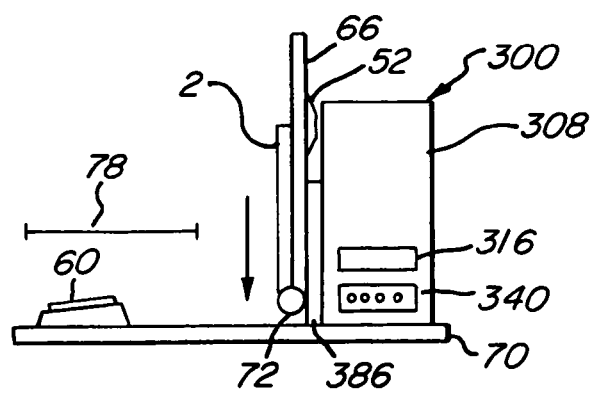

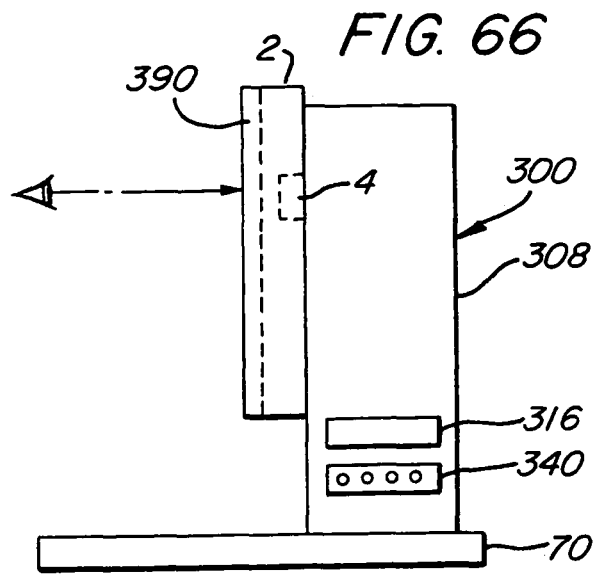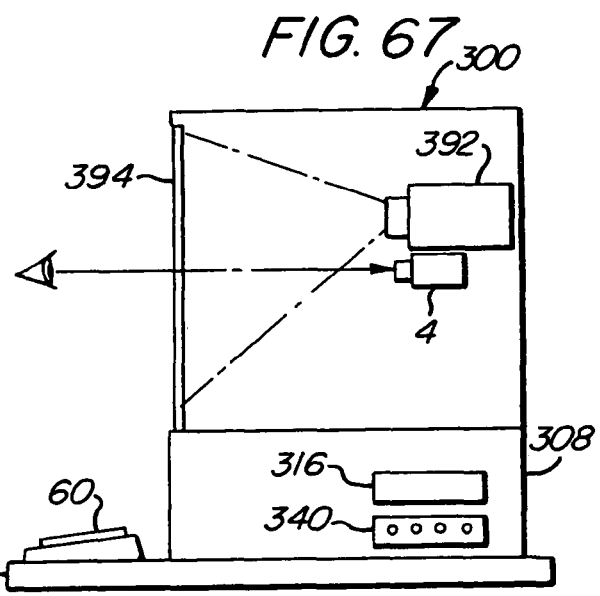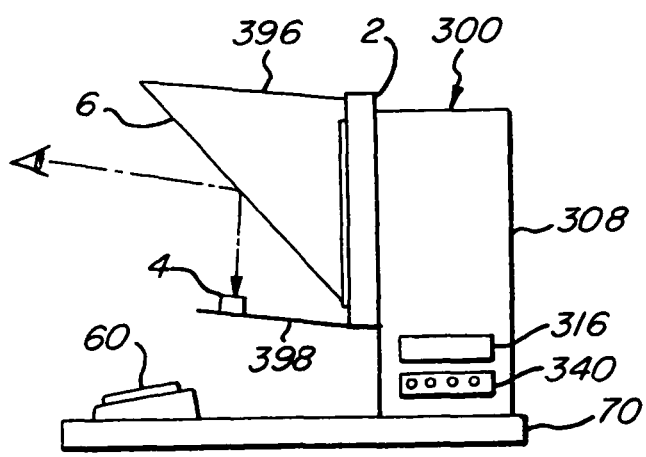

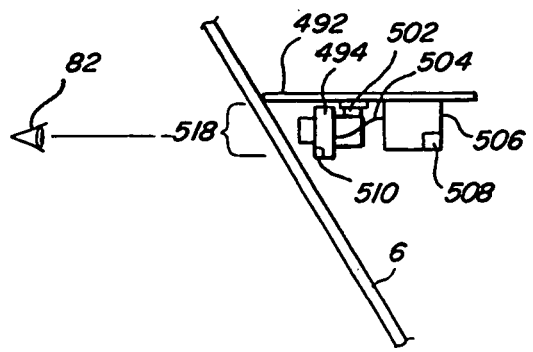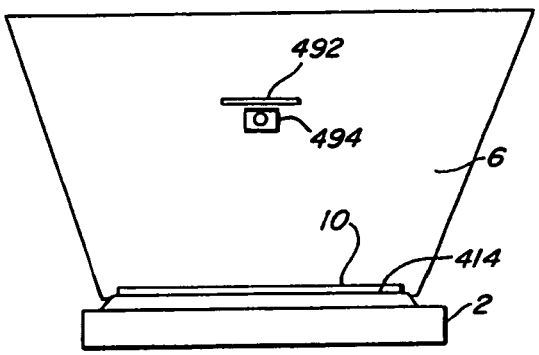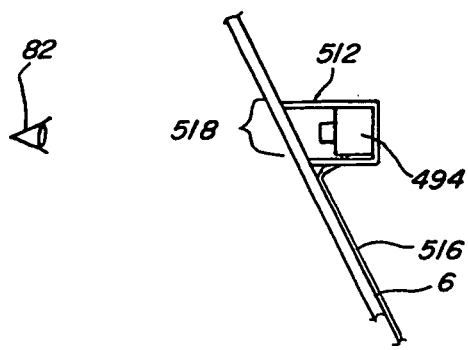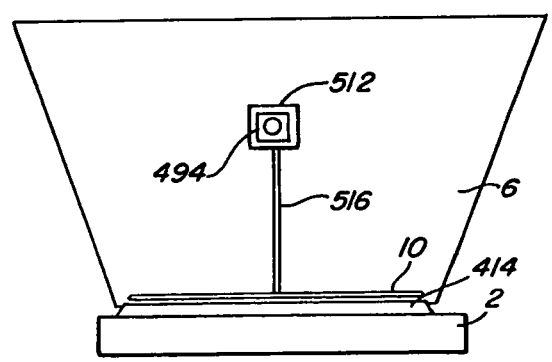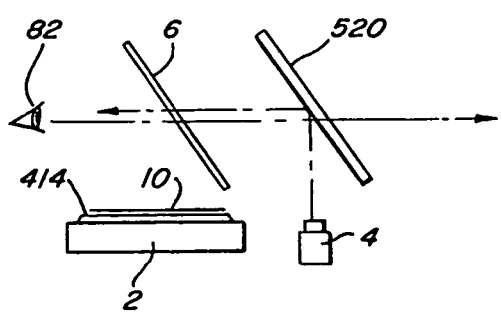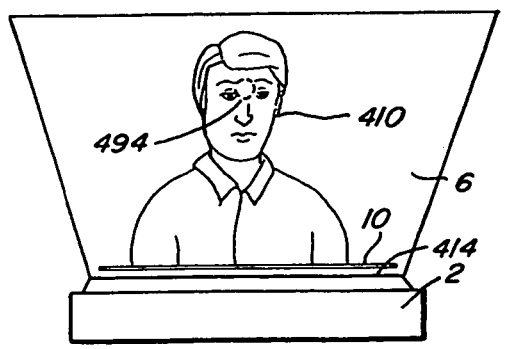

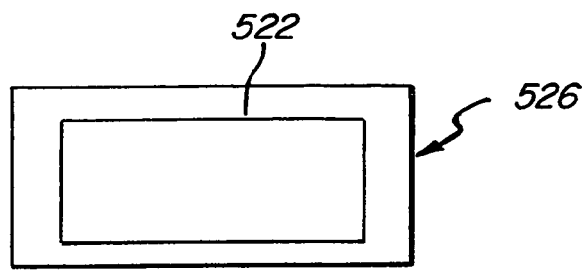
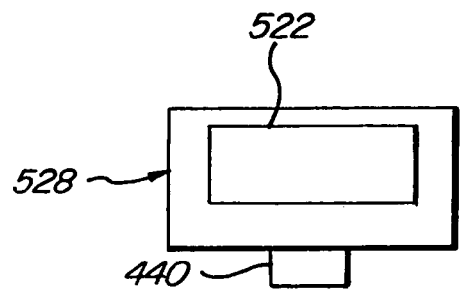
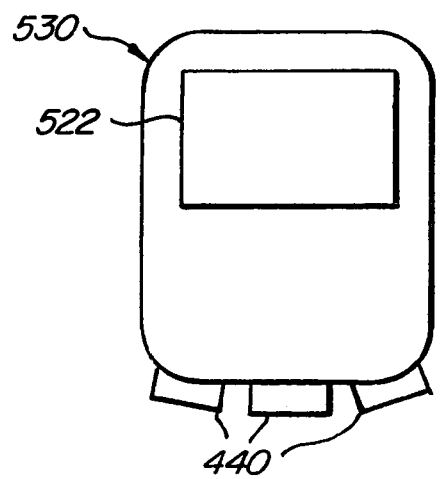
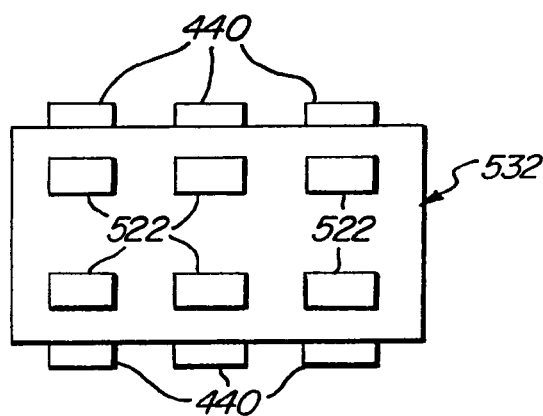
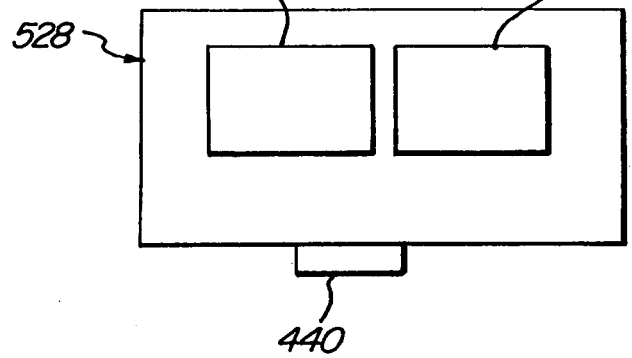
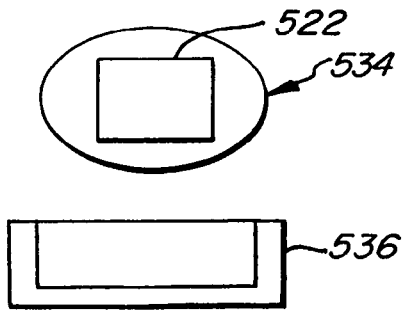

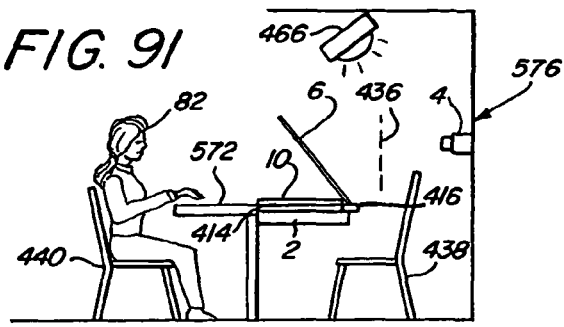
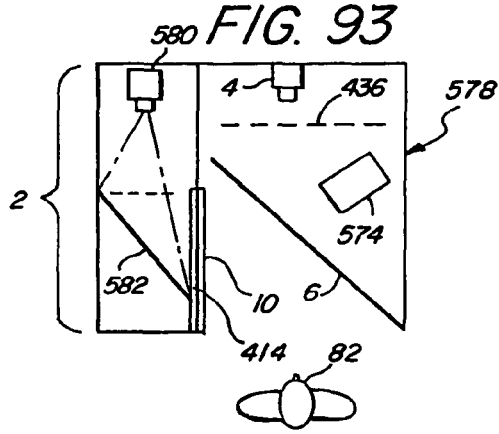
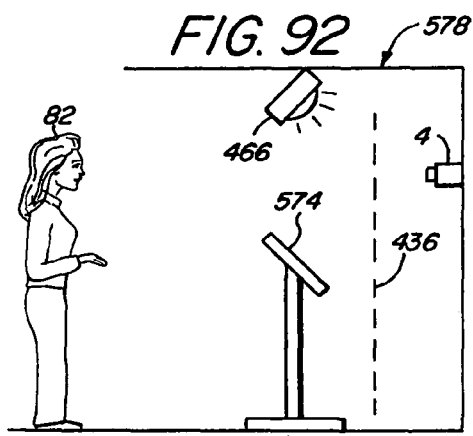
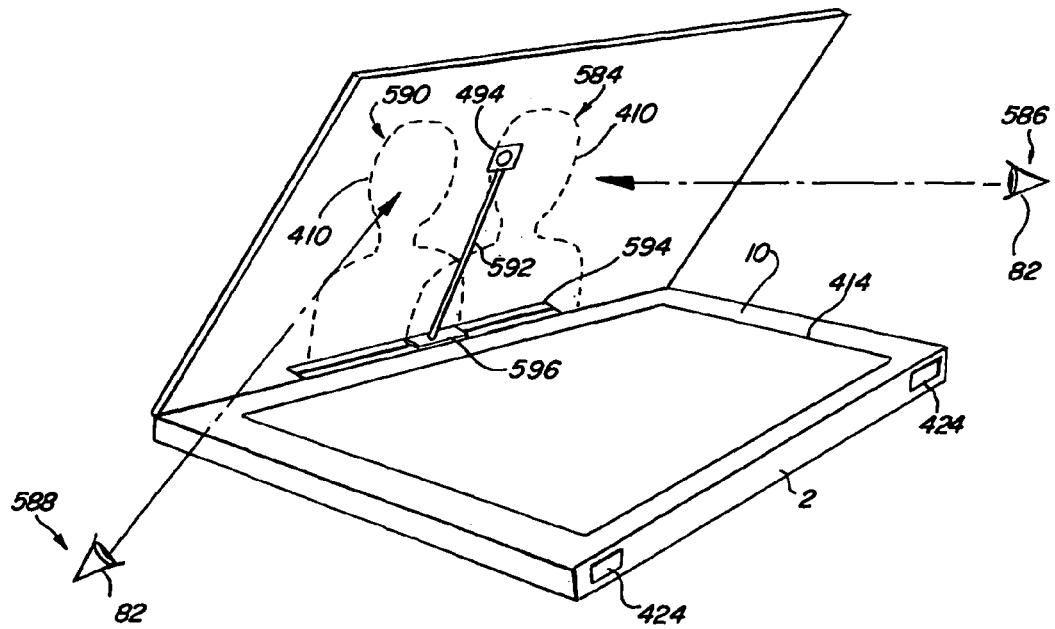
FIG. 91
FIG. 93
FIG. 92
FIG. 94

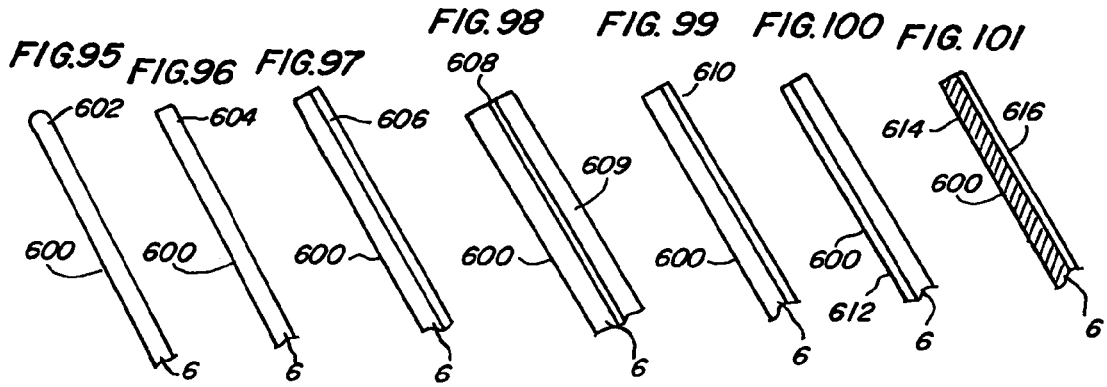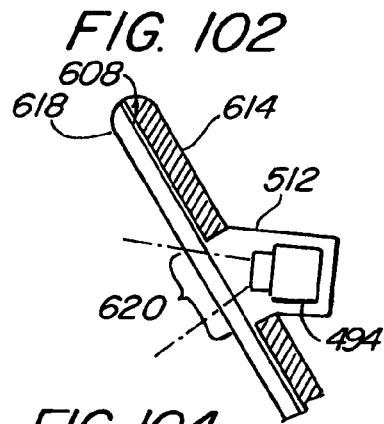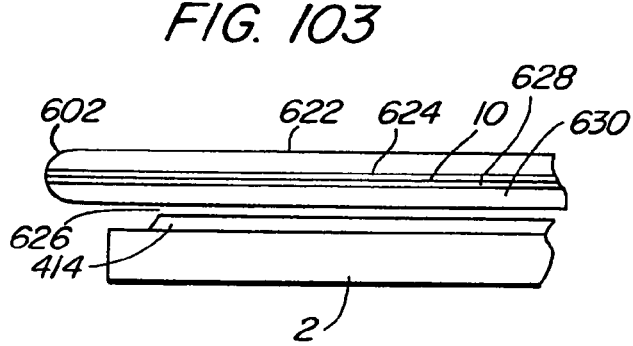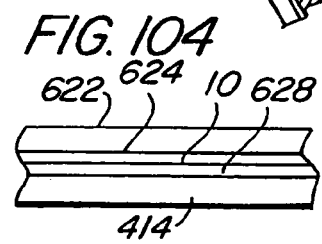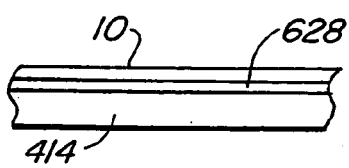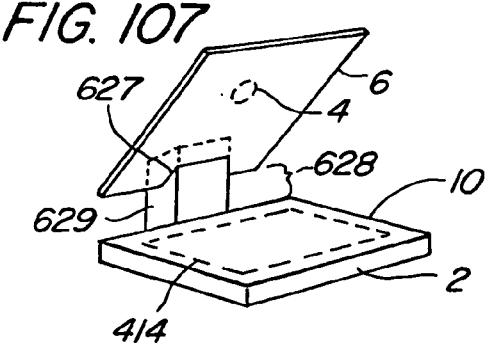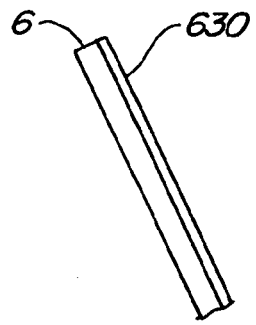

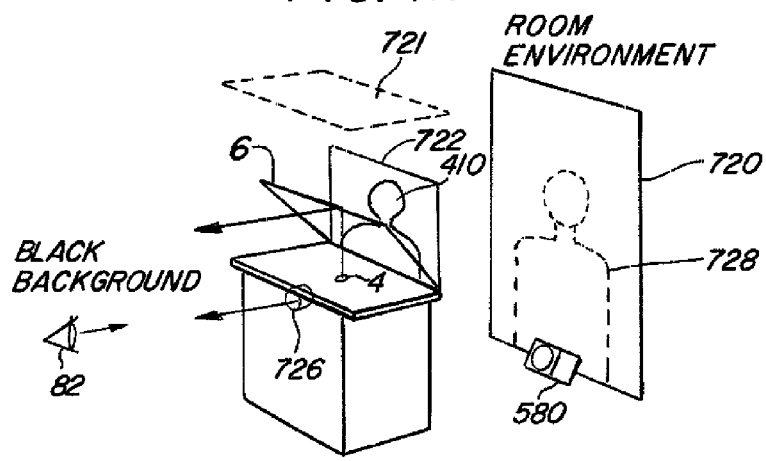
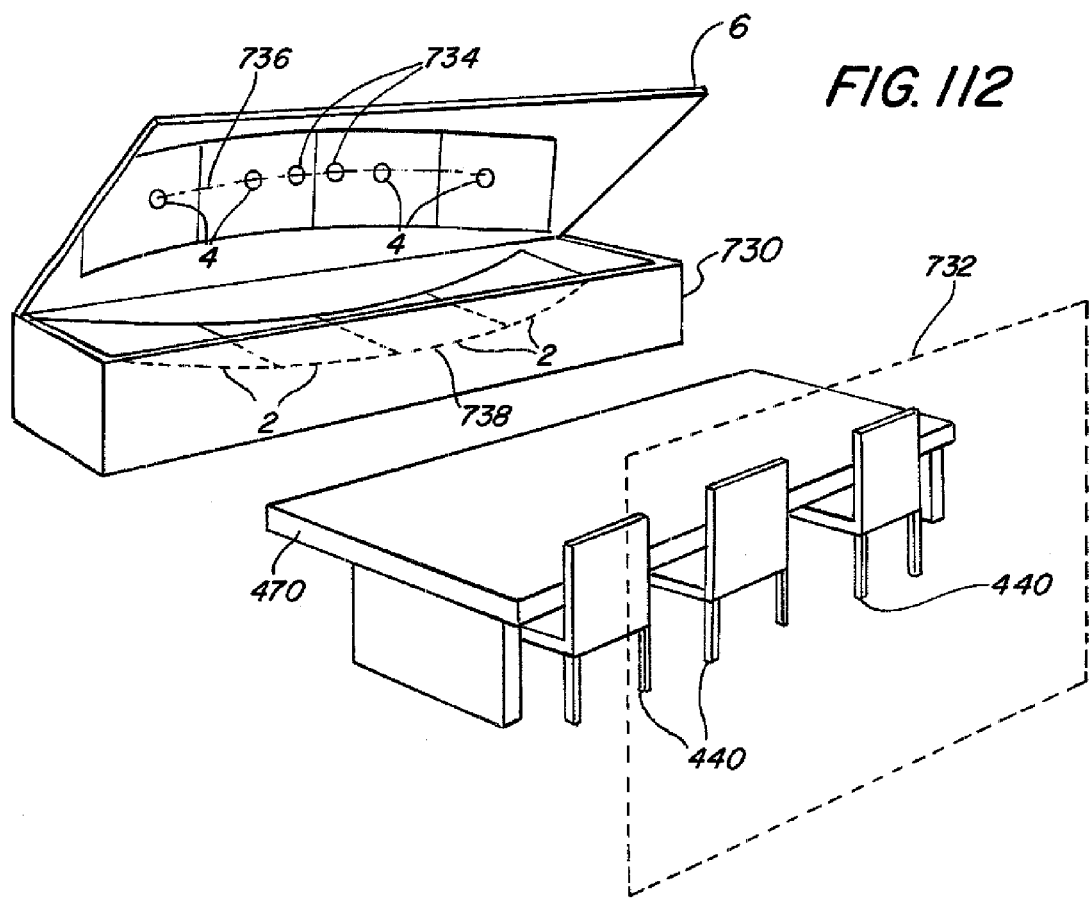

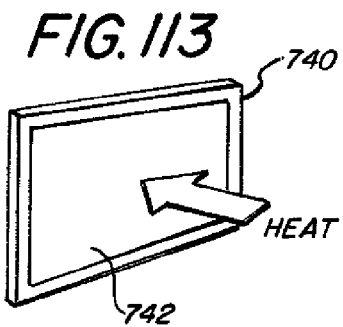
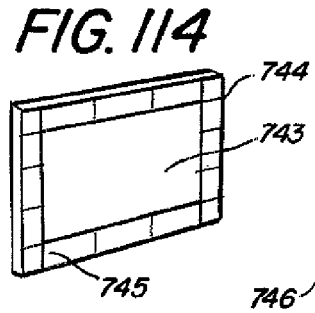
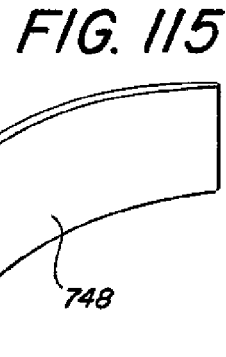
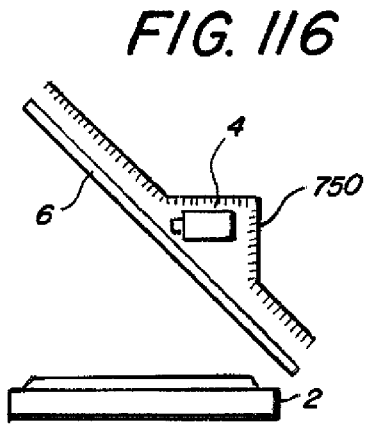
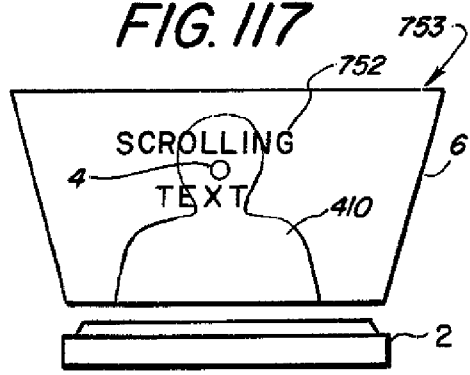
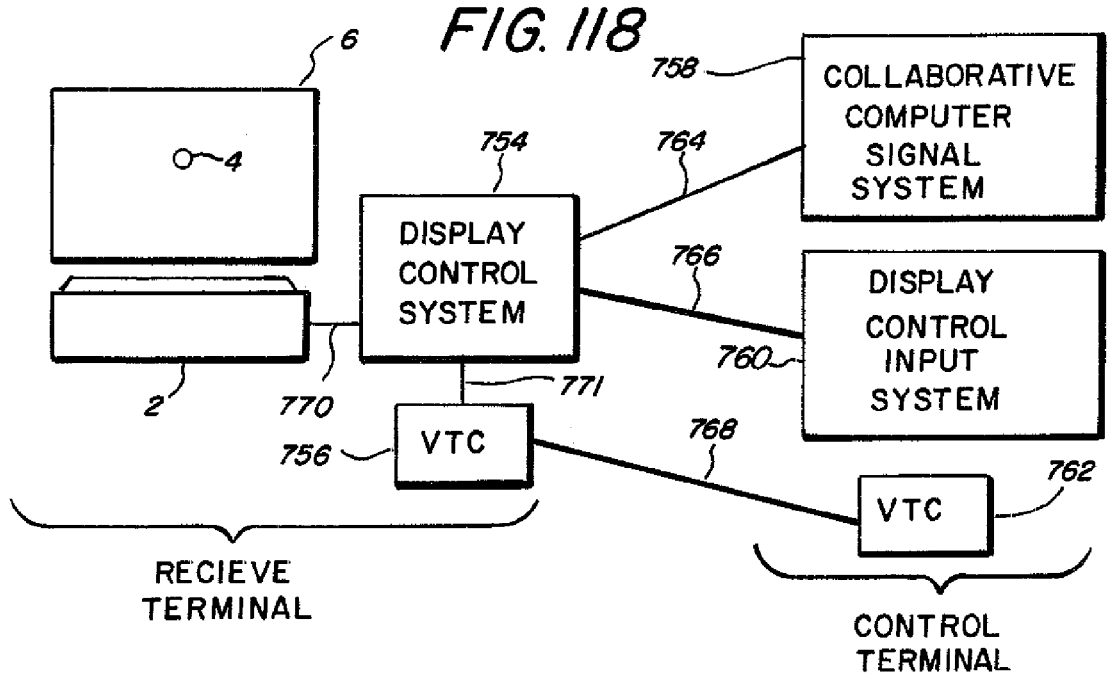

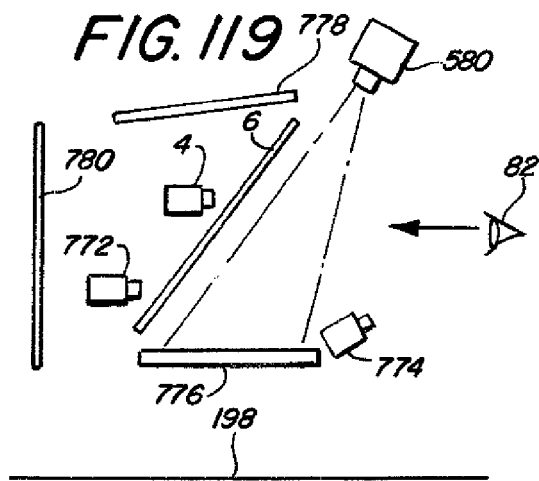
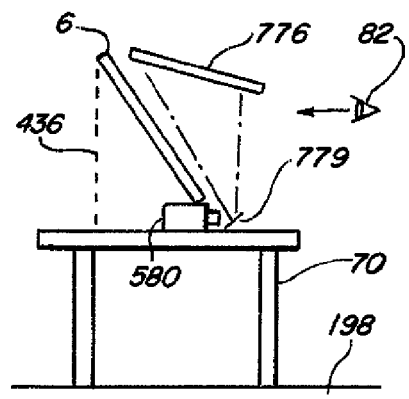
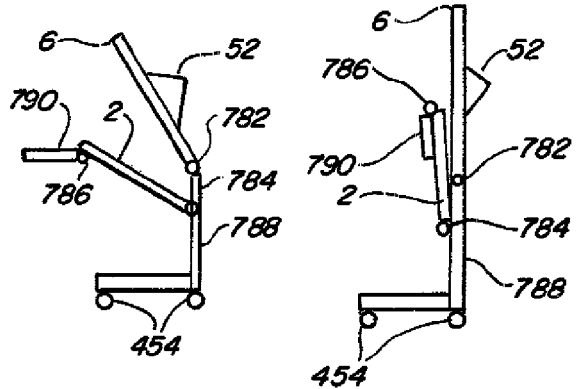
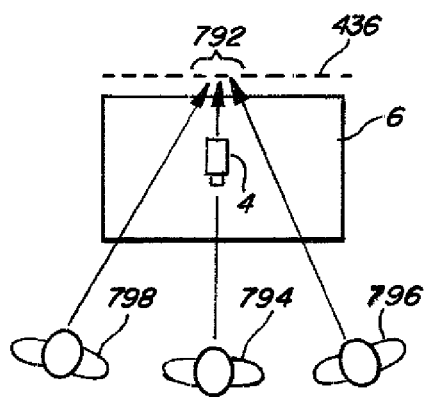
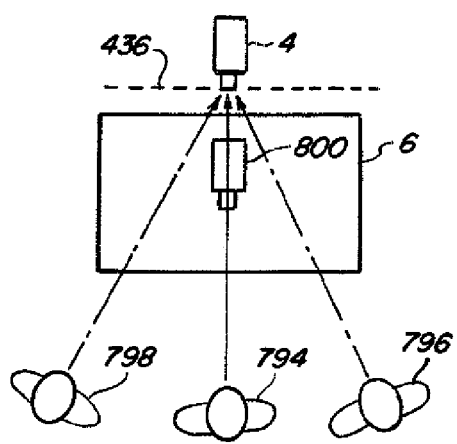
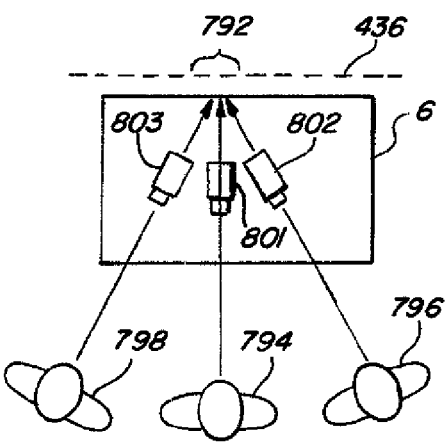

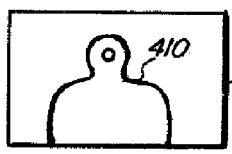
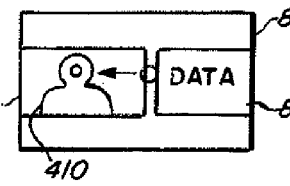
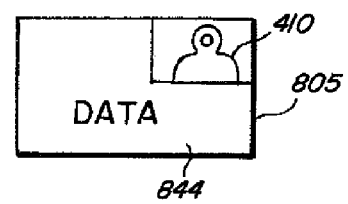
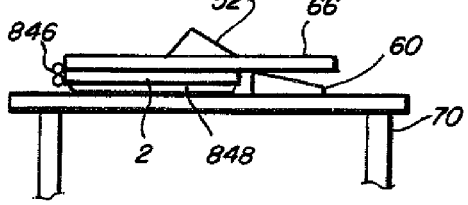
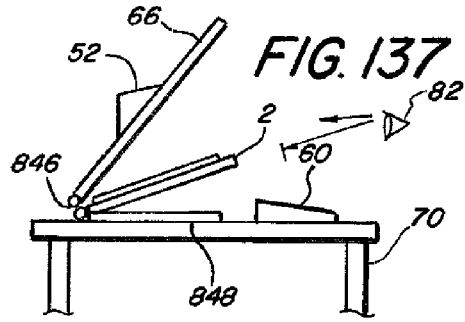
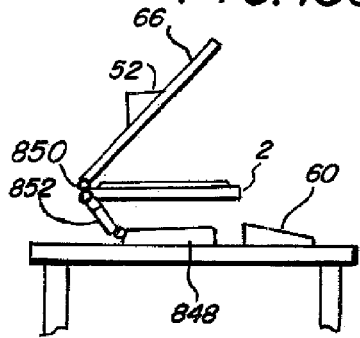
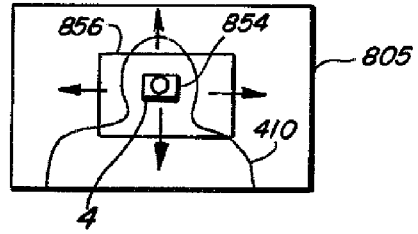
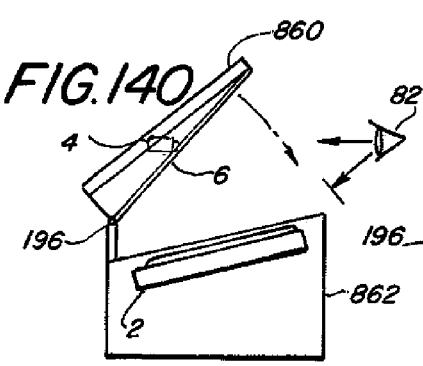
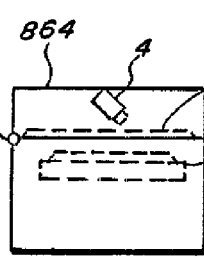
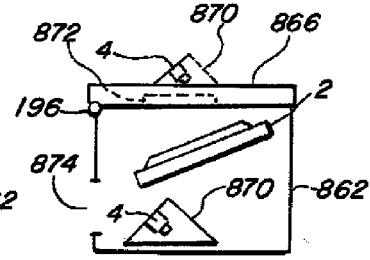

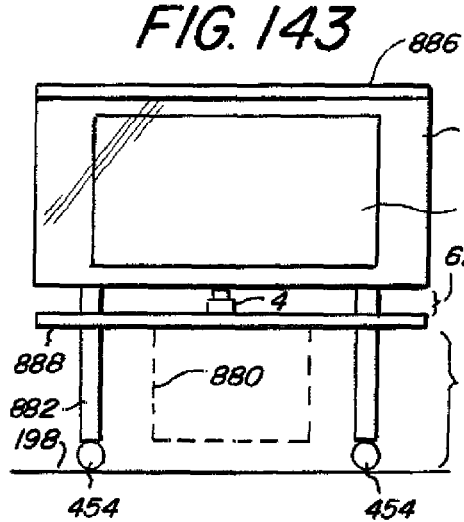
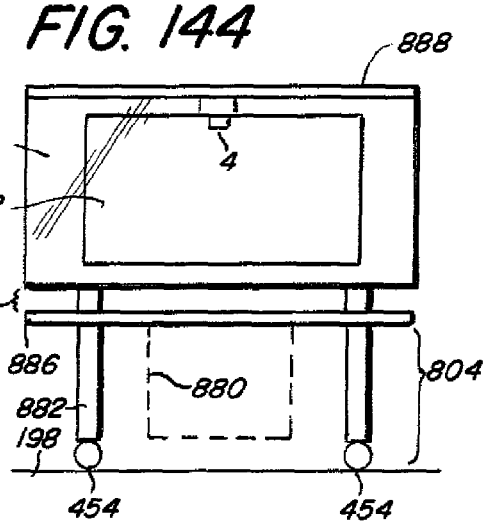
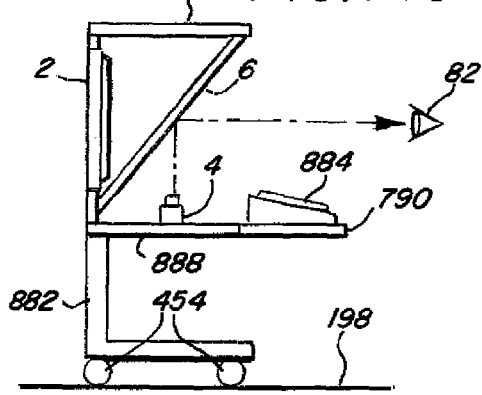
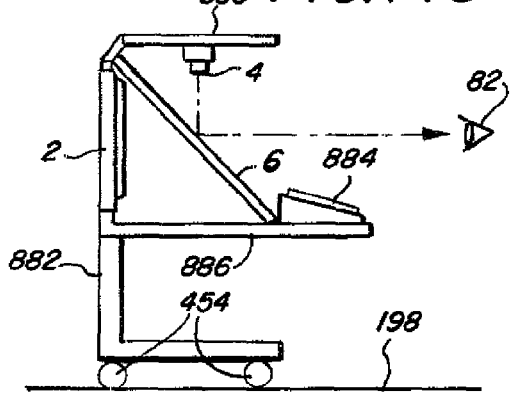
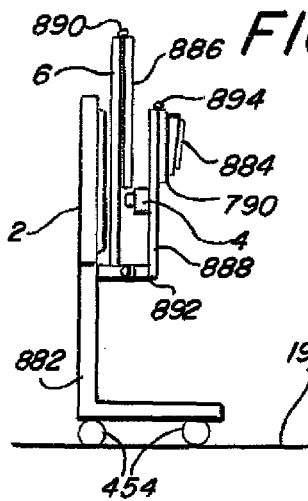
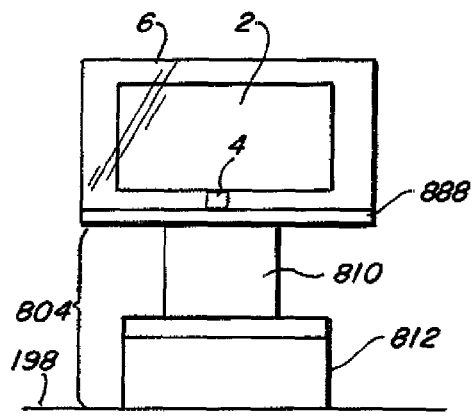

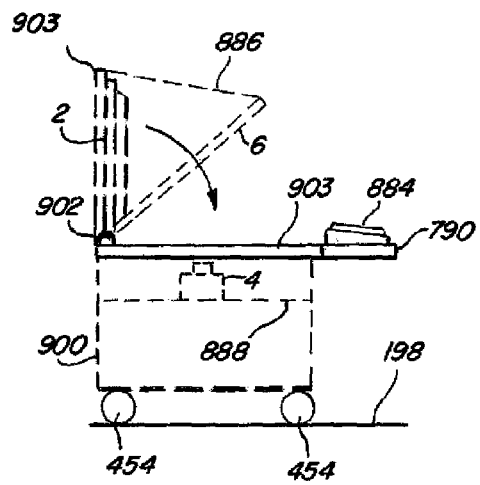
FIG. 149
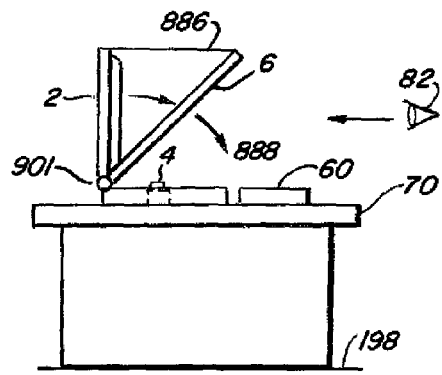
FIG. 151
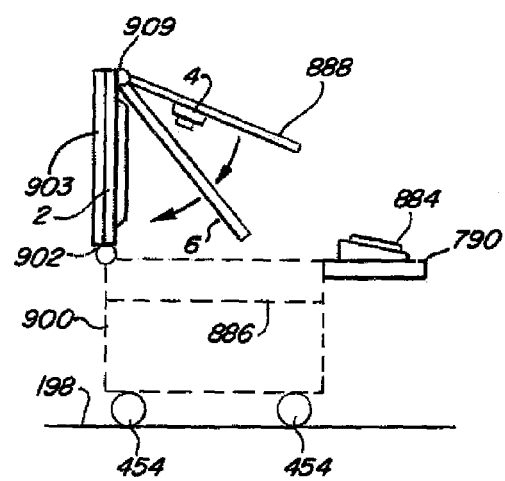
FIG. 150
FIG. 152

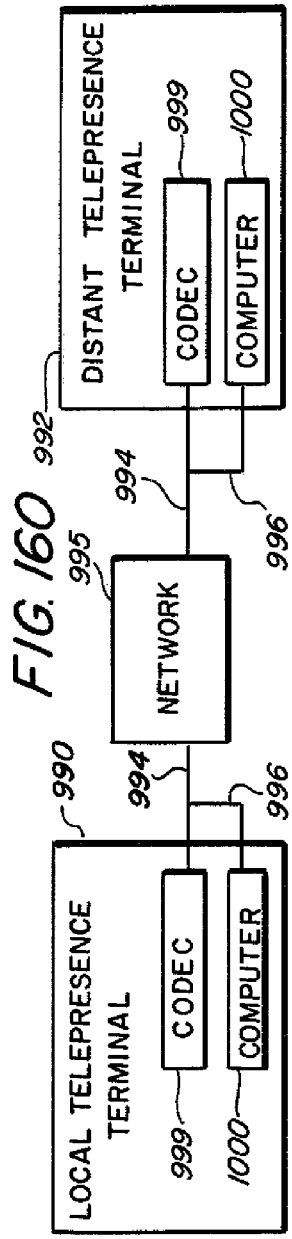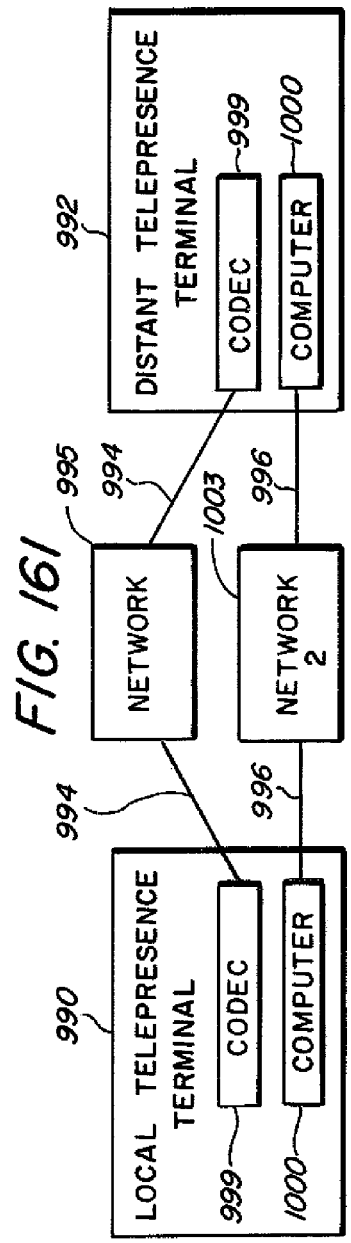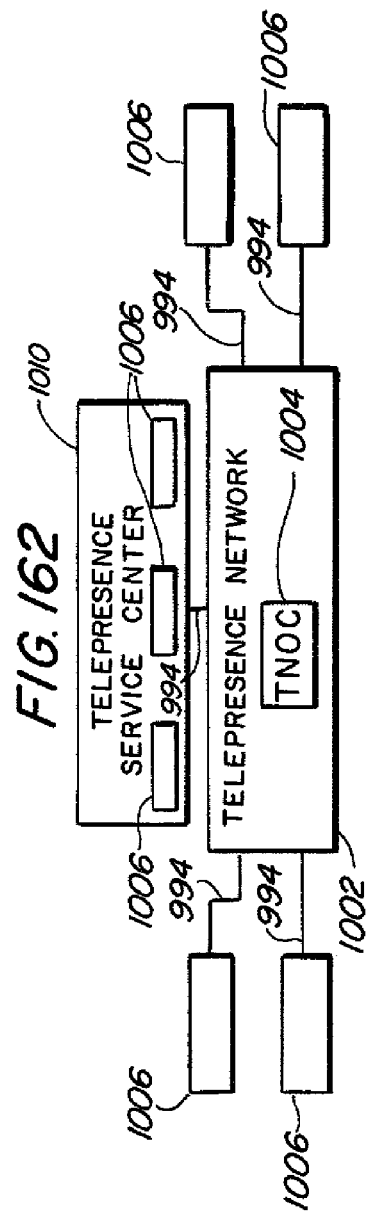

REFLECTED CAMERA IMAGE EYE CONTACT TERMINAL

CROSS-REFERENCE TO PRIOR APPLICATIONS

The present application is a Continuation-In-Part of application Ser. No. 10/785,820 (Feb. 24, 2004) now U.S. Pat. No. 7,209,160 which is a Continuation In Part of application Ser. No. 10/033,655 (27 Dec. 2001) now U.S. Pat. No. 6,710,797 which is a Continuation In Part of application Ser. No. 09/878,813, filed Jun. 11, 2001 now issued as U.S. Pat. No. 6,481,651, which is, in turn, a Continuation In Part of application Ser. No. 09/777,145 (5 Feb. 2001), now abandoned, which is a Continuation In Part of application Ser. No. 09/262,974 (17 May 1999), now issued as U.S. Pat. No. 6,243,130, which is a Continuation In Part of application Ser. No. 09/108,476, (1 Jul. 1998), now issued as U.S. Pat. No. 5,953,052, which is a Continuation In Part of Ser. No. 08/530,880, (20 Sep. 1995), and now issued as U.S. Pat. No. 5,777,665 which applications are hereby incorporated by reference into this application.

U.S. GOVERNMENT SUPPORT

NA

BACKGROUND OF THE INVENTION

1. Area of the Art

The present invention concerns the area of tele⌐con⌐fer⌐encing and, more specifically, an improved video tele⌐con⌐fer⌐encing device that permits eye contact wherein the remote conferee appears to actually be present in the room.

2. Description of the Background Art

A primary concern in video tele⌐con⌐fer⌐encing ergonomics is a lack of eye contact between conferees. Eye contact is not possible with common terminal configurations, because the camera is placed at the perimeter of the display that images a distant conferee, so that the camera does not interfere with a local conferee's viewing of the display. With this configuration the conferees fail to look directly into the camera, which results in the appearance of the conferees looking away and appearing disinterested in the conversation.

Although numerous technologies have been proposed to correct the eye contact problem, many of these technologies suffer from poor image capture quality, poor image display quality, excessive expense, or unacceptably increased terminal bulk. One commonly used component in eye contact systems is a beamsplitter. A beamsplitter is a semireflective transparent panel sometimes called a one way mirror or a semi-silvered mirror. Although even a plain sheet of transparent material such as glass can be employed, it is more common to apply coatings to a transparent substrate to increase its reflectivity.

A common beamsplitter eye contact arrangement consists of a beamsplitter that is mounted in front of a display oriented at about 45 degrees to the display surface. The conferee using the terminal looks through the beamsplitter to view the display. A camera is disposed in front of the beamsplitter and captures an image of the conferee reflected in the semireflective beamsplitter. This technology has a number of drawbacks. First, the 45 degree angle of the beamsplitter placed in front of the display necessarily increases the bulk of the display. Second, if the beamsplitter is illuminated by ambient light, the quality of the image captured by the camera may be seriously degraded. This problem may be avoided by a hood of an opaque material extending from the display to the edge of the beamsplitter so that ambient light does not degrade the reflected image. However, an opaque hood makes the beamsplitter appear even more intrusive with the angled beamsplitter forming a visible barrier in front of the display surface. Whether the display is a computer desktop monitor or a big screen television, the awkwardness of the protruding beamsplitter and camera remains an inefficient use of space.

U.S. Pat. No. 5,117,285 to Smoot attempted to reduce the bulk of this type of terminal by applying polarizers to the display and camera, so that the beamsplitter can be angled more acutely, approximately 30 degrees, without having light from the display interfere with the reflection of the conferee. A drawback to this arrangement is the inherent loss of light caused by the polarizer which further reduces the display image brightness, which has already been reduced by the beamsplitter. Even though this technology reduces the angle of the beamsplitter, it still adds considerable bulk to the terminal and a transparent barrier still remains in front of the display. Also, terminal bulk is further increased by the camera placement, which must protrude far from the display to capture the reflection of the conferee in the 30 degree angled beamsplitter. This becomes a nuisance with desktop conferencing, because the camera is positioned in the conferee's work space where a keyboard is usually placed.

Another eye contact beamsplitter arrangement resolves this protruding camera problem by mounting it behind the beamsplitter. In this arrangement, the display is reflected by the beamsplitter for viewing by the conferee. The light of the reflection conceals the camera behind the beamsplitter. The camera thus captures the image of the conferee through the beamsplitter. If a flat panel display is used or if a CRT display is mounted in a desk's surface and aimed upward, the bulk of this system can be reduced substantially.

However, even with these improvements this arrangement suffers from an additional significant problem: namely the conferee can simultaneously observe the displayed image both in two ways, either by directly viewing the display or by viewing the reflection of the display on the beamsplitter. That is, as the conferee looks at the reflected image, it is easy to glance at an angle and directly view the display below the beamsplitter. The dual visible images in this arrangement are a severe distraction, as the conferee's attention is divided between the light of two images. If the conferee gazes directly at the display (as opposed to the reflection of the display), eye contact will be disrupted because the camera will capture an image of the conferee that appears not to look at the face of the remote conferee.

Prior Art Beamsplitter Arrangements

FIG. 1 illustrates a prior art eye contact beamsplitter arrangement in which the image of a conferee is captured by a camera 4 by means of a reflection in a beamsplitter 6. At the same time the conferee's image is captured, that conferee is able to look through the beamsplitter 6 to view a display 2. A hood 8, usually covered with an opaque material, is typically included to shield the beamsplitter 6 from ambient light. The drawbacks to this arrangement include the increased bulk of the terminal (although a flat panel will minimize this problem), the addition of a transparent barrier in front of the display which affects viewing the display surface, the appearance of the display being recessed far into the terminal creating a tunnel effect and, lastly, the awkward positioning of the camera 4 which intrudes into the conferee's work space.

FIG. 2 is a prior art eye contact beamsplitter arrangement that attempts to reduce the protrusion of the beamsplitter 6 by adding a polarizer 9. Here when properly configured with a second polarizer 11 on the camera 4, the camera 4 can be aimed more directly toward the display 2 without picking up the image on the display 2 through the beamsplitter. Despite some reduction in the angle of the beamsplitter 6, the unit still suffers from excessive bulk, a transparent barrier between the conferee and the viewing surface of the display 2. Also, the camera 4 protrudes awkwardly from the terminal on a stand 12, invading the conferee's work space.

FIG. 3 presents a beamsplitter arrangement in which the conferee views the reflection of the display 2 by the beamsplitter 6. The camera 4 is substantially concealed from view behind the beamsplitter 6 and is aimed through the beamsplitter 6 to directly capture the image of the conferee. As is illustrated, the significant drawback of this arrangement is the fact that the light from the display 2 is visible to the conferee simultaneously at the display 2 and as the reflection of the display 2 in the beamsplitter 6 by the conferee. These two visible images compete for the conferee's attention and add distraction while conferencing, thereby reducing the quality of the conferencing experience.

SUMMARY OF THE INVENTION

It is an object of the present invention to provide a telepresence beamsplitter eye contact terminal and network that is adaptable to a variety of teleconferencing uses and products.

It is a further object of this invention to provide visual references, such as common objects, in a room environment to associate the position of an imaged conferee in the room.

It is a further object of the present invention to enable multiple cameras and multiple displays in a single eye contact terminal and thereby permit an immersive teleconferencing environment.

It is a further embodiment of the present invention to provide unique fabrication methodologies to flexible beamsplitters for eye contact teleconferencing.

It is a further embodiment of the present invention to provide an eye contact terminal that can be reduced in size while not in use for storage and transport.

It is a further embodiment of the present invention to enable an eye contact terminal to convert from a visible backdrop mode to a transparent mode of operation.

It is a further embodiment of the present invention to enable multi-format display switchable for various modes of conferencing and collaborating use.

It is a further object of the present invention to build it integral with furniture.

It is a further object of the present invention to convert into a working surface.

It is a further object of the present invention to mount the beamsplitter without need of a frame.

It is a further object of the present invention to provide a collaboration display between the terminal and the conferee.

It is a further object of the present invention to have a display that produces both computer and TV images.

It is a further object of the present invention to provide monetary transaction system.

It is a further object of the present invention to provide a laminated beamsplitter.

It is a further object of the present invention to provide a plurality of cameras and displays for various configurations.

It is a further object of the present invention to configure it upon wheels so that it can be moved easily.

It is a further object of the present invention to provide remote pan, tilt, and zoom camera.

It is a further object of the present invention to provide an image of conferee to appear in a room environment.

It is a further object of the present invention to provide a backdrop behind an image conferee Lastly, it is a further object of the present invention to provide a telepresence network linking telepresence terminals that have a commonality of configuration The present invention enables eye contact between conferees during a teleconference using a terminal equipped with a beamsplitter for reflecting an image of a conferee. In one embodiment the image of the conferee appears to be in a backdrop. The display is positioned behind the viewing side of the beam-splitter so that the conferee views the display through the beamsplitter. The invention can be configured to create the appearance that a life-size teleconference image of a remote conferee appears in the same room as the local conferee apparently sitting on the other side of the desk or table-creating the experience of telepresence with eye contact. Additional embodiments include adaptable features of the present invention which enable it to be configured into many specific types of eye contact display products. The invention further teaches the design of a telepresence network linking numerous terminals sharing a commonality in configuration. The invention also includes many additional versatility embodiments for desktop and group videoconferencing, as well as other videoconferencing applications.

DESCRIPTION OF THE FIGURES

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 1 illustrates a prior art beamsplitter arrangement in which the conferee views the display through a beamsplitter;

FIG. 2 illustrates a prior art beamsplitter arrangement that is configured with polarizers to reduce the angle of the beamsplitter from the display;

FIG. 3 illustrates a prior art beamsplitter arrangement in which the conferee is intended to view only the reflection of the display yet can still see light emanating directly from the display;

FIG. 4 illustrates the present invention in which image blocking film is used to conceal the display from direct viewing by the conferee;

FIG. 5 illustrates an embodiment of the present invention that conceals view of the display of light from all four sides;

FIG. 10 illustrates a display with modifications to assist in the positioning of the reflection for desired viewing;

FIG. 11 illustrates an extension arm system which permits numerous positioning options of the beamsplitter in relation to the display;

FIG. 12 illustrates opaque material placed behind the beamsplitter;

FIG. 13 illustrates a beamsplitter with image blocking film applied behind the viewing side, so that ambient light is substantially reduced;

FIG. 14 illustrates sound from a speaker bouncing off the beamsplitter;

FIG. 15 illustrates a beamsplitter that is bowed, so that a compressed image is expanded when reflected;

FIG. 16 illustrates image blocking film angled in relation to the display to prevent reflections back onto the image blocking film; and FIG. 17 illustrates an alternative beamsplitter arrangement wherein the image blocking film is used to prevent light from the display from being captured by the camera.

FIG. 22 illustrates a terminal configuration that has a reflected view mode and a direct view mode.

FIG. 23 illustrates a positionable display integral to a terminal.

FIG. 24 illustrates a terminal configuration that allows both the display and the beamsplitter to be positioned for maximum desktop usage.

FIG. 25 illustrates height adjustments of the terminal configuration and its effects on camera aiming.

FIG. 26 illustrates a human interface section that can be covered by the beamsplitter when in a closed position.

FIG. 27 illustrates a detachable camera and camera storage.

FIG. 28 illustrates a camera embedded inside the housing.

FIG. 29 illustrates a baffle to block reflections upon the camera lens.

FIG. 30 illustrates a liquid crystal shutter to block unwanted reflections upon the camera lens.

FIG. 44 illustrates a beamsplitter with no contrast background permitting observation of another person on the other side of the desk.

FIG. 45 illustrates an LCD shutter contrast background.

FIG. 46 illustrates a fluid shutter contrast background.

FIG. 47 illustrates a solid removable contrast background.

FIG. 48 illustrates a polarizer arrangement serving as a contrast background.

FIG. 49 illustrates a polarizer arrangement with remote polarizer.

FIG. 50 illustrates a portable computer reflected eye contact configuration.

FIG. 51 illustrates a portable computer reflected eye contact configuration with separate beamsplitter.

FIG. 52 illustrates a normal view display.

FIG. 53 illustrates necessary image conversion for viewing the image upon a reflection.

FIG. 54 illustrates a physical positioning method of converting the image.

FIG. 61 illustrates an eye contact terminal with a beamsplitter that is positioned away from a keyboard area.

FIG. 62 illustrates a variation of a positionable beamsplitter.

FIG. 63 illustrates an eye contact terminal in which the display is positioned rearward so that the beamsplitter is away from a keyboard area.

FIG. 64 illustrates a side mounted display and beamsplitter arrangement.

FIG. 65 illustrates a side mounted display and beamsplitter arrangement closed and away from a keyboard area.

FIG. 66 illustrates an integrated transmissive display eye contact terminal with module port and peripheral connections for dual use as a single user terminal and group videoconferencing terminal.

FIG. 67 illustrates an integrated rear projection eye contact terminal with module port and peripheral connections for dual use as a single user terminal and group videoconferencing terminal.

FIG. 68 illustrates an integrated reflected camera-view eye contact terminal with module port and peripheral connections for dual use as a single user terminal and group videoconferencing terminal.

FIG. 77 illustrates a micro camera and a micro shield

FIG. 78 illustrates a side view of FIG. 77.

FIG. 79 illustrates a micro-camera housing.

FIG. 80 illustrates a side view of FIG. 79

FIG. 81 illustrates a luminance intensity of a reflection of the remote conferee concealing a micro camera.

FIG. 82 illustrates a second beamsplitter for concealing a camera.

FIG. 83 illustrates the present invention built into a desk.

FIG. 84 illustrates the present invention built into a credenza.

FIG. 85 illustrates the present invention built into a table.

FIG. 86 illustrates multiple units of the present invention built into a table.

FIG. 87 illustrates multiple units of the present invention built into a desk.

FIG. 88 illustrates the present invention built into a coffee table.

FIG. 91 illustrates the present invention built within a controlled cabinet environment.

FIG. 92 illustrates the present invention built within a large controlled environment.

FIG. 93 illustrates a top view of FIG. 92.

FIG. 94 illustrates a camera tracking system as the conferee moves about.

FIG. 95 illustrates a polished edge beamsplitter.

FIG. 96 illustrates a very clear beamsplitter substrate.

FIG. 97 illustrates a safety layer on the beamsplitter.

FIG. 98 illustrates a laminated beamsplitter.

FIG. 99 illustrates an antireflective coated beamsplitter.

FIG. 100 illustrates a laminated reflective layer.

FIG. 101 illustrates a tinted beamsplitter.

FIG. 102 illustrates a camera hole fabricated into a laminated and tinted beamsplitter.

FIG. 103 illustrates a double clear substrate laminated image blocking layer.

FIG. 104 illustrates an image blocking layer laminated to a clear substrate and an image bearing screen.

FIG. 105 illustrates an image blocking layer laminated to an image bearing screen.

FIG. 106 illustrates a dimmable shutter.

FIG. 107 illustrates a frameless beamsplitter and a support.

FIG. 111 illustrates the present invention with an integrated transparent projection screen and a portable backdrop.

FIG. 112 illustrates the present invention with multiple displays and multiple cameras.

FIG. 113 illustrates a heat stretched flexible beamsplitter.

FIG. 114 illustrates a tension stretched flexible beamsplitter

FIG. 115 illustrates a memory substrate flexible beamsplitter.

FIG. 116 illustrates light trap material for enhanced reflected image contrast.

FIG. 117 illustrates a scrolling text display output integrated with an eye contact videoconferencing display.

FIG. 118 illustrates a block diagram of a remote site control of an eye contact display.

FIG. 119 illustrates pass-by reflective projection.

FIG. 120 illustrates pass-by reflective projection on a desktop.

FIG. 121 illustrates a foldable version of the present invention in operational mode.

FIG. 122 illustrates the foldable version of the present invention folded up for ease of transport and storage.

FIG. 123 illustrates a typical camera placement over the beamsplitter in relation to the plane of reflection.

FIG. 124 illustrates a camera located at the plane of reflection.

FIG. 125 illustrates various camera positions when the camera is not located at the plane of reflection.

FIG. 126 illustrates a versatile platform eye contact display forming a canopy over the floor.

FIG. 127 illustrates the versatile platform with a separate equipment rack under the canopy.

FIG. 128 illustrates the versatile platform constructed with a pedestal column.

FIG. 129 illustrates the versatile platform raised to podium height.

FIG. 130 illustrates an adjustable conferee illumination device.

FIG. 131 illustrates reconfiguring the terminal between high contrast mode and transparent mode of use.

Figure 132:
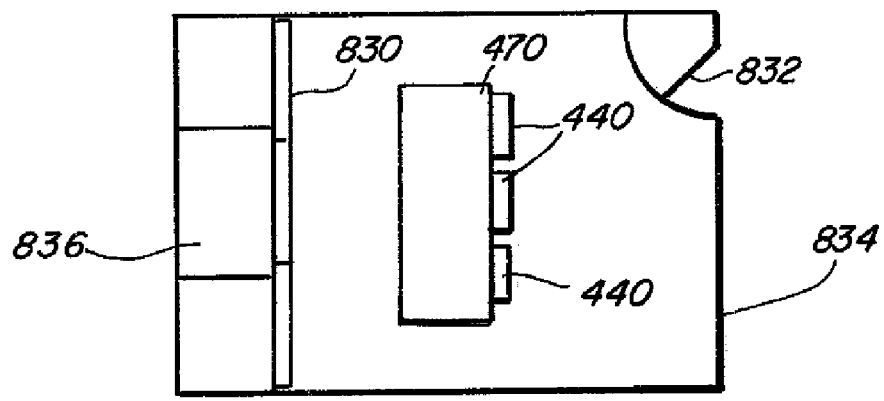

FIG. 132 illustrates a false wall so that the eye contact terminal appears to be integral to the room.

FIG. 133 illustrates the reflected image displaying a conference image.

FIG. 134 illustrates the reflected image displaying both a conference image and a data image side-by-side.

FIG. 135 illustrates the reflected image displaying a picture-in-picture conference image and data image.

FIG. 136 illustrates a folding down desktop terminal when closed.

FIG. 137 illustrates a folding desktop terminal in an operational mode.

FIG. 138 illustrates a height adjustment system for a fold down desktop terminal.

FIG. 139 illustrates the panning and titling space requirements of a digital pan/tilt and mechanical pan/tilt camera.

FIG. 140 illustrates slant display image blocking and a table top camera cavity.

FIG. 141 illustrates a thick table top camera cavity.

FIG. 142 illustrates a removable camera housing from a table top that can be stored in the housing.

FIG. 143 illustrates a reflected conferee eye contact terminal forming a canopy over the floor.

FIG. 144 illustrates a top mounted camera in a reflected conferee eye contact terminal.

FIG. 145 illustrates a side view of the configuration of FIG. 143.

FIG. 146 illustrates a side view of the configuration of FIG. 144.

FIG. 147 illustrates a fold up reflected conferee eye contact terminal.

FIG. 148 illustrates a terminal raising system for a reflected conferee eye contact terminal.

FIG. 149 illustrates a generic floor standing housing for a reflected conferee eye contact terminal.

FIG. 150 illustrates a generic floor standing housing for a reflected conferee eye contact terminal with a top mounted camera.

FIG. 151 illustrates a desk top resting reflected conferee eye contact terminal.

FIG. 152 illustrates a desk top resting reflected conferee eye contact terminal with top mounted camera.

Figure 153:
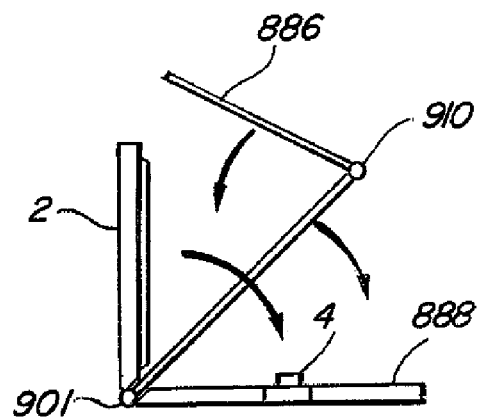

FIG. 153 illustrates a component folding system for a reflected conferee eye contact terminal.

Figure 154:
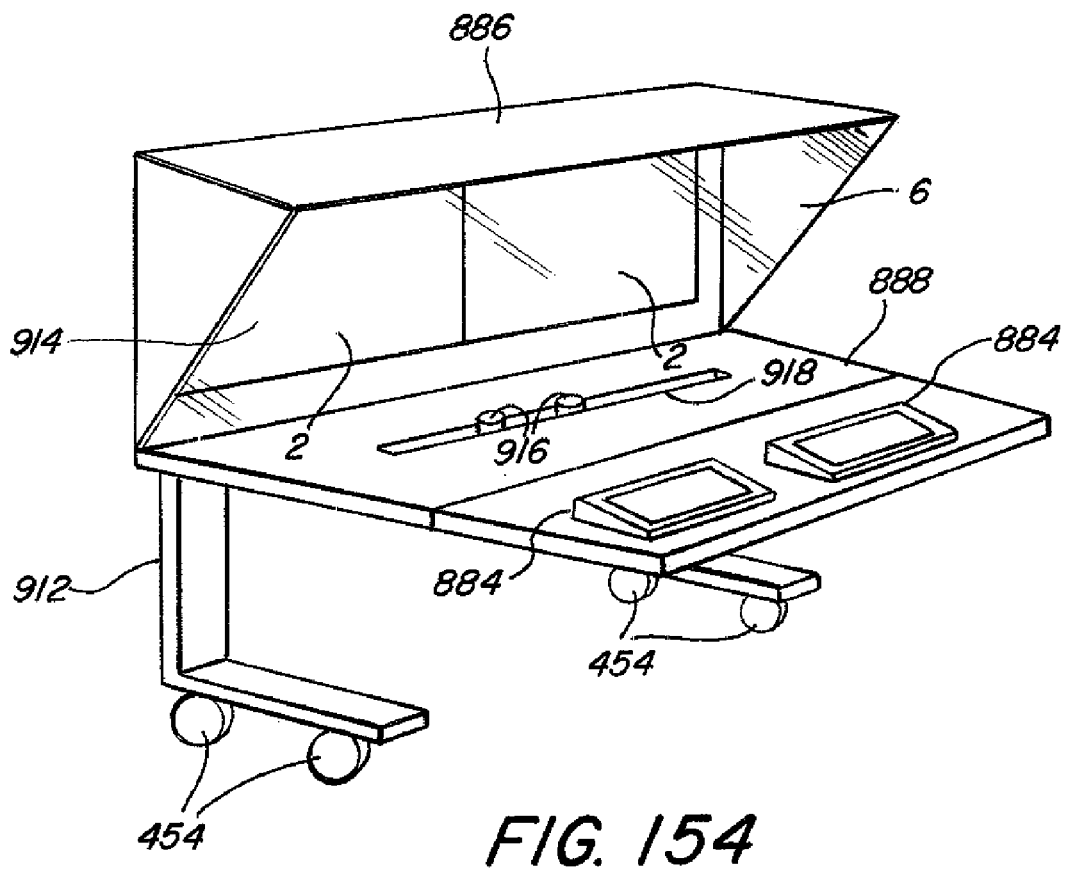

FIG. 154 illustrates a multiple camera and multiple display reflected conferee eye contact terminal.

Figure 155:
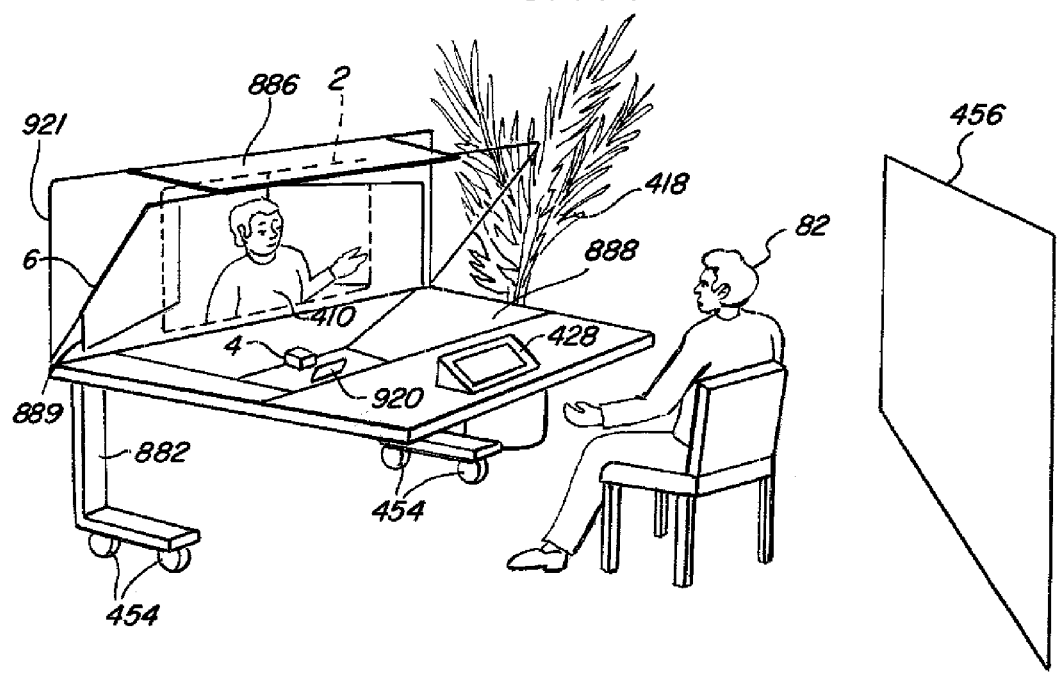

FIG. 155 illustrates a reflected conferee eye contact terminal with a reflection control shield backdrop.

Figure 156:
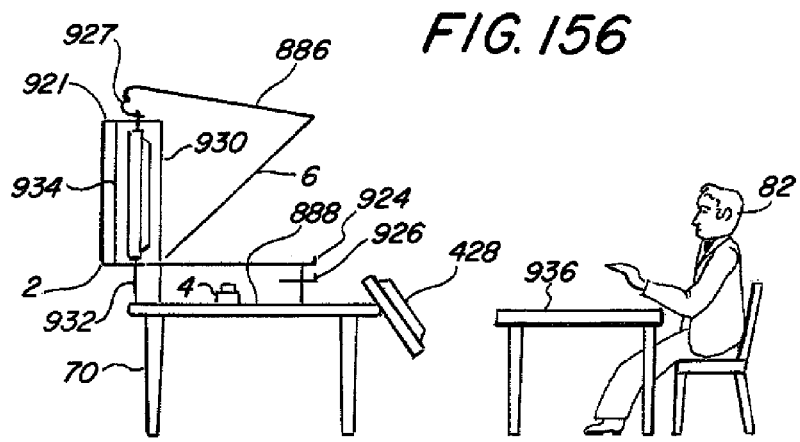

FIG. 156 illustrates a reflected conferee eye contact terminal with various planes of reflection of the backdrop.

Figure 157:
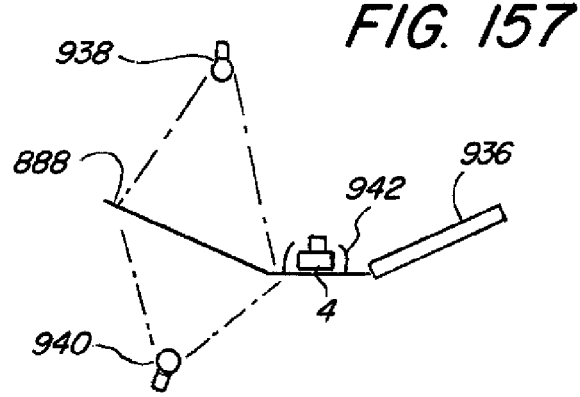

FIG. 157 illustrates a reflected conferee eye contact terminal with a selection of backdrop types.

Figure 158:
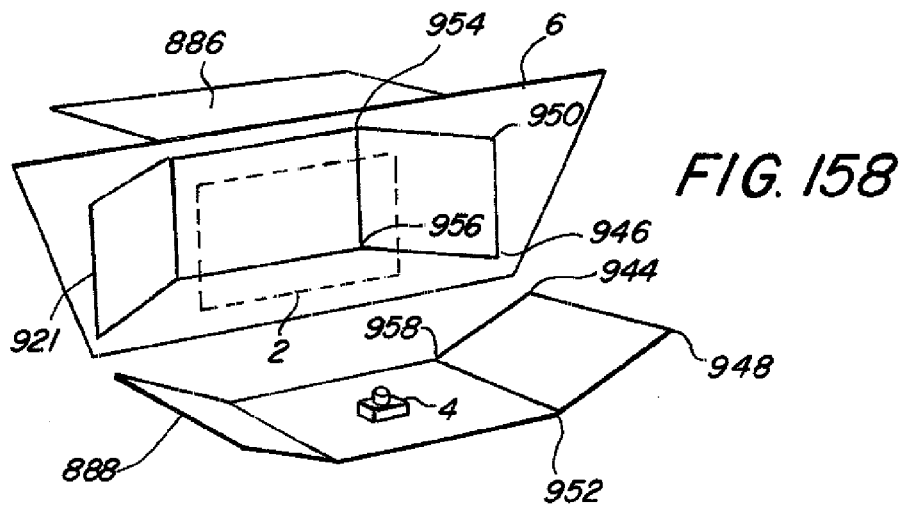

FIG. 158 illustrates a reflected conferee eye contact terminal with a back reflection housing that matches the reflection of the reflection control shield backdrop.

Figure 159:
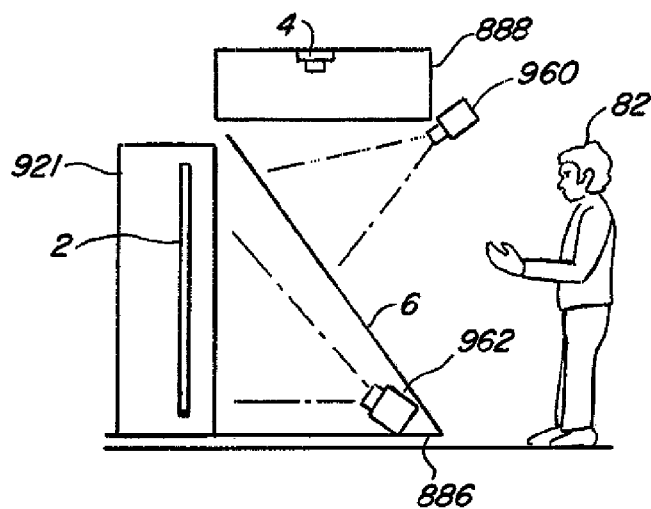

FIG. 159 illustrates a reflected conferee eye contact terminal configured as a large room system.

FIG. 160 illustrates a network design for telepresence communications.

FIG. 161 illustrates a two network design for telepresence communications.

FIG. 162 illustrates a network design with a network operations center and a service center.

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide an improved beamsplitter-based tele⌐con⌐fer⌐encing device.

Versatile Teleconferencing Eye Contact Terminal

An eye contact beamsplitter arrangement has been invented to overcome the problem of a conferee simultaneously viewing both the display and its reflection. An image blocking film 10 permits a display 2 to be viewed from one or more directions and prevents the interference of unwanted images. As seen in FIG. 4, a conferee can view the reflection from the display 2 on a beamsplitter 6. The conferee cannot, however, see the display 2 emitted directly, because direct light is blocked by the image blocking film 10. The conferee's attention, as a result, is now focused solely on the reflection and not distracted by a view direct from the display 2. A camera 4 in this arrangement is advantageously mounted behind the beamsplitter 6 away from the conferee's work space.

FIG. 5 illustrates the use of the image blocking film 10 to block the image when viewed from a side of the display 2. The image blocking film 10 that makes the present invention possible is a material that exhibits the uncommon property of being selectively transparent depending on an angle at which the material is viewed. That is, when the gaze of an observer is normal to a surface of the image blocking film 10, the film appears to be totally transparent and any object on the opposite side of the film, such as the display 2, is readily visible. However, if the observer views the image blocking film 10 at an angle to the film's surface, the image blocking film 10 has an appearance ranging from opaque to translucent: the observer's view of any object on the opposite side of the image blocking film 10 is obscured. The image can be blocked from two, three, or all four sides, if desired. For the present invention, it is critical that the image blocking film 10 block the image from at least the angle from which the conferee is viewing the display reflection, so that the display viewing surface itself is concealed from direct view. An advantage to placing the image blocking film 10 on the right and left sides of display 2 is that the image will be blocked from the reflection on the beamsplitter 6 when the display 2 is viewed at an angle from either side. This feature adds security and privacy to a teleconference which proves useful in a busy office area, since passersby cannot easily view the image.

The image blocking film 10 is available from several sources and can be based on various technologies. Whether the film is plastic or glass, the image blocking film as it is presented here is a material that permits transmission of light from at least one direction and reduces or eliminates light transmission from at least one other direction. Eyesaver International Inc. has an image blocking film named "Private Eye" that diffuses light from various directions. From the perspective of the conferee, when using this film, light directly from the display (as opposed to the reflected image) appears milky and diffused, eliminating the focused image. The diffused light, even though visible to the conferee, adequately conceals the image. Another image blocking film 10 is made by 3M Inc. and named "Light Control Film" and is preferred, because it can eliminate virtually all light transmission from a desired angle. This particular image blocking film 10 contains closely spaced black micro-louvers and a wide selection of louver angles are available, and even more options are available by layering films. This means that the precise angle at which the image blocking film 10 "shuts off" can be selected in advance. When the image blocking film 10 "shuts off," it ceases to transmit light so that if the observer views the image blocking film 10 from an angle greater than the "shut off" angle the film appears to be opaque. When using this film the conferee sees only the black surface of the micro-louvers which entirely conceals the image from the display 2 when viewed from the position of the conferee. The same effect can be produced by an array of tiny micro-louvers supported, for example, by their ends. In that case the image blocker would not actually be a "film" but would fall within the bounds of the present invention.

This arrangement is preferably used with a flat panel display such as an active matrix liquid crystal or plasma display, among others. Flat panels permit the size of the terminal to be reduced and offer aesthetic design opportunities not possible with other eye contact display systems. Of course, more bulky displays such as CRT displays and rear projection screen displays may also be used with the present invention. The added size of the terminal caused by bulky displays may not be a disadvantage in some circumstances. Also, a bulky display can be hidden by being built into a table with the screen surface flush with the table surface, giving the appearance that the entire terminal consists of a floating beamsplitter. Both flat panels and more bulky displays can be built into tables and into cabinets mounted sideways and even upside down. In each configuration, image blocking film 10 is applied to the display, blocking its image from the conferee's direct view and leaving only the reflection on the beamsplitter 6 in view. Custom applications of this invention will be apparent to one of ordinary skill in the art.

Figure 6:
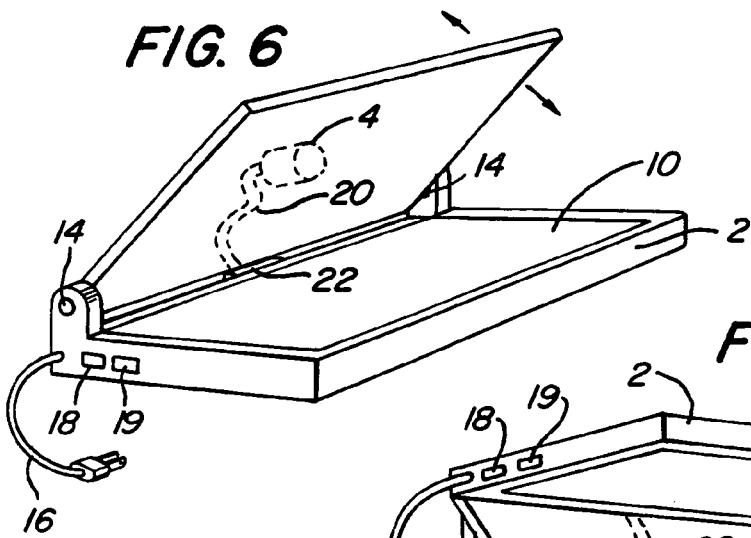
FIG. 6 illustrates the present invention configured with the display laying flat and aimed upwards.

FIG. 6 illustrates the present invention configured as a flat panel self-contained unit. The display 2 rests on a surface, such as a desk or computer. On top of the display viewing surface is the image blocking film 10 that functions in the manner previously described. The beamsplitter 6 is attached to the display 2 by hinges 14. The hinges 14 permit adjustment of the beamsplitter 6 in relation to the display 2. Although 45 degrees is the "critical angle" for setting the beamsplitter 6 relative to the display 2, positions between about 30 and 60 degrees are useful depending on the exact setup employed. A flexible rod 26 holds the camera 4 in place and also carries electronic signal wires to the display 2 which contains all electronic circuitry for the display and the camera 4. The flexible rod 20 is attached to the display 2 by a connector 22. The flexible rod 20 is one of many possible mechanisms that can position the camera 4 behind the beamsplitter 6. Its advantage is that it can be bent into numerous positions, allowing the camera to be adjusted both vertically and horizontally. A power line 16 supplies current to both the display 2 and the camera 4. A first port 18 allows the camera image to be cabled to the teleconferencing equipment so that the captured image may be viewed on a distant terminal. A second port 19 receives the incoming image signal, so that the distant conferee may be imaged on the display 2.

Figure 7:
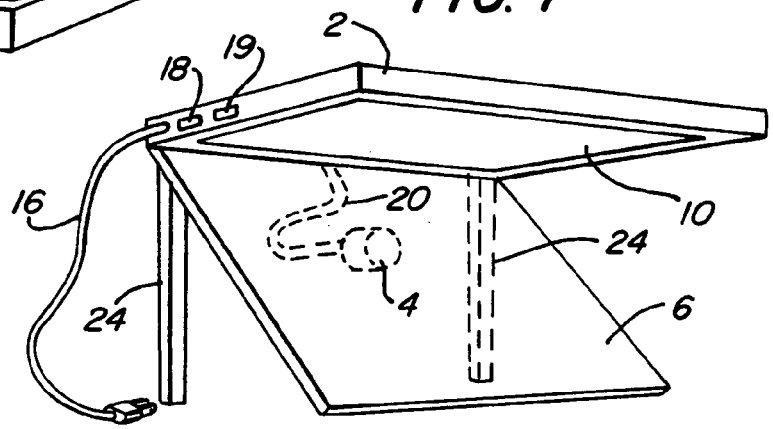
FIG. 7 illustrates the present invention configured with the display aimed downward.

FIG. 7 illustrates a self-contained unit as seen in FIG. 6, except that the display 2 is mounted above the beamsplitter 6 with the display viewing surface aimed downward into the reflection of the beamsplitter 6. In this configuration the display 2 is connected to and supported by the one end of the beamsplitter 6 and two support legs 24 that rest on the desktop, computer, or other flat surface. This configuration's operation is identical to the configuration of FIG. 6, except that no means of adjusting the beamsplitter 6 in relation to the display 2 is provided.

Figure 8:
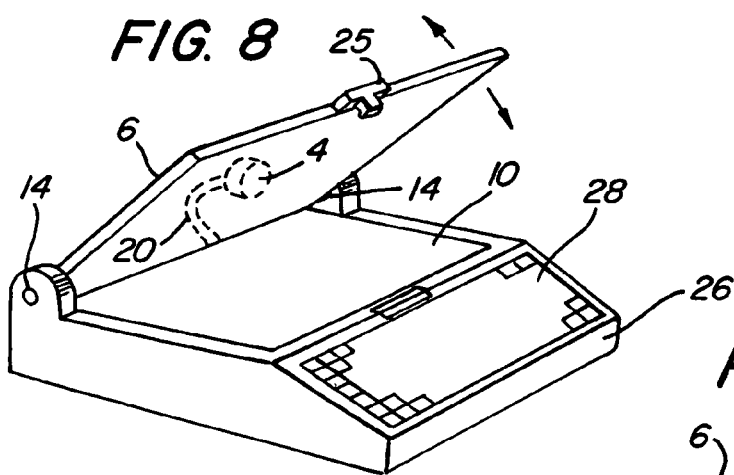
FIG. 8 illustrates the present invention configured as a display of a laptop computer.

The present invention may also be built into devices that have other functions besides image display and image capturing. An example of this is seen in FIG. 8, where the present invention is built as a part of a laptop computer 26 with a keyboard 28. In this configuration, the beamsplitter 6 folds down onto the image blocking film 10 with the built in display underneath and integral with the laptop computer 26. The beamsplitter 6 has a latch hook 25 connected to it, which is received in a latch hole 27 when the beamsplitter 6 is folded down by hinges 14. The flexible rod 20 and camera 4 retracts into a slot (not shown) in the back when the device is not in use. Besides integrating the present invention into a laptop computer, it may, in addition, be built into numerous portable devices such as palmtops, personal digital assistants, tele ⌐con ⌐fer ⌐encing camcorders, and wireless teleconferencing systems. Non-portable devices, as well, such as videophones, all-in one home computers, and televisions, to name only a few, will benefit from the present invention.

Figure 9:
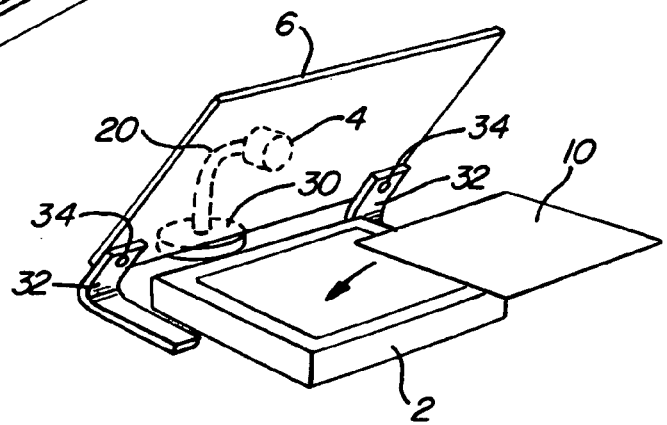
FIG. 9 illustrates the present invention configured as a separate unit that can be added to a display.

FIG. 9 illustrates a configuration where the main parts of the current invention can be configured as a separate kit to be added by the consumer to upgrade the existing display 2 and provide the practicality of modularity with interchangeable elements. As illustrated, the kit would contain the image blocking film 10 which is placed on top of the viewing surface of the display 2 secured by a VELCRO® hook-in-loop fastener (not shown), or other appropriate fastening means can be used. The beamsplitter 6 used in the kit is free-standing and held in place by stand legs 32 which are attached to the beamsplitter 6 by screws 34. The kit is completed by the camera 4 which is connected to the flexible rod 20 which, in turn, is connected to a flexible rod base 30.

Those skilled in the art will appreciate the design options made possible by the present invention. For example, the display 2 can be mounted flush with a desk surface with the image blocking film 10 seamlessly part of the desk's surface. From the conferee's perspective, the entire terminal would appear to consist of only the beamsplitter 6 and the camera 4. Also, the display 2 can be built into decorative housings and cabinetry and mounted aiming downward or sideways towards the beamsplitter 6. It is also conceivable that the image blocking film 10 can be manufactured in designer colors.

Although desktop conferencing terminals will greatly benefit from this invention, it may also be configured into big screen displays. These larger displays are important when several conferees are imaged on one display. The ergonomics of a life-size image of the conferees greatly improves the teleconferencing experience.

Those in the optical coating art will understand the vast variations possible for the beamsplitter 6 in regards to its substrate, coating, and manufactured process. Both plastic and glass substrates, as well as stretched Mylar, have been used for the beamsplitter 6. The beamsplitter 6 can comprise a custom blend of optical coatings on a transparent substrate for superior reflectivity and transmission all the way down to off-the-shelf one-way mirrors with inconsistent and poor optical qualities. Also, the reflectivity and transmission, as well as other optical qualities of the beamsplitter 6, can be adjusted as needed. Despite these vast variations in the beamsplitter 6, the property of being both reflective and transparent remains the single most important constant.

The following description details the construction of one embodiment of this invention. A frame and stand for the beamsplitter 6 was constructed from acrylic plastic on which the beamsplitter 6 was mounted at about 40 degrees, so that the image is aimed slightly upward toward the face of the conferee. The beamsplitter 6 comprises a titanium coating on a float glass substrate. The coating was optically designed for approximately 40% reflectivity and 60% transmission. The plastic support frame was designed to straddle a Shard active matrix LCD panel Model QA 1750BL lying flat on a table top. The image blocking film 10 used was 3M Light Control Film (type LCF ABRO O OB90 CLR GLS 030) and was positioned on the viewing surface of the active matrix display, so that the image of the display is blocked from the conferee's direct view. Behind the beamsplitter 6 am ELMO CCD miniature camera Model TSN 402 was attached to a custom flexible rod 20 and base 30. The terminal was arranged as seen in FIG. 9 and was operated on a compressed video (MPEG) teleconferencing system.

Depending upon the angle between the beamsplitter 6 and the display 2, the reflection of the display 2 may have a trapezoidal shape. This subtle distortion is normally not a significant problem for most observers. However, if this distortion is unwanted, well-known image manipulation techniques can be used to "predistort" the image on the display 2 into a trapezoid with its longer side in a reversed position from a longer side of the trapezoid caused by the beamsplitter 6 angle. This way distortion caused by reflection will cancel out distortion imposed by image manipulation, and the reflected image will appear rectangular in shape. Also, manual controls may be provided for the conferee to choose the degree of predistortion so that the reflected image can be corrected at any angular setting of the beamsplitter 6. An automatic system can also be provided to simplify this procedure by sensing the angular relation of the beamsplitter 6 to the display 2 and automatically applying the optimum amount of predistortion to the image. Since a bezel or outer edge of the display 2 may also appear in the reflected image, it may be necessary to either provide a trapezoidal bezel or make the bezel matte black so it is not apparent in the reflection. It may also prove advantageous to manufacture display panels in a trapezoidal shape.

The reflection in beamsplitter 6 can also reflect not only the display 1, but also the surface on which the display 2 rests or is mounted, such as a desk top. If this reflection becomes an annoyance, a light-absorbing mat (not shown) extended around the display eliminates these unwanted reflections. Another method to eliminate these unwanted reflections is to put light-absorbing sides extended between the display 2 sides and the beamsplitter 6.

For greater flexibility in orienting the display 2 to the beamsplitter 6, the display 2 itself may be raised or lowered from the front or rear of the display 2. In FIG. 10 adjustable extension legs 36 are connected with stiff pivot hinges 38. The display 2 with these extension legs 36 can be raised and lowered from both the front and the rear. For even greater flexibility in positioning the beamsplitter 6 in relation to the display 2, one can allow the beamsplitter 6 to be adjusted by tilting, moving backwards and forwards, and closer and further from the display 2 (see FIG. 11). Extension arms 42 and 40 provide all of these movements through the use of connected stiff pivot hinges 44, 46, and 48. The conferee can adjust tilt, up and down and back and forth, with this positioning mechanism. Other positioning mechanisms, as well, may be integrated according to the needs of the particular configuration.

An additional amenity that can improve a free-standing eye contact terminal employing the present invention is the addition of a simple turntable beneath the unit. The turntable allows the entire unit to swivel to face the conferee. This is especially useful in the case of group teleconferences where a number of individuals want direct "one-on-one" contact with a person at a remote terminal. The turntable allows the display 2 and the camera 6 to be instantly aimed towards any participant. This can be accomplished either manually or automatically. The image blocking film 10 is selected so that no one in the group can directly view the display 2. That is, two layers of image blocking film 10 are used so that the image is blocked from all viewing angles except for a line of sight normal to the surface of the display 2.

To enhance the apparent reflectivity of the beamsplitter 6, ambient light behind the beamsplitter 6 may be reduced, depending upon the optical properties of the beamsplitter 6 and the intensity of the ambient light. FIG. 12 illustrates the use of an opaque material 50 (such as black painted plastic) covering all of a rear surface of the beamsplitter 6 except for a small area through which the camera 4 is aimed. Ambient light is completely eliminated from behind the beamsplitter 6 and, thereby, substantially improves the apparent reflectivity of many types of the beamsplitter 6. An optional camera housing 52 may be built of light absorbing material, as well. If only ambient light from a specific direction need be eliminated, then image blocking film 10 can be applied to the back side of beamsplitter 6 as seen in FIG. 13. Other ambient light reduction methods may be used, such as mounting the present invention in an enclosed cabinet or providing a removable hood for the terminal.

Because the beamsplitter 6 is mounted at an angle toward the conferee it is possible to bounce sound off the beamsplitter 6. By doing so teleconferencing audio is greatly improved, because sound will seem to originate from the center of the beamsplitter 6 where the image of the distant conferee's mouth is located. FIG. 14 illustrates a speaker 55 aimed toward the beamsplitter 6 so that sound is bounced toward the conferee. Special directional speakers may be used to enhance this effect. The speaker 55 can also be mounted on the side of the display 2 (not shown) and additional speakers 55 may be used in various placements around the display 2.

An additional embodiment of the present invention employs a bowed beamsplitter 56 of FIG. 15. This enables the display 2 to be configured more narrowly than the common aspect ratio display 2. By squeezing the visible image with well-known image manipulation techniques, this smaller compressed image can be expanded to a larger image when reflected onto the bowed beamsplitter 56. This configuration is especially useful when a large image is desired, but the desk surface which the display rests on is limited in area.

Antireflective coatings can be applied as needed to suppress unwanted reflections from any of the optical surfaces involved. On the back side of the beamsplitter 6, opposite the reflection side, an antireflection coating can serve to eliminate the ghosting effect apparent with many types of beamsplitters. Also, an antireflective coating, substrate, film textures (i.e., matte finish), light-absorbing color, or similar functioning material can be applied on top of or as a part of the image blocking film 10 when it is necessary to reduce a "back reflection," which is an image reflected from the beamsplitter 6 back onto the image blocking film 10. FIG. 16 shows another method of dealing with back reflections. When the image blocking film 10 is angled (as opposed to parallel) in relation to the display 2, the back reflections are diminished or eliminated. An angle between the image blocking film 10 and the display can range from a few degrees to a much as 30 degrees or more. At large angles the image blocking film 10 advantageously incorporate slanted micro-louvers to compensate for a change in angular relationship between the conferee and the image blocking film 10.

Another embodiment of the image blocking film 10 used for teleconferencing eye contact is seen in FIG. 17. The image blocking film 10 has significantly improved the prior art beamsplitter 6 arrangement, as seen in FIG. 2. Prior art technology based on polarizers significantly reduces the brightness of the display 2 since polarizers absorb at least half of the incident light. This, combined with the further brightness reduction caused by the beamsplitter 6, creates a noticeably dim image. The image blocking film 10 has a higher transmissivity than the polarizer 9, allowing a far brighter image. Also, a single substrate image blocking film 10 applied between the display 2 and the beamsplitter 6 does not suffer from the complexity of aligning the two polarizers 9 and 11. The image blocking film 10 allows the conferee to look through a single substrate to the display 2 image behind. From the perspective of the camera 4 the image is concealed by the image blocking film 10. Because the image is blocked, the camera 4 can be aimed more directly toward the display 2, i.e. between about 20 degrees and about 40 degrees, without picking up the light of the display 2 passing through the beamsplitter 6. As a result, the beamsplitter 6 can be angled more closely to the display 2, thereby reducing the protrusion of the beamsplitter 6. FIG. 17 shows the image blocking film 10 parallel to the front surface of the display 2. The image blocking film 10 may also be located on the side of the beamsplitter 6 facing the display 2 or at any position between.

Although this terminal still suffers from a protruding camera 4 on the stand 12, this protrusion can be reduced somewhat by using a small micro video camera. Instead of the stand 12, the camera 4 can be mounted on a movable base (not shown) which rests directly on the table or desk surface. A second mirror (not shown) may be used near the camera to correct the image reversal caused by the reflection of the beamsplitter 6. The hood 8 is an optional element and may be used if ambient light is excessive. Variations in terminal design made possible by this improved beamsplitter 6 arrangement will be apparent to those skilled in the art of tele¬con¬fer¬encing ergonomics.

Depending upon the type of the beamsplitter 6 and the degree of transmissivity used, adjustments to the light sensitivity of the camera 4 may improve image quality. Also, adjustments to the brightness of the display 2 may improve the reflectivity of some types of beamsplitters. Such light sensitivity and brightness adjustments of camera 4 and display 2 will be apparent procedures to one of ordinary skill in the art.

As is the case with all eye contact terminal technology, true eye contact cannot occur between conferees unless both conferees have an eye contact terminal. Even if only one conferee has an eye contact terminal, however, that conferee can transmit an eye contact signal for at least the other conferee to enjoy. In a multiple conferee session, portions of the screen can be designated for simultaneously displaying several incoming conferees. A more complex approach to multiple conferees is to use multiple cameras side by side in order to transmit different points of view of the conferees as if sitting around a table. Although not shown, it will be apparent as to how side-by-side cameras would be configured behind the beamsplitter 6.

Because the display is reflected on the beamsplitter 6, the image will appear to the conferee to be reversed. Image reversal techniques (either physical such as a mirror or electronic) can easily remedy this problem by appropriately reversing the image before it is displayed so that, when reflected on the beamsplitter, the image will assume its correct viewing orientation.

When viewing the reflection of the display 2 from the sides, the reflection of the display 2 will fall off the edge of the beamsplitter 6 when the beamsplitter 6 is the same size as the display 2. A simple remedy for this is to make the beamsplitter 6 as wide as necessary, so that the entire image remains reflected even when viewing from the sides.

Numerous embodiments of the present invention have been originated to overcome significant limitations of the reflected display eye contact approach. These following embodiments improve and advance this configurational approach by attending closely to the conferee relationship with the device in typical working environments. These embodiments are ideally suited for use with the image blocking film 10, but also serve to greatly advance the reflected display configuration even without the image blocking film 10.

Figure 18:
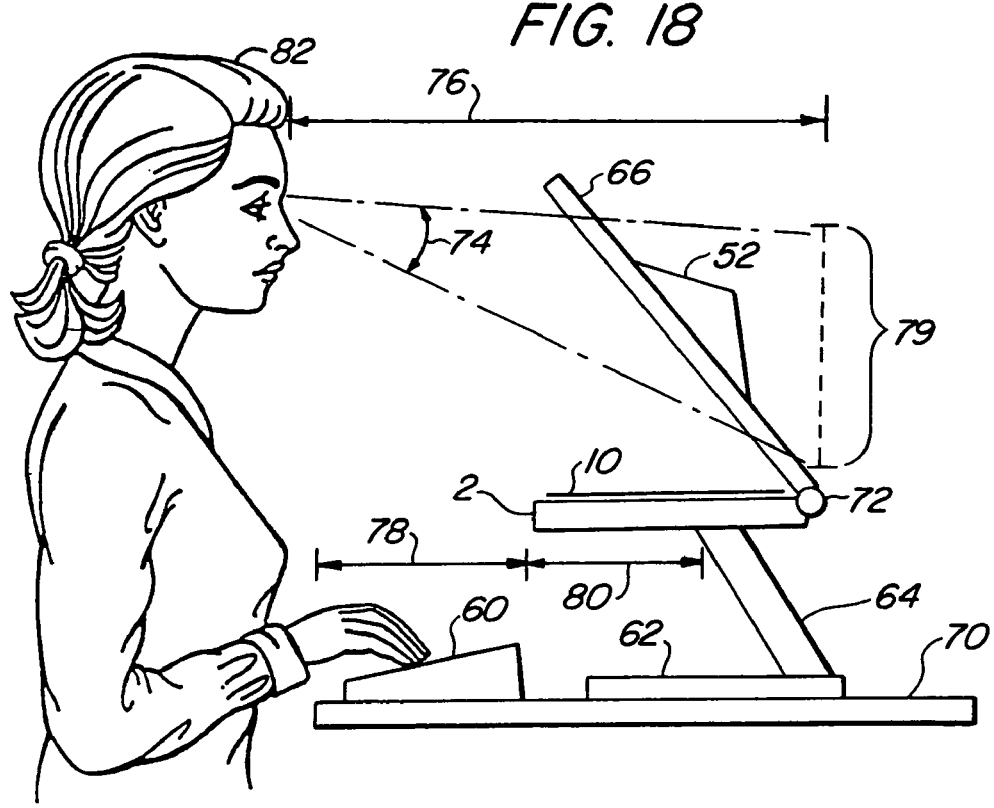
FIG. 18 illustrates a terminal configuration with the reflected display position.

FIG. 18 illustrates a conferee 82 seated at a desk 70 with common posture for using a keyboard interface 60. The configuration illustrated demonstrates a conferee to reflected display distance 76 of the reflected display position 79. Since all reflected display configurations reflect an image to the rear of the terminal the reflected display position may appear too far away for the conferee's 82 viewing comfort. The current terminal configuration enables the display 2 to actually slightly overhang the essential work area 78, if so desired, to bring the reflected display position 79 closer to the conferee (not shown). This ability to slightly overhang the essential work area 78 yet still allow the conferee 82 complete and unencumbered access to the keyboard interface 60 is permitted by a terminal construction with a base 62 supporting a terminal extension post 64 with display 2 positioned as a form of canopy over the desk 70. Though not shown, this terminal configuration may be adapted with a shorter terminal extension post 64 so that the terminal can rest upon a case containing personal computer hardware. Various lengths of extension posts 64 can be provided to the consumer of which then the extension post 64 will be a replaceable structural element. Fundamentally, the extension post serves to raise the entire display as a form of canopy off the desk 70 allowing access under the entire display and allows the conferee 82 to reach under the display all the way beyond to the rear side of the terminal to books and files etc. on the desk 70.

FIG. 18 also illustrates the conferee viewing radius 74 which extends through a beamsplitter terminal section 66 to the reflected image position 79. The beamsplitter terminal section 66 is a support housing for the beamsplitter 6 (not shown) and the camera 4 (not shown) inside the camera housing 52. The beamsplitter 6 (not shown) is of the approximate length of the beamsplitter terminal section 66. The following configurations, though shown with beamsplitter terminal section 66, may, as well, be configured solely of the beamsplitter 6 and various adaptations of beamsplitter 6 including configurations described and illustrated previously. The conferee viewing radius 74 intersects nearly all the beamsplitter terminal section 66. It is apparent that if beamsplitter section 66 was shorter in length the reflected display position 79 would be partly cut off from view by the conferee 82. Hence, the beamsplitter terminal section 66 is a mandatory length in order to allow the conferee to view the entire reflected display position 79.

A stiff hinge 72 permits manual angular adjustment of the beamsplitter terminal section 66 which both adjusts the camera position and the reflected image position. For example, if the beamsplitter terminal section 66 was tilted towards the conferee 82 the reflected display position 79 would also appear to tilt forward and likewise appear backwards if the beamsplitter terminal section 66 was tilted backwards. Obviously the conferee 82 may easily selectively choose the tilt most comfortable for viewing. However, most typically, the tilt selected for the reflected display position 79 is parallel to the face of the conferee 82. With this basic understanding of the conferee 82 postured at desk 70 and viewing the reflected display position 79 the beamsplitter terminal section 66 requires the minimum length illustrated in FIG. 18.

Considerable advancement in flat panel display technology and the reduction of the cost of these displays makes flat panels a prime candidate to replace the bulky cathode ray tube monitor on the desktop. Small cubicles, offices, and work spaces can greatly improve in efficiency with the added desktop space made available by a flat panel. By adding the additional component of the beamsplitter 6 for eye contact videoconferencing the minimum space requirements for the flat panel display will increase in size due to its angular relationship to the beamsplitter 6. The present invention presents many embodiments to overcome the added terminal bulk of a beamsplitter 6 to maintain the space efficiency inherent to flat panels on the desk 70.

A significant embodiment of the present invention is the construction of the terminal as illustrated in FIG. 18 to permit desktop space-saving by utilizing display 2 as a form of canopy over the desk 70. Desktop space-saving is especially dramatic when the terminal base 62 is constructed with a thin profile. The utilitarian space savings of the desk 70 under the canopy of display 2 improves work efficiency by allowing ready access to books, files, computer software, computer hardware, and so on. While display 2 in FIG. 18 is supported by terminal extension post 64, other structural methods to support display 2 as a form of canopy over the desktop 70 may be utilized as well.

Figure 19:
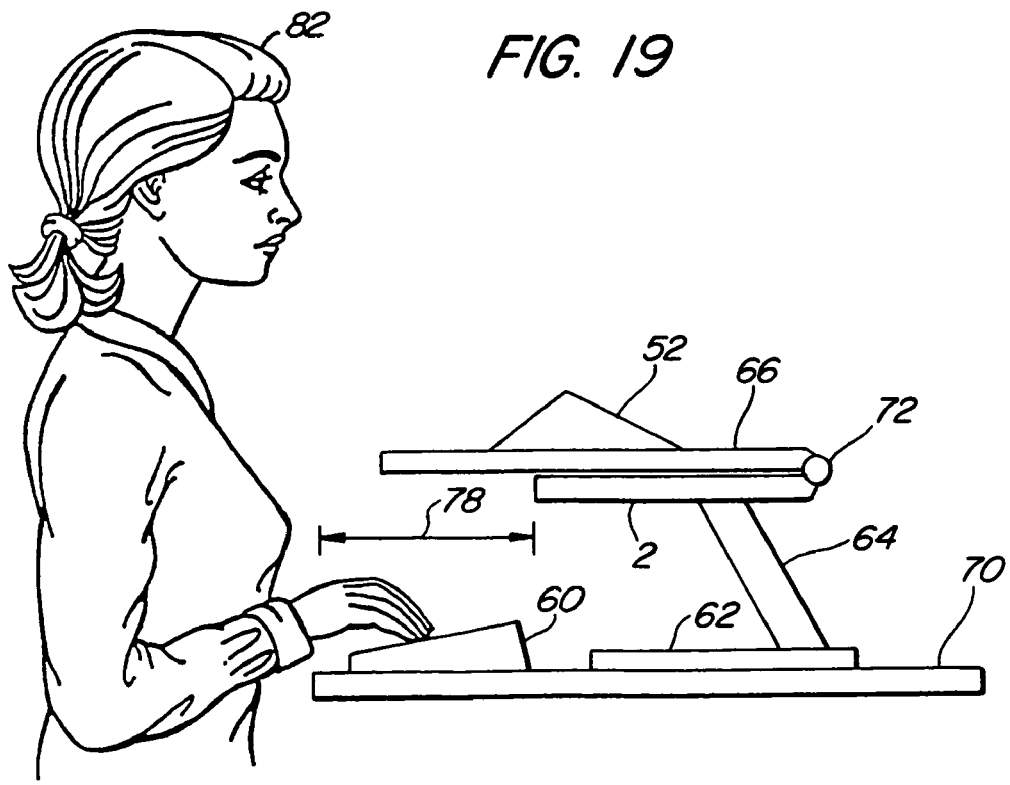
FIG. 19 illustrates a terminal configuration where the beamsplitter closed upon the display.

A fundamental configuration aspect of reflected image displays is the fact that the beamsplitter 6 is relatively thin and likewise the beamsplitter terminal section 66 can be constructed with a thin profile. This thin profile is ideal for permitting the beamsplitter 6 and the beamsplitter terminal section 66 to fold upon the display 2 by a manner similar to that allowed by stiff hinge 72. However, as described above, the beamsplitter terminal section 66 requires a minimum length for the conferee 82 to view the entire reflected display position 79. This length is considerably longer than the length of the display 2. As illustrated in FIG. 19 the beamsplitter terminal section 66 substantially protrudes, almost completely overhanging the essential work area 78, rendering for the conferee 82 a useless work area due to the protrusion. The essential work area 78, with the keyboard removed, could otherwise be used: for handwriting letters, reading manuals, and so on.

Figure 20:
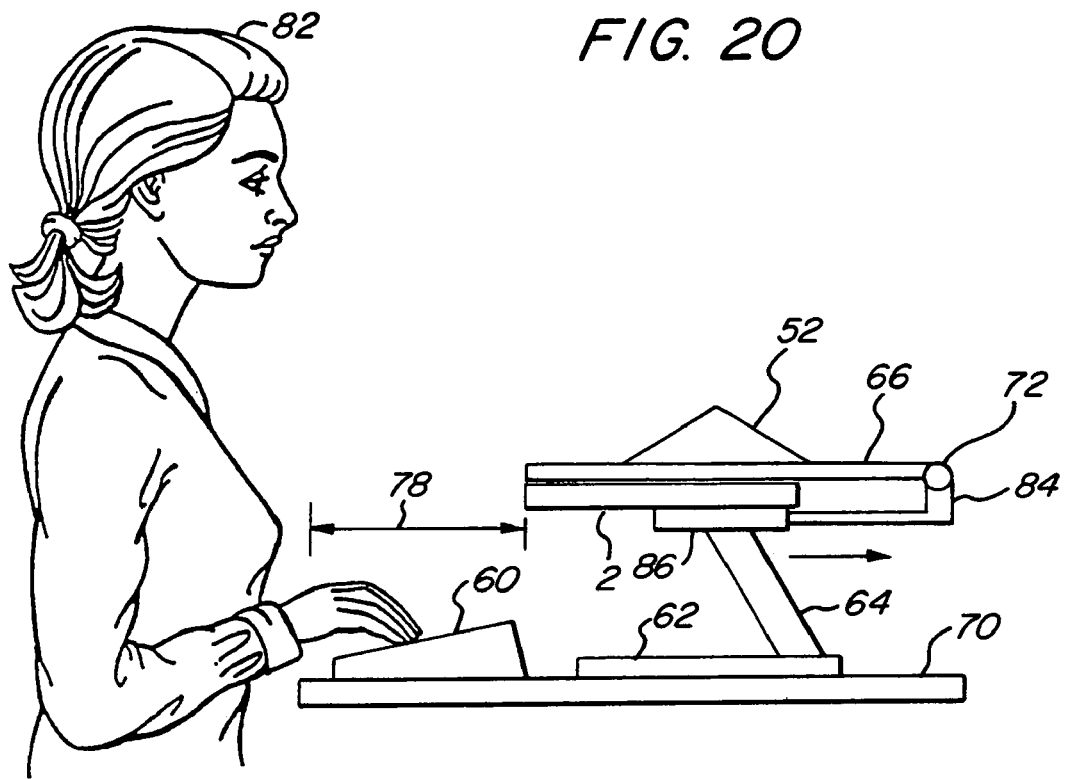
FIG. 20 illustrates a beamsplitter positioned out of an essential work area.
Figure 21:
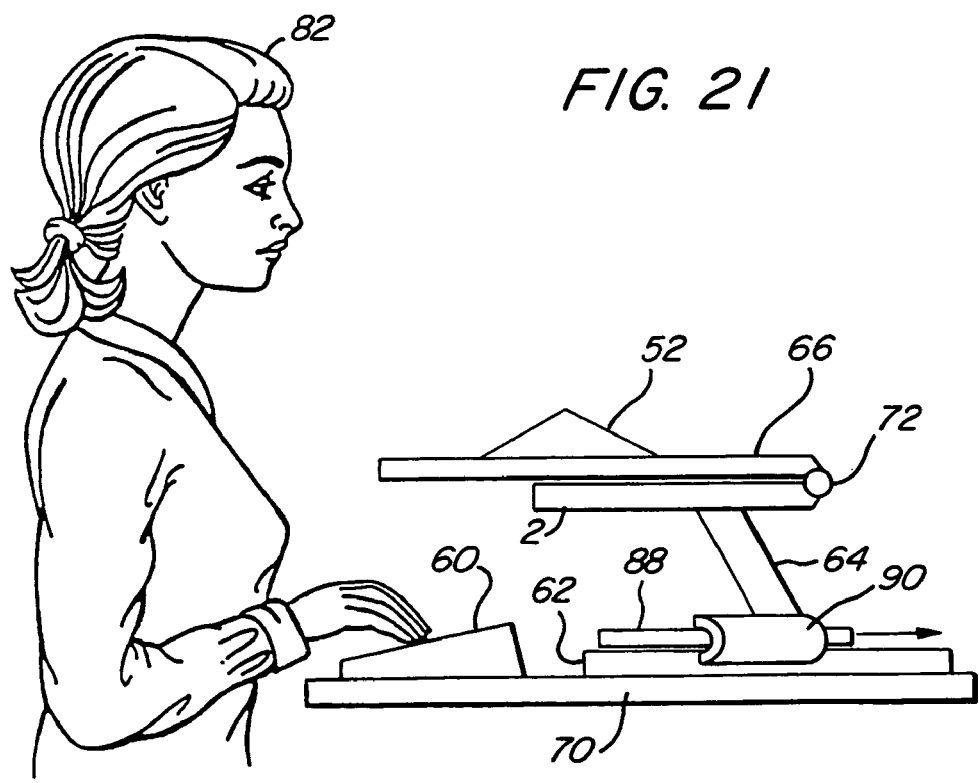
FIG. 21 illustrates a terminal configuration positioned out of an essential work area.

A significant embodiment of the present invention is illustrated in FIG. 20 which eliminates the protruding overhang into the essential work area 78 of the beamsplitter terminal section 66 when closed upon the display 2. In this configuration the beamsplitter terminal section 66 not only closes upon the display 2, but also shifts backwards away from the conferee by eliminating the protruding overhang into the essential work area 78. In this configuration the stiff hinge 72 is attached to a slide extension arm 84 which slides within sleeve 86. The embodiment of FIG. 21 shifts not only the beamsplitter terminal section 66 backwards, but also the display 2 a slide track in a bearing sleeve 90 attached to base 62. Other mechanical methods (not shown) may be utilized to shift at least the beamsplitter terminal section 66 and possibly other terminal components including the entire terminal backwards away from the conferee 82 without the nuisance of physically and strainfully lifting the entire terminal up, and then reposition to the back of desk 70. The apparent advantages of the beamsplitter terminal section 66 closed upon display 2 are the protection of the beamsplitter 6 and the display 2 from accidental damage and, most importantly, the conferee 82 can converse with others on the opposite side of the desk.

Another embodiment of the present invention as seen in FIG. 22 permits the conferee 82 to select between viewing the reflected display position 79 (as illustrated in FIG. 18) and viewing directly the display 2. Some consumers may require direct access to the display 2 for touch screen applications as well as other applications. A display stiff hinge 92 attached to a display support section 94 permits the display 2 to be positioned into various angles for comfortable viewing. The display 2 can be viewed through the image blocking film 10 or the image blocking film 10 can be folded by a double hinge 96 to an image blocking rear position 98. Likewise the image blocking film 10 can be removably attached to the display 2. Features described for FIG. 20 are applicable to the configuration of FIG. 22. The dual use modes and the possible configurations of an integral terminal may be applied as well to notebook computers and other portable consumer electronic devices.

FIG. 23 illustrates an additional embodiment where the display 2 can be manually positioned at various distances from the conferee 82. The display stiff hinge 92 is attached to a display short base 102 which rests upon a terminal platform 100. The display short base 102 is locked in place by a bolt 104 and a knob 106 to the terminal platform 100. Cut into the terminal platform 100 is an elongated track (not shown) the width of the bolt 164 so that the display short base 102 can be tightened down in various distances from the conferee 82. Though not shown, the embodiment of FIG. 23 can include the functional elements as described for FIGS. 20, 21, and 22. Most significantly the display 2 can be positioned away from the conferee by positioning the entire terminal back on the desk in a manner described for FIG. 21.

Reflected displays require the image source to produce a compensated image for accurate reflection viewing. Otherwise a reverse/inverted image will be seen at the reflected display position 79 (FIG. 18). The embodiments of FIGS. 22 and 23 permit a direct view of display 2. Hence, the consumer will need to select between a direct view mode and reflection view mode of which the image source will produce a standard or compensated image. Reverse/invert image techniques can be inherent as to the display 2 driver electronics or separate from the display and originate from, for example, software from a personal computer. Reverse/invert controls can be manually selected by buttons located in an easy to reach place anywhere on the terminal. Also, reversing/inverting of the image source can occur automatically by, for example, triggering a switch when the display 2 is manually tilted up and down on the stiff display hinge 92.

FIG. 24 illustrates another embodiment of the present invention which connects the stiff hinge 72 to the terminal extension post 64. In this embodiment, both the display 2 and the beamsplitter terminal section 66 are attached to the stiff hinge 72 so that both can be folded and aimed upwards freeing the entire desk 70 which can be utilized as a large and efficient work area. Functional elements as described for the embodiments for FIGS. 18-23 can be readily adapted to the embodiment of FIG. 24 to create a highly versatile desktop terminal.

Still another significant embodiment of the present invention is seen in FIG. 25 where the display 2 and the beamsplitter terminal section 66 are supported by stiff pivot hinges 44, 46, and 48 connected to extension arms 40 and 42, permitting manual adjustments of the height of the display 2 relative to the desk 70. This relative height of display 2 to the desk 70 is illustrated by a dimension line 108. A primary concern for image capturing by the camera 4 is assuring horizontal aiming toward the conferee 82 as seen in aiming line 114. The result is capturing an image of a background perspective 116 that is parallel to the posture of the conferee 82. An inferior method of capturing an image of the conferee 82 is positioning the camera in camera position 112. The result is an angled aiming line 118 and an angled background perspective 120 showing in the captured image a background of the ceiling (not shown). Such camera positioning is fundamental to the art of audio and visual production and the horizontal aiming line 114 is typically used for news broadcasts. The stiff pivot hinges 44, 46, and 48 connected to extension arms 40 and 42 allows greater flexibility for conferee 82 selection of the camera 4 height position relative to the desk 70 as illustrated by a camera to desk dimension line 110.

Variations and modifications of the configurations 18-25 will be apparent to those skilled in the art when supplied the fundamental configurations of the present invention. Additionally, pivot and swivel mechanisms for pan/tilt functionality can aid in even greater versatility in the positioning of the display 2.

FIG. 26 illustrates a human interface section 122 built adjacent and integral to the display 2 represented by area 124. The human interface section 122 is covered by the overhang protrusion of the beamsplitter terminal section 66. Contained in the human interface section 122 can contain an integral data interface (not shown) such as the keyboard 28 similar to that seen in FIG. 8. Hence, a compact terminal for portable computing, such as a battery operated notebook computer, can have all its key elements including the display 2, the beamsplitter 6, and the keyboard 28 protected from accidental damage and ease of portability by having all these elements closed upon one another by stiff hinge 72. Also, the human interface section 122 can contain a phone dial and a hand held phone receiver with microphone and speaker (not shown) so that this terminal can function as a stationary and portable videophone. Another configuration not shown enables the portable configuration described above to have adjustable extension legs that fold out from the bottom of display 2 raising the camera 4 above desk 70 to a height for near horizontal aiming as previously described for FIG. 25. Still another embodiment not shown would allow the human interface section 122 to detach from the display 2 and allow the human interface area 122 to be placed on a desk in a similar position as the keyboard interface 60 in FIGS. 18-25.

Another embodiment of the present invention is illustrated in a cutaway FIG. 27 where a removable camera housing 126 detaches from the beamsplitter terminal section 66 and may be optionally stored for portability in a slot 144 to the side of display 2. The slot 144 can be accessed through a slot door 148 connected to the display 2 by slot hinge 146 and a lock latch (not shown). Camera 4 is seen with an optional camera electronic board 130, camera ribbon cable 132, and exposed contacts 134 assembly contained with in the removable camera housing 126. Power and video are passed to a contact receptacle 136 on the beamsplitter terminal section 66. The removable camera housing 126 is attached to the beamsplitter terminal by a hook latch 127 and magnetic connections 138 and 140. A camera lens 128 is aimed through a hole 142 in the beamsplitter terminal section 66 to capture images through the beamsplitter 6. Various adaptations to remove the camera 4 will be apparent to one of ordinary skill in the art. Despite the possible variations, when the camera housing 126 is removed the beamsplitter should be protected from accidental damage on the camera side. Small shutter doors (not shown) may serve to cover up holes in the back of the beamsplitter terminal section 66.

Another embodiment of the present invention is seen in a cutaway FIG. 28. Instead of having the removable camera housing 126, the camera 4 can be built between the beamsplitter 6 and the rear wall 155 of the beamsplitter terminal section 66. As camera technology improves and miniaturizes this would certainly be preferred placement of the camera 4 for it would provide an aesthetically pleasing thin profile to the beamsplitter terminal section 66 and improve portability due to increased compactness.

Still another embodiment of the present invention seeks to remedy the problem of the camera 4 lens 128 being visible to the conferee while using the display. Reflections upon lens 128 can be minimized by selecting a lens of a given size and curvature that is not prone to forming reflections. Often antireflective coatings are applied to the various optics that comprise a lens and these coatings can be adjusted, as well, to minimize reflections on the lens 128. An antireflective layer can be disposed in front of lens 128 on a separate substrate as well (not shown). A mechanical method of reducing and even eliminating the lens reflection uses a manual slide baffle 154 with a finger lever 156 (FIG. 29). Another form of baffle can use two polarizers in front of camera 4 that can be adjusted in relation to one another permitting a transparent mode and a baffle mode. Also, a shutter or baffle can be integral to the lens 128. Of course manual methodology can be replaced by an automatic function controlled by a touch of a button. Such modifications will be apparent to one of ordinary skill in the art. A non-mechanical approach utilizes a liquid crystal or similar operating shutter which can alternate from a transparent mode to a diffused or even opaque mode. FIG. 30 illustrates a liquid crystal shutter 150 with an electrical connection 152 which, depending upon a controllable electrical current, can be selected for either a transparent mode of, which camera 4 can be aimed through or an opaque mode which conceals the lens 128 from the conferee's view. These baffle and shutter methods described will not permit an image to be captured of the conferee 82 while they are concealing the lens 128. So the baffles and shutters are engaged when the display 2 is utilized for non-videoconferencing modes.

Figure 31:
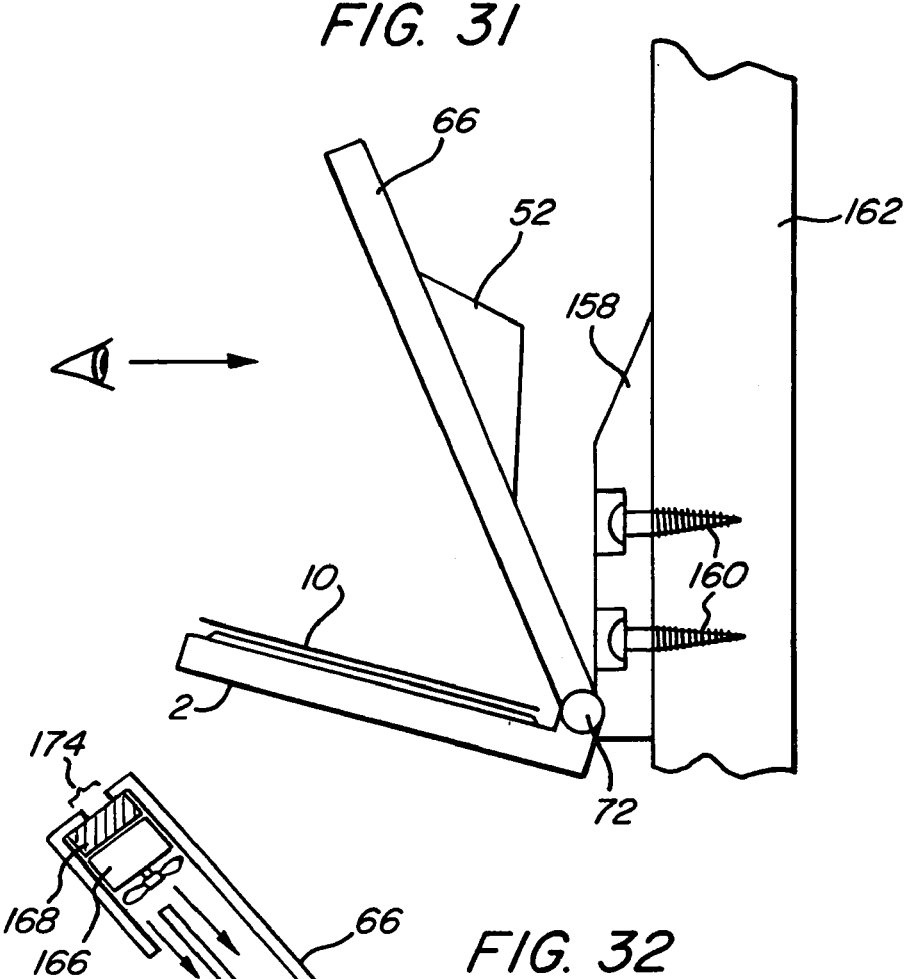
FIG. 31 illustrates a terminal configuration that is mounted to a wall.
Figure 32:
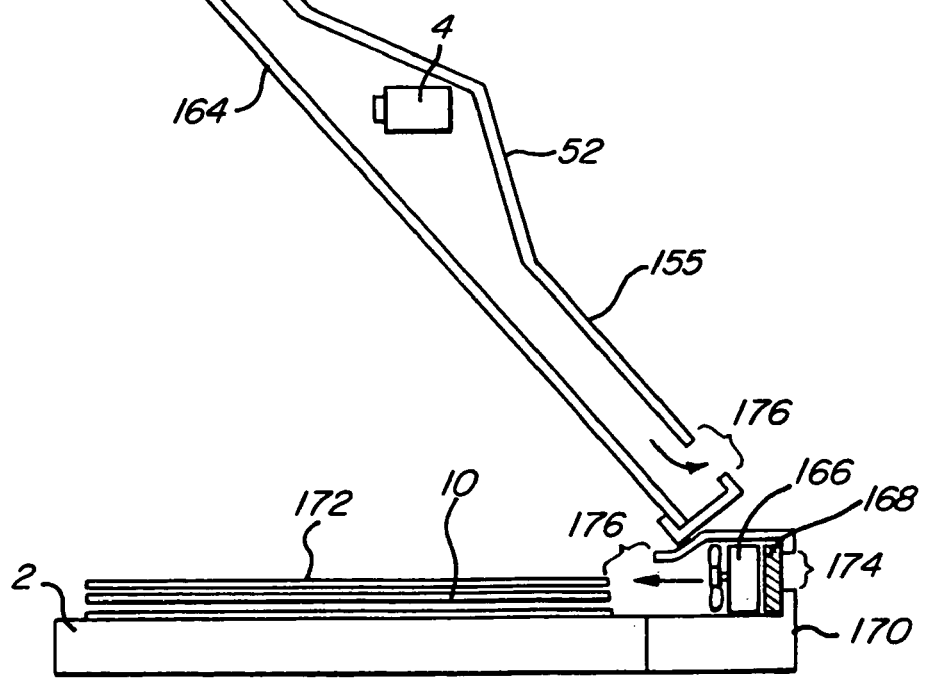
FIG. 32 illustrates methods for dust removal from terminal components.

Another embodiment is illustrated in FIG. 31 where the present invention is designed in the manner of a hang-on-the-wall videophone or hang-on-the-wall computer phone. The stiff hinge 72 is connected to a wall mount 158 which is attached to a wall 162 by screws 160. Both the beamsplitter terminal section 66 and the display 2 are attached to the stiff hinge 72 permitting them to fold out and away from the wall from a closed position (not shown) to an open position as seen in FIG. 31. A hand-held phone receiver including microphone and speaker and phone button interface, and the phone communication electronics, and any supporting computer can be adapted into or next to this primary configuration as desired by one of ordinary skill in the art Another embodiment is a dust removal system which does not require the cleaning energies of the conferee to maintain ideal operating efficiency of the terminal components. The collection of dust on either of the viewing surfaces of display 2 and both sides of the beamsplitter 6 will affect optimum performance of the camera 4 image capturing and the viewing the display 2 reflection on the beamsplitter 6. FIG. 32 illustrates the use of a fan 174 with an air intake 174 supplying a stream of air through an air filter 168. The fan system is deployed on both sides of the beamsplitter 6 and air flow can pass from behind through an air outtake 176. Also, the same type of fan arrangement from a fan section 170 can pass air over the display 2, the image blocking layer 10, and an optional conductive layer 172. The conductive layer 172 can also be applied to one or both sides of the beamsplitter 6. The conductive layer is typically grounded, removing static electricity that can attract dust. The air flow from fans 174 can also, be treated by deionizing techniques and other air treatment techniques commonly used in clean rooms. Also antistatic and dust repelling materials can be utilized in the entire construction of the terminal. Of the options provided, one or more can be utilized and in any combination. Lastly, the area between the back side of the beamsplitter 6 and the rear wall 155 can be sealed air-tight so that no dust can enter and thereby no dust can be deposited on the back side of the beamsplitter 6 (not shown).

Figure 33:
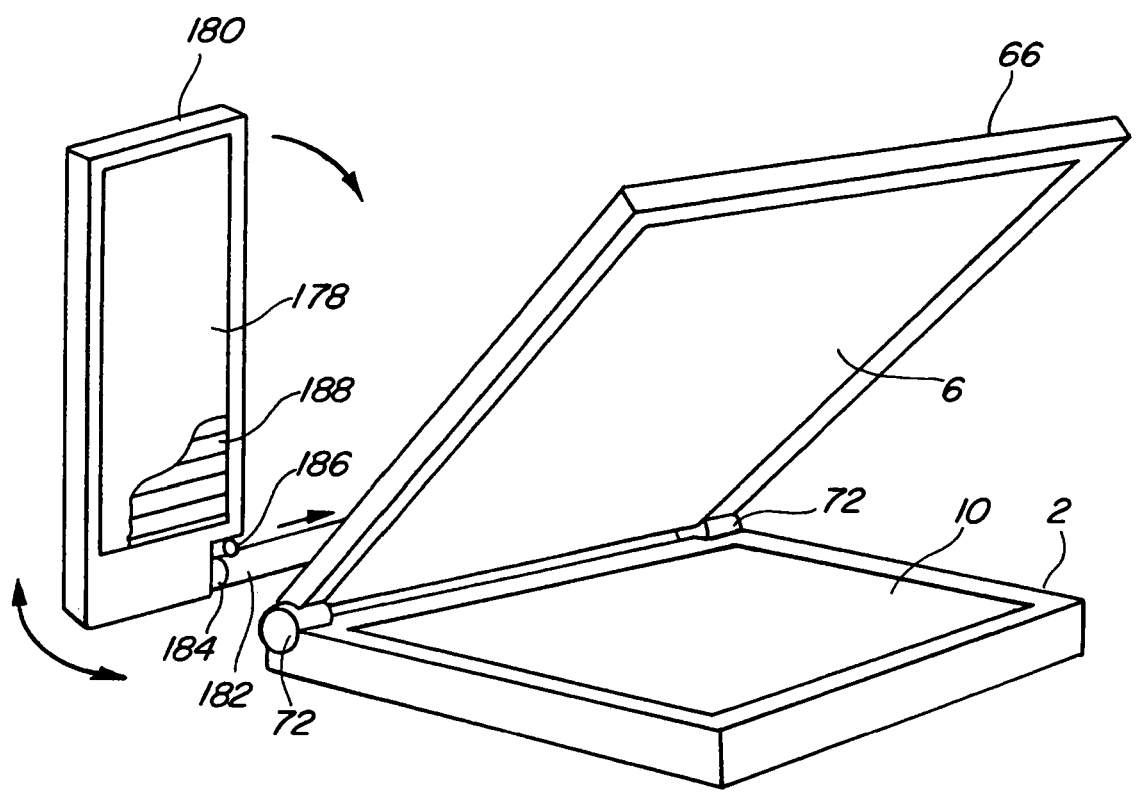
FIG. 33 illustrates an adjustable light source as a part of the terminal configuration.

Another embodiment provides illumination of the conferee 82 by an adjustable light system that is fixedly attached to the various configurations of the present invention. A light 178 in light housing 180 is fixedly attached to the back of the beamsplitter terminal section 66 by a retracting light stem 182 which retracts into a housing section (not shown) designed to hold the light stem 182 in a closed or pulled out mode as seen in FIG. 33. In the closed position, the light 178 rests upon the back of the beamsplitter terminal section and is locked in place by a latch for portable use (all not shown). A light pivot 184 permits the light housing 180 to tilt forward and backward and a light swivel 186 permits the light housing 180 to pan right and left. A full degree of adjustable direction will permit the light to be aimed by the conferee for optimum illumination. An additional retracting light on the right and above the beamsplitter terminal section 66, with same degree of tilt and pan, will add even more illumination choices for conferee 82. Likewise retractable lighting systems can be attached to the display 2 or the base 62 or the terminal extension post 64 as seen in FIG. 18 (not shown). Lighting is preferably a dimmable and color corrected florescent source. Florescent is preferred because it emits a minimal amount of heat and the light is contained in a wider area than a spotlight. This is important because a spotlight can cause a great deal of visual irritation and distraction when looking at the reflection of display 2 on the beamsplitter 6. A soft bank of light, such as that of light 178, on the other hand, will not cause the same visual irritation and distraction. A directable light louver 188, of any type, may be added to the front of the light 180 to focus the light upon the conferee and prevent light from washing out the display 2. Other filters, such as diffusion filters and holographic filters, may, as well, improve overall illumination options and performance.

Figure 34:
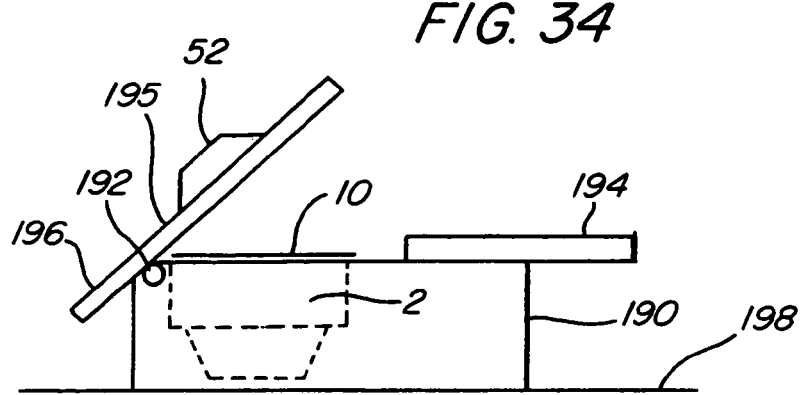
FIG. 34 illustrates a conference table incorporating the present invention.

Another unique embodiment of the present invention is to utilize on actual table or desk serving two modes of use. The first mode is as a common working surface 195. The second is as an eye contact teleconferencing device where the common working surface 195 is tilted upward with a beamsplitter attached to opposite side and exposing the display 2. FIG. 34 illustrates a tiltable conference table top 196 when in a closed position seamlessly integrates with a permanent conference table top 194. On the opposite side of the tiltable conference table top 196 is attached the beamsplitter 6 (not shown). The tiltable conference table top 196 is tilted by a stiff spring hinge 192 holding it in the desired angle. The entire table is supported by a support structure 190 which also conceals display 2 and rests on a floor 198. With this configuration many conferees can be seated at one end of the conference table and all interact with the reflected display 2 on the beamsplitter 6. Camera housing 52 is optional and the current configuration can include camera options discussed in this specification as well as any other mounting methods.

Figure 35:
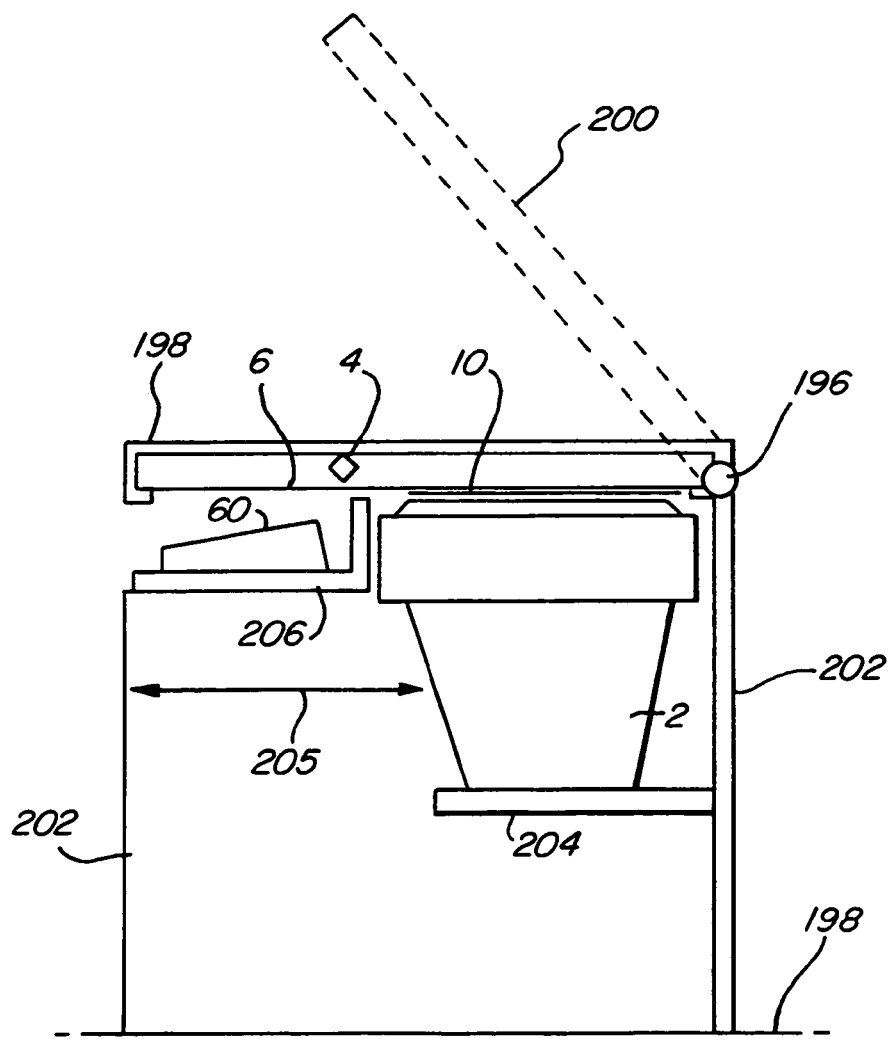
FIG. 35 illustrates a desk incorporating the present invention.

FIG. 35 illustrates a cutaway view of a further embodiment of the present invention in a common desk. A desk wall construction 202 supports display 2 on a display ledge 204 and keyboard ledge 206. A desk top section 198 serves as a common working surface but when tilted up to a position 200 exposes camera 4, beamsplitter 6, display 2 and the keyboard interface 60. A designated leg room area 205 permits the display 2 to be a typical bulky CRT or rear projection device.

Figure 36:
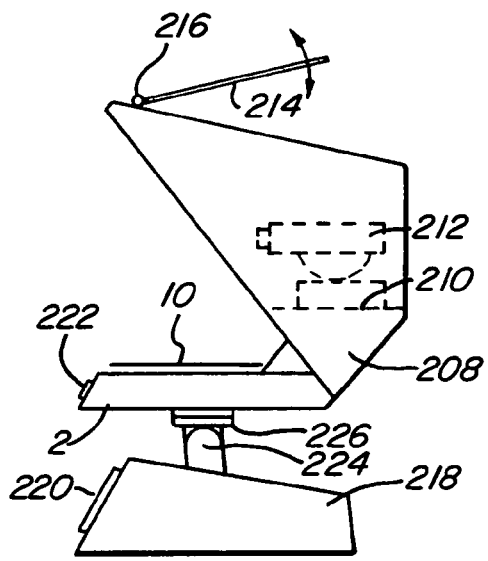
FIG. 36 illustrates a terminal configuration with a versatile camera housing.

Another embodiment of the present invention includes the incorporation into a single terminal of various support components for enabling a complete videoconferencing experience. FIG. 36 illustrates a terminal base 218 which includes speakers (not shown), speaker grill, and enough room for system electronics including transformers. Attached to the base is a component pivot 224 and a component swivel 226 which permits the display above to pan and tilt with a wide selection of positioning choices. A microphone 222 is built into the front face of display 2. Also attached to display 2 is a versatile camera housing holding the beamsplitter 6 in the appropriate angle (not shown). The versatile camera housing 208 includes camera mounting ledge 210. A camera access door 214 is attached by a camera door hinge 216 to the versatile camera housing 208. A remote controlled pan/tilt camera 212 is mounted upon the ledge 210, but numerous other consumer and professional video cameras with both digital and analog outputs can be mounted onto the camera mounting ledge 210.

Figure 37:
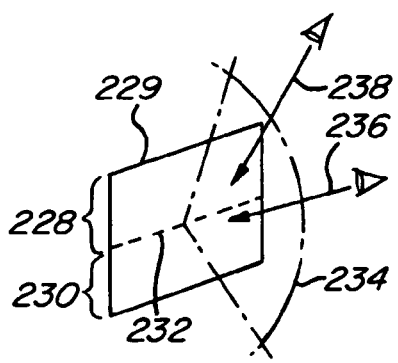
FIG. 37 illustrates the preferred vertical viewing angle of a display as it relates to the present invention.

FIG. 37 illustrates the vertical viewing angle of a sample image display 229. The sample image display 229 is divided into two parts forming a top section 228 and a bottom section 230 dividing the sample image display 229 with a top and bottom division line 232. The top section 228 is that portion of the sample image display 229 closest to the conferee 82 (for visual reference nearest the microphone 222 of FIG. 36). The sample image display 229 will permit a view of its image when a user is parallel to the display looking straight on at it as illustrated by a straight on viewing line 236. However, when viewed from an oblique angle from the top side, defined here as an oblique top side angle 238, the sample image display will be obscured from viewing. As described and illustrated, image blocking film can consist of several materials that either diffuses the visible luminous image or nearly or completely "shuts off" the image from the an oblique top side angle 238 and thereby eliminate the distraction of seeing the two images simultaneously.

Figure 38:
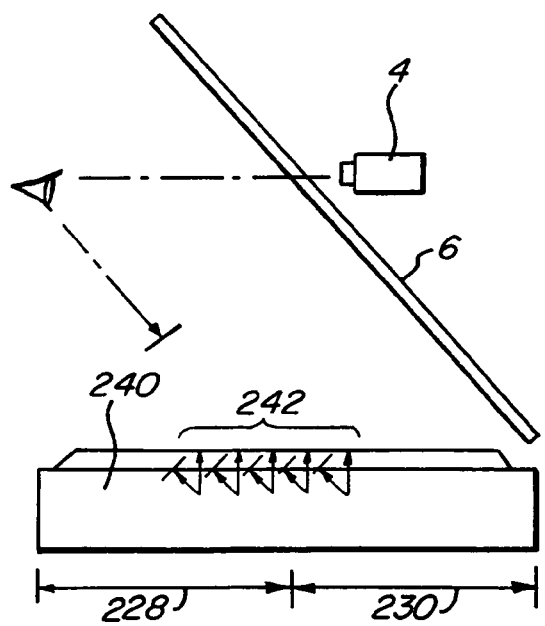
FIG. 38 illustrates a display which is constructed to image block when viewed from an oblique angle.

FIG. 38 illustrates a further embodiment of the present invention of which an image blocking property is integrally constructed into the display technology. An image blocking display 240 is integrally constructed with a specified image blocking property as seen in example section 242. The luminous image is reflected by the beamsplitter 6, yet from the oblique top side angle 238 the luminous image has become obscured either by the appearance of becoming diffused or eliminating nearly all the luminous image. Liquid crystal structures are typically designed with criteria for the maximum horizontal and vertical viewing angle. A specific liquid crystal display construction will permit the required image obscuring from the oblique top side angle 238. Those skilled in the art will understand the peculiar image blocking requirement of the present invention and can adjust display construction techniques, whether it be liquid crystal or some other form of display, to satisfy that requirement.

Figure 39:
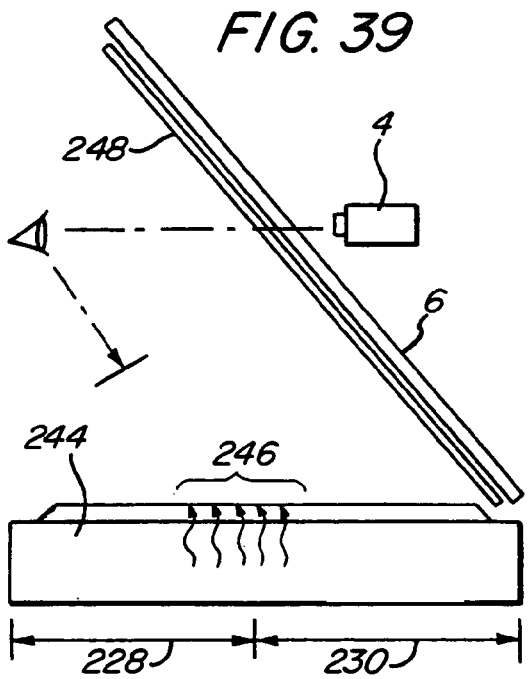
FIG. 39 illustrates a display that requires a remote polarizer to form a completed image.

FIG. 39 illustrates an alternate embodiment of which an incomplete polarization of a liquid crystal display is utilized creating an incomplete image display 244. An example, portion 246 shows an incomplete image formed by the incomplete image display 244. The incomplete image display will appear luminous yet with a subtle ghost image that may not be considered a distraction while utilizing the reflected image on beamsplitter 6. A remote polarizer 248 is positioned either in front or in back of the beamsplitter 6 or can be integral to the optical coating on the beamsplitter 6. The introduction of the remote polarizer 248 completes the image formation process. Hence, the beamsplitter 6, or at least a layer in front of beamsplitter 6, serves as an extension of the display with the addition of the remote polarizer.

The beamsplitter 6, even when constructed for typical consumer use is much safer than a cathode ray tube under vacuum pressure. As with all display and electronic products, care should be given to preserve all the components. A very unusual requirement to "ruggedize" the beamsplitter 6 for military use can be achieved either through the methods of heat tempering and/or chemical strengthening processes. Remote camera zooming systems, as well, are necessary if the consumer desires not to reach behind the beamsplitter 6 to manually change the zoom on the camera 4. Remote pan/tilt and zoom may all be conducted by the conferee at the distant site for such applications as medical conferencing. The display 2 may, in all the embodiments and configurations of the present invention, be a 3-D display. The beamsplitter 6 is constructed out of any material including plastics.

Figure 40:
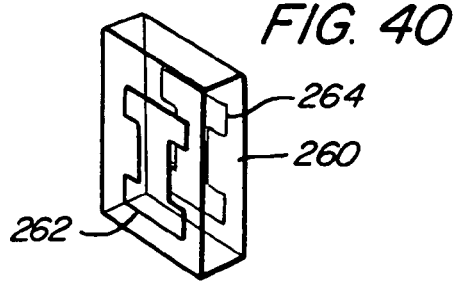
FIG. 40 illustrates a beamsplitter with an undesirable double image.
Figure 41:
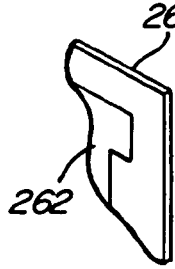
FIG. 41 illustrates a beamsplitter that has been chemically hardened to reduce the thickness of the beamsplitter and thereby reduce the double image.

It is a further embodiment of the present invention is to custom fabricate the beamsplitter 6 so that it will substantially reduce a reflected double image on the back side of the beamsplitter opposite the image display 2. FIG. 40 illustrates a common beamsplitter 260 with a sample reflected icon 262 reflected from the image display 2. A reflected double image 264 is seen on the opposite side of the common beamsplitter 260. The reflected double image 264 becomes more apparent as the common beamsplitter 260 glass substrate increases in thickness. For example, the reflected double image 264 would be more noticeable with ¼ inch thick glass than with ⅛ inch thick glass. This reflected double image 264 is a great irritant when viewing an image on beamsplitter 260 for close up computer use such as word processing or industrial graphic design. Even with highly sophisticated antireflective coatings applied to the common beamsplitter 260 the reflected double image 264 may still be apparent to the viewer. FIG. 41 illustrates the use of a chemically hardened glass beamsplitter 266. Through the processes of chemically hardening a glass substrate a beamsplitter can be reduced in its thickness substantially and thereby substantially reduce and even eliminate the reflected double image 264. For example, the strength of a ¼ inch thick piece of glass could be approximately equal in strength to a 1/16 inch thick chemically hardened piece of glass. This technology, when deployed in all embodiments and configurations of the present invention, substantially eliminates the irritant of seeing the reflected double image 264.

Figure 42:
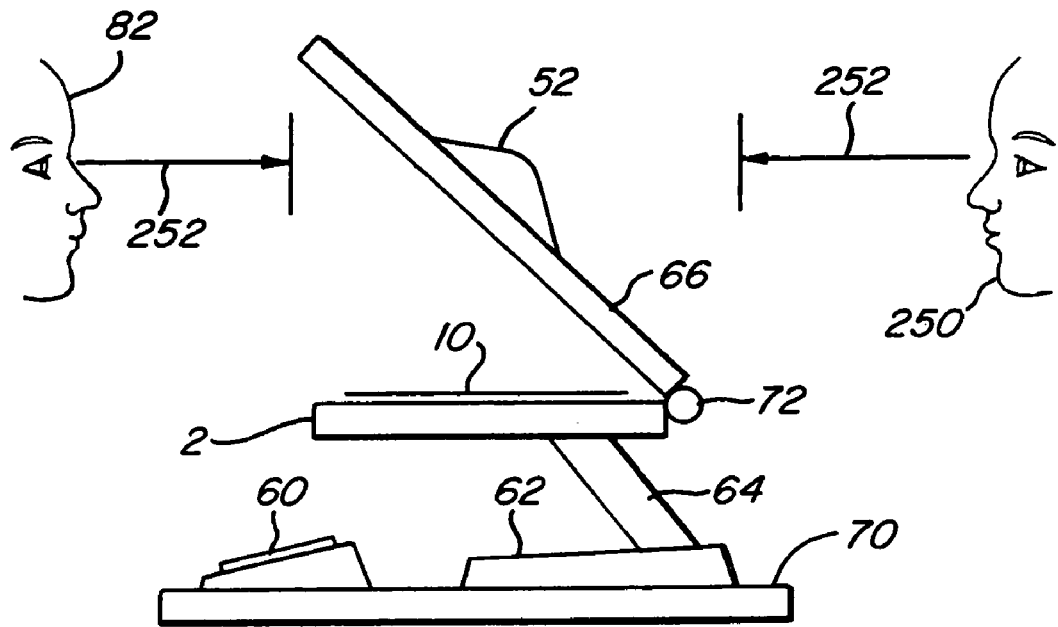
FIG. 42 illustrates the inability to converse with a person seated at the opposite side of the desk.
Figure 43:
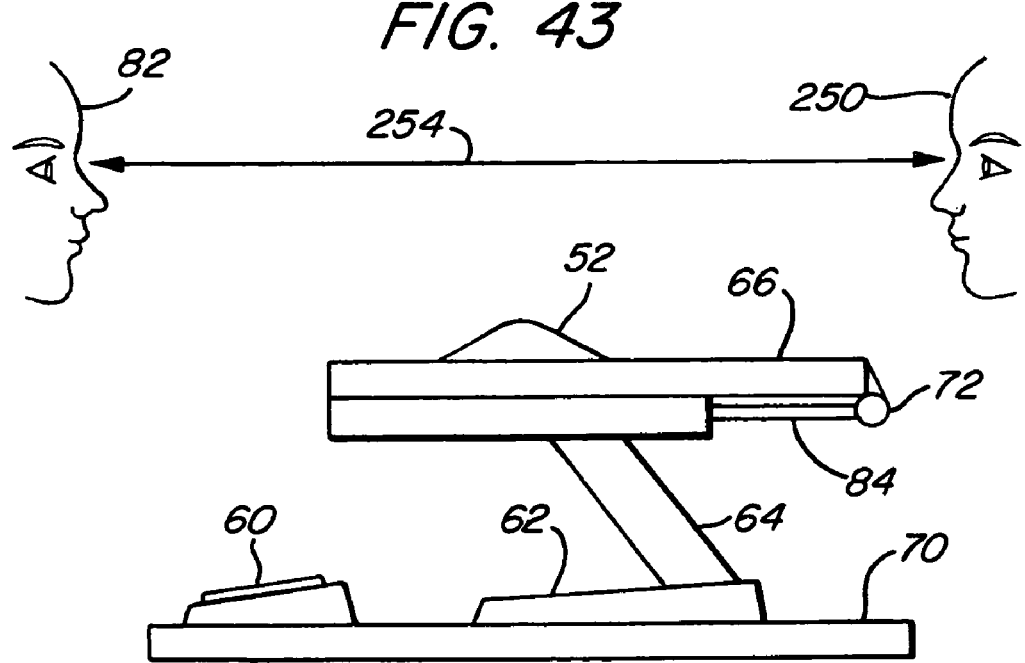
FIG. 43 illustrates the present invention with a foldable section to permit conversation from one side of the desk to the other.

FIG. 42 illustrates the present invention open in use by the conferee 82. While ideal for eye contact videoconferencing the conferee cannot see through to other side of desk to converse to others who may be present. An obstructed sight line 252 is experienced by both the conferee 82 and an office guest 250. Certainly the embodiments of the present invention resolve this problem by enabling the beamsplitter terminal section 66 to fold down upon the display 2. FIG. 43 illustrates the beamsplitter terminal section 66 folded down permitting the conferee 82 and the guest 250 to have a sight line 254 of each other. Alternatively or in conjunction with this fold down feature, the present invention is intended, as well, to allow the conferee 82 to look through and beyond the beamsplitter 6 to the guest 250 maintaining the sight line 254 as seen in FIG. 44. Unfortunately, contrast of the image reflected by the beamsplitter 6 is minimal since there is not an opaque black background.

A shuttering system is preferred for many applications so that the conferee need not go through the physical movement of lowering the beamsplitter 6 and the beamsplitter terminal section 66. FIG. 45 illustrates an LCD shutter or similar electrical responsive material that can, at the touch of a button, switch from a clear mode to an opaque mode. Electrical source 258 applies necessary voltage to a responsive substrate 256 for mode selection. FIG. 46 illustrates a fluid shutter which utilizes non-mixing fluids in which a fluid 262 is clear and a fluid 260 is opaque. The fluids are wedged between the beamsplitter 6 and a clear substrate 264. A fluid chamber 270 contains an opaque fluid section 276 and a clear fluid section 278. The sections are separated by a movable baffle 274 connected to thumb slide 272. By moving the thumb slide 272 either the opaque fluid 260 retracts or regains forming a contrast background. Tubes 266 and 268 deliver the fluids from the fluid chamber 270.

A solid opaque substrate 280 as seen in FIG. 47 can as well be deployed in numerous methods. For example black material can roll up on a spindle 282 and repositioned by a push knob 284. Venetian type blinds can be utilized or the solid opaque substrate 280 can simply snap on and off. An arrangement of polarizers can as well be utilized for a switchable clear and opaque mode. FIG. 48 illustrates a contrast polarizer 283 and a second contrast polarizer 281 which can be spun from a clear mode to an opaque mode. Circular polarizers or lenticular polarizers can be utilized as well to achieve the same functional outcome. A hole 279 in FIGS. 47 and 48 is provided so that the camera has an unobstructed view through the beamsplitter 6. FIG. 49 illustrates an embodiment of the present invention similar to that seen in FIG. 39. Here the remote polarizer 248 is actually separate from the beamsplitter 6 and can be worn by the conferee as glasses. An incomplete image display 244 with a removed polarizer from an LCD panel, for example, will not form an image. It is well known in the art that polarized glasses will form a picture and have been used as a privacy filter for computer displays. It is completely unique to this invention that the actual image is transparent and see-through unless polarized glasses are used. The application of this invention extends far beyond eye contact videoconferencing and can be used as a unique display system without a camera. For example, such a display system of FIG. 49 could be used as a control panel visible only to the operator of a vehicle and not to passengers even though both are looking through the same vehicle window.

FIG. 50 illustrates another embodiment of the present invention in which a beamsplitter terminal section 66 or at minimum the beamsplitter 6 can be stored opposite the portable display 270 in a compartment 285 by a slide post 287. The portable display 270 connects to the portable keyboard section 272 by a portable computer hinge 274. Other storing methods may be utilized as well as a part or separate from the portable computer. FIG. 51 illustrates a separate beamsplitter 6 or likewise beamsplitter terminal section 66 (not shown) so that a portable computer can be used in a reflected mode for eye contact videoconferencing. Hence the desktop device may remain on the desk while the consumer can use the portable computer in other environments. The camera 4 contained in camera housing 52 may detach and store or connect directly to the portable computer (not shown). The separate beamsplitter 6 in FIG. 51 is connected by a first pivoting hinge 282, a second pivoting hinge 278 a height arm and thin stand 276. In concert, they can position the beamsplitter 6 at various heights and enable various tilting angles. Portable display 270 can as well be detached and elevated to an adjustable canopy position 284.

FIGS. 50 and 51 are utilized in the same direct view mode and reflected view mode as described for FIGS. 22 and 23. Image compensation as described is essentially converting the image for either direct viewing or reflected viewing. The portable computer in FIG. 52 is equipped for videoconferencing including the speaker 55 and a microphone 273. The direct view image 288 is standard in all consumer display products. The present invention requires an additional image display capability as seen in FIG. 53. Here the conferee has selected with an image switch 286 a converted image 290 for viewing upon the reflection on the beamsplitter 6 as seen in FIGS. 50 and 51. Instead of the image switch 286, the image conversion can occur automatically when tilting the portable display 270 backward or image conversion can be engaged through software. Any method for image conversion is applicable to the present invention including manipulation of the image signal by software, hardware, including a video/graphics board, or any combination thereof. Also image conversion can be achieved by changing signal wires and changing a display's circuitry. Image conversion as well can be achieved by using a second mirror in an optical arrangement so that the reflected image on the beamsplitter 6 can be viewed correctly. Another novel method of image converting can be seen FIG. 54 where a transmissive display 292, such as an AMLCD, can be removed from a backlight 271 and flipped over setting back on top of the backlight 271. A flipping support arm 294 and flip pivot hinges 296 are used optionally to support the transmissive display 292 as it is turned over.

Figure 55:
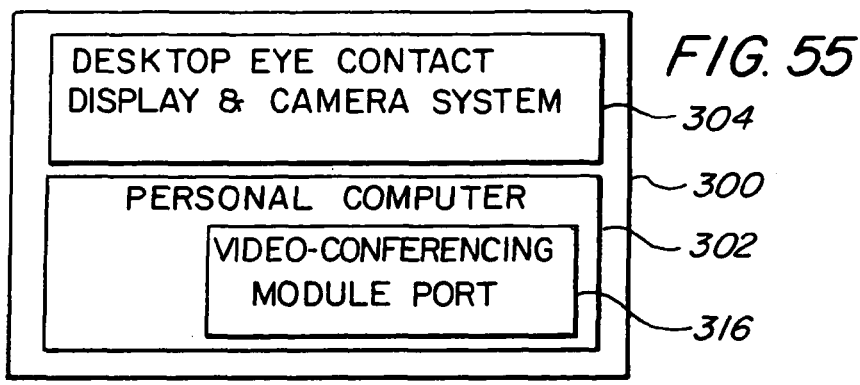
FIG. 55 illustrates a block diagram of an integrated eye contact computer with a module port.

A primary embodiment of the present invention is a creation of a single desktop system designed around the parameters of high quality video production for effective communication which includes eye contact and computer system flexible enough to adapt to changing transmission systems. Videoconferencing is as good as the bandwidth pipe and compression it utilizes. Ideally videoconferencing is experienced real-time with no lag between audio and video and the image looks as good as television. The consumer is wary of an investment in a technology that may be obsolete within a year. FIG. 55 illustrates a block diagram of the present invention of an integrated eye contact computer 300 which functionally incorporates a personal computer 302 with a videoconferencing module port 316 and a desktop eye contact display and camera system 304. The module port 316 permits quick replacement of the videoconferencing system by the consumer.

Figure 56:
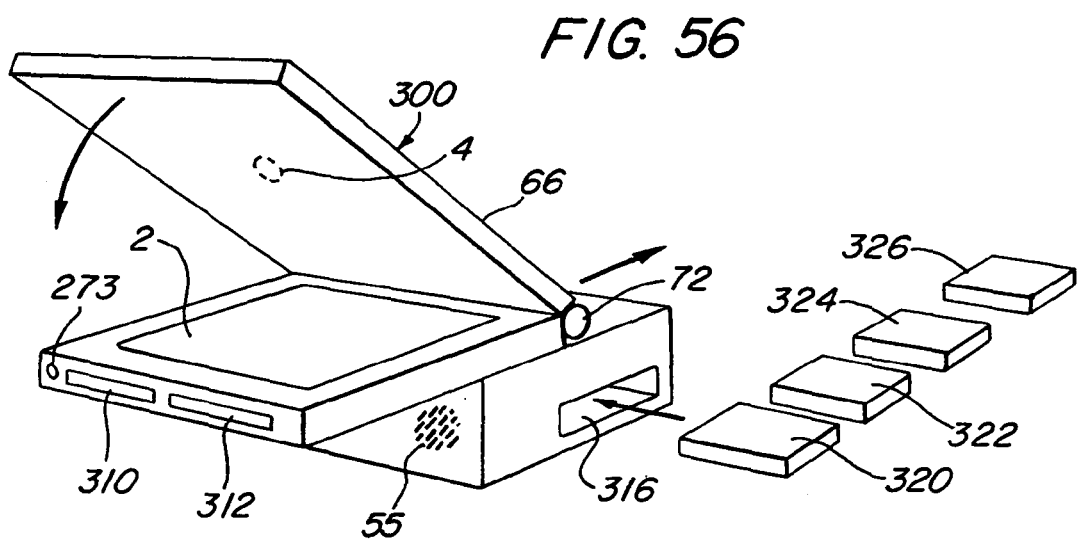
FIG. 56 illustrates an integrated eye contact computer With replaceable modules.

FIG. 56 illustrates an integrated eye contact computer 300 that incorporates a fully functioning personal computer for processing, storing, and transferring data, and a display 2 with beamsplitter terminal section 66 for eye contact videoconferencing. The integrated eye contact computer as well includes the videoconferencing module port 316 so that the consumer can utilize the latest transmission system and readily exchange a "LAN module" 320, for a "128 module" 322, or a "384 module" 324, or a "T1 module" 326. The modules described are for specific transmission systems, however a single module may contain one or more compression and/or connection methods which include any and all proprietary and public videoconferencing transmission systems including data and analog systems. It may include as well an accelerator for a software based videoconferencing system such as Microsoft Corporation's Net Meeting™.

Figure 57:
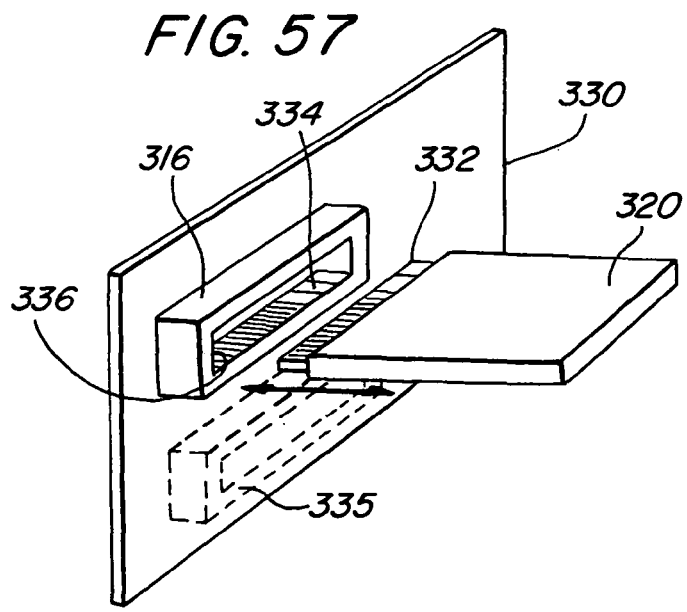
FIG. 57 illustrates a back plane with a fabricated module port.

The videoconferencing module port 316 permits the integrated eye contact computer to be flexible enough to adapt to new videoconferencing systems including wireless. Also, the videoconferencing module port 316 permits the consumer to quickly exchange modules for different types of connections. The videoconferencing module port 316 is attached to a back plane 330 and includes contact connections 334 which receive the LAN module 320 contact connections as seen in FIG. 57. Of course a module of any specific videoconferencing system is applicable. While PCI or ISA slots accessible from inside an integrated eye contact computer housing 308 may suffice, it is specifically illustrated that the videoconferencing module port 316 be accessible from the exterior of the integrated eye contact computer housing 308 for ease of use by the consumer. Preferably the modules are compact in size and encased in a plastic shell for ease of portability. An additional videoconferencing module port 335 may also be included so that each module may have dedicated functions such as one module used for multiplexing phone lines while another for data/image compression.

Figure 58:
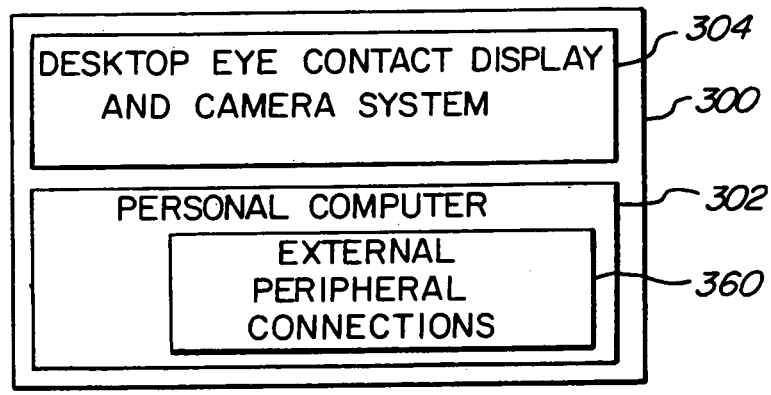
FIG. 58 illustrates a block diagram of an integrated eye contact computer that serves both as a single user desktop system and as a group conferencing system.

The integrated eye contact computer 300 is configured specifically to enable the highest quality single user videoconferencing experience in a single fully integrated device. The unique features of this device including the folding beamsplitter section 66 and the inclusion of computer for videoconferencing applications also enables this single device to be used for group conferencing. For example, a consumer may utilize the integrated eye contact computer 300 as his sole desktop computer but may also desire, at times, to conduct group videoconferencing. Instead of the consumer being forced to acquire two complete systems, the present invention is essentially two systems in one. The display 2 is generally too small to conduct such group sessions. A block diagram seen in FIG. 58 illustrates this multi-application device explained here as the integrated eye contact computer 300 which includes a desktop eye contact display and camera system 304, a fully functional personal computer 302 and a peripheral connections 360.

Figure 59:
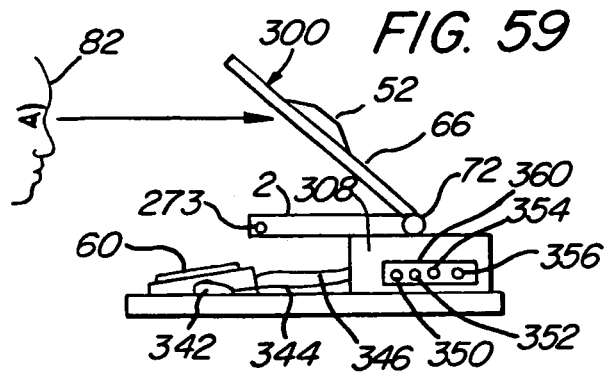
FIG. 59 illustrates an integrated eye contact computer with peripheral connection used in a single user mode.

FIG. 59 illustrates the present invention in a typical single user form factor and includes the peripheral connections 360. A mouse 342 and the keyboard 60 are connected to the integrated eye contact computer 300 by a mouse line 344 and a keyboard line 346. The inclusion of the peripheral connections 360 with an external microphone connection 352, an external speaker connection 356, an external camera connection 354, and an external monitor connection 350 all permit group conferencing with peripheral components. The integrated eye contact computer 300 is small enough to be portable so that the consumer can quickly remove it from a desk space and set up in a group space. A battery pack can also be included for additional portability.

Figure 60:
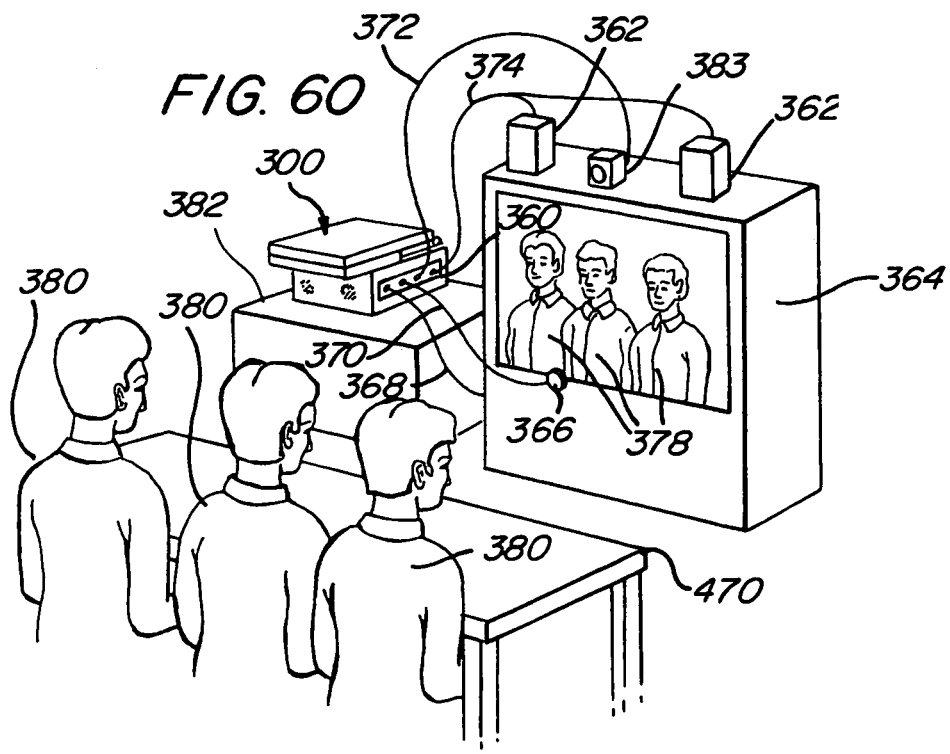
FIG. 60 illustrates an integrated eye contact computer with peripheral connections used for group videoconferencing.

FIG. 60 illustrates the integrated eye contact computer 300 with the peripheral connections 360 utilized in group conferencing mode. Local conference participants 380 observe distant conference participants 378 on a large screen display 364. An external microphone 366, an external speaker 362, and an external camera 383, and the large screen 364 are all connected to the integrated eye contact computer 300 for operation during the videoconference. The distant participants may as well have the same computer or may have a traditional group system. A speaker line 374, a camera line 372, a monitor line 368, and a microphone line 370 connect the peripherals with the integrated eye contact computer 300. The integrated eye contact computer 300 is shown resting on a side table 382 but may be on the group table 470 and used during the group conference to control aspects of the conference such as document sharing or multipoint applications. In such a case the display 2 may display an image different than what is seen on the large screen display 364. The peripheral connection 360 may also be in part or entirely wireless to avoid laying out cable.

FIG. 61 illustrates the same positional function as described in FIG. 20 which is incorporated into the integrated eye contact computer 300. FIG. 62 illustrates an alternate positioning system that deploys a horizontal track 384 which permits the display 2 to slide back along with the beamsplitter terminal section 66 so that neither overhangs the keyboard 60 and the essential work area 78 as seen in FIG. 63. The beamsplitter terminal section 66 and the display 2 when integrated into variations of the integrated eye contact computer 300 can slide back as seen in FIG. 64. FIG. 65 is essentially the same as FIG. 24 and further illustrates the display 2 and the beamsplitter terminal section 66 folded upon one another and parallel to the conferee opening up the essential work area 78. In this embodiment the display 2 and the beamsplitter terminal section are on a vertical track 386 so they can be lowered.

A significant aspect of the present invention is to create in one device a complete production studio on the desktop in the same space commonly utilized by the consumer for a personal computer. The integrated eye contact computer 300 is also applicable to other inferior, yet still relevant, eye contact display systems. These display systems as well benefit from an integrated approach that incorporates a personal computer with, as it relates to the present invention, a module port 316 for receiving videoconferencing modules as described and also configured with peripheral connections so that the terminal can be used for two modes: 1) A self contained single user mode, and 2) a group conferencing mode requiring additional components including an external microphone 366, external speakers 362, and a large screen display 364, and an external camera 383.

FIG. 66 illustrates the present invention of an integrated eye contact computer 300 with an eye contact transmissive display 390 in which an eye contact image is captured through the display 390 by the camera 4. Refinements to this fundamental eye contact system are all applicable. FIG. 67 illustrates a rear projection eye contact system of which a projection screen 394 is both transmissive for capturing eye contact images and also diffused for dispersing a projected image from a projector 392. This rear projection system can be configured as a consumer rear projection TV that is both analog and digital. FIG. 68 illustrates a camera view reflection eye contact arrangement with an ambient light shield 396 and a second ambient light shield 398. These fundamental eye contact technologies and their various refinements of FIGS.

66, 67, and 68, as well as other eye contact technologies, such as animating the direction of the eyes in real-time, benefits from the present inventions embodiments. This includes the videoconferencing module port 316 as well as the dual mode configuration as a single user terminal and a group videoconferencing system utilizing peripheral connections 340.

Figure 69:
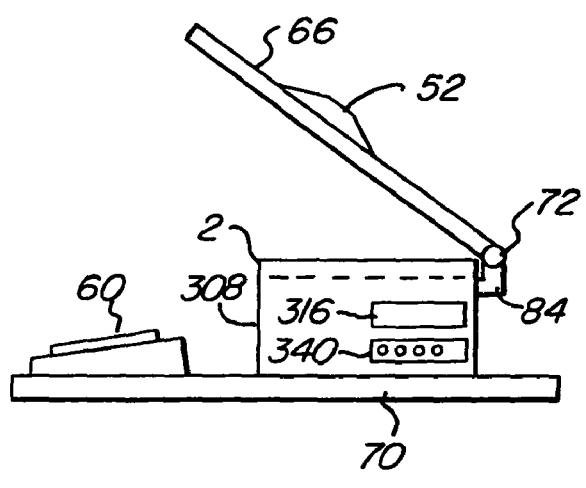
FIG. 69 illustrates a display built as a part of a personal computer and not forming a canopy over the desktop.
Figure 70:
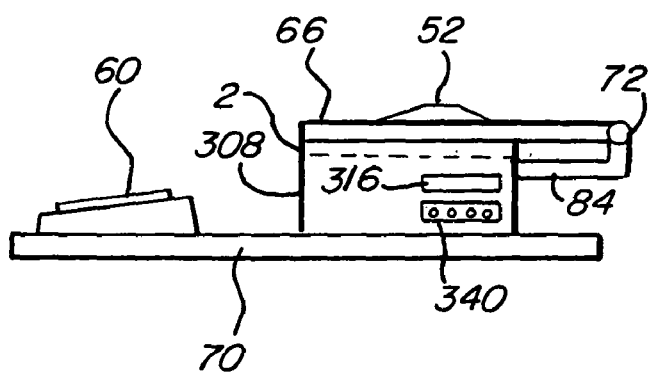
FIG. 70 illustrates a beamsplitter positioned away from a keyboard area when closed.
Figure 72:
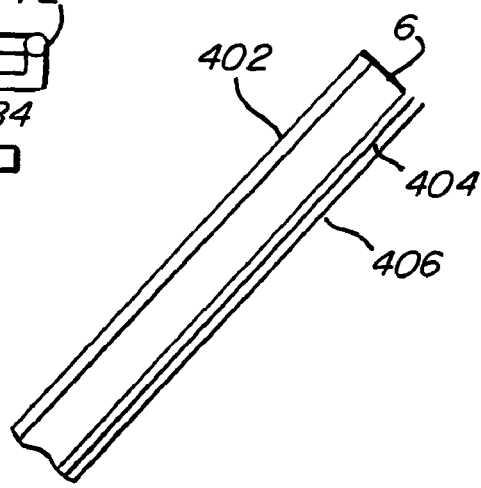
FIG. 72 illustrates an antireflective coating and a hard coat to protect the reflective coating.

FIG. 69 illustrates another configuration of the present invention where the display 2 is built into the integrated eye contact computer housing 300. In this configuration, the display 2 faces upward but it does not form a canopy over the desktop. The beamsplitter terminal section 66 when folded down will still cover the keyboard 60. FIG. 70 illustrates the embodiment of FIG. 69 where the beamsplitter terminal section 66 is positioned rearward as described for FIG. 20.

Figure 71:
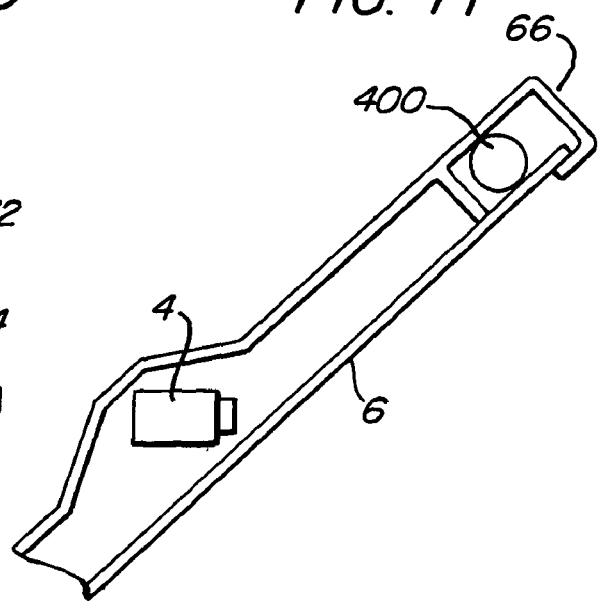
FIG. 71 illustrates a light concealed behind the beamsplitter.

FIG. 71 illustrates a concealed light behind the beamsplitter 6. Thin tube light 400 is preferably a dimmable color corrected florescent tube for illuminating the conferee. Certainly as consumers become accustomed to an integrated eye contact computer 300 additional video production elements can be included such as blue screens and other real-time visual effects.

A further embodiment of the present invention is the addition of a hard coat 406, such as clear polymer that is coated directly over the beamsplitter coating 404. In consumer applications, the durability of the beamsplitter coating 404 is of great importance. Many high-quality metallic coatings cannot withstand rubbing and scratch tests. The hard coat 406 assures extended life of the beamsplitter 6. On the rear side of the beamsplitter 6, an anti-reflective coating may be optionally deployed to reduce unwanted reflections. Likewise, the hard coat 406 can be layered on top of the anti-reflective coating 402 for protection (not shown).

Often while document sharing during a videoconference, the window displaying the remote conferee is reduced in size and moved to a corner of the image. Repositioning manually the camera into preselected sections in a supporting housing will serve adequately to maintain eye contact. Also elaborate camera movement systems can be used to relocate the camera to various positions behind the beamsplitter.

Various mechanisms have been explored for camera positioning and camera aiming. Motorized positioning and aiming systems have been developed to allow remote control of the camera. Also, auto-tracking systems permit the camera to follow the conferee as he or she moves about. The camera 4 can also be attached directly to the beamsplitter 6. When mounting the camera 4 to the beamsplitter 6 as seen in FIG. 12, the camera 4 aiming direction can operate independent of the positioning of the beamsplitter 6 such as in FIG. 11. Camera 4 can also be mounted in a position not directly behind the beamsplitter 6. In such a case mirrors or an image conduit can redirect the image passing through the beamsplitter 6 to the camera 4.

Additional teleconferencing components may be included as desired in terminals configured with the present invention. The camera 4 can be configured as a small detachable camcorder and thereby add the economy of serving multiple purposes. The camera 4 may, as well, be configured with remote controls. Lights can also be added as desired to enhance image capture quality. Lights may also be placed behind the beamsplitter 6 so long as they do not interfere with the display 2 image reflection. Microphones can be integrated into various terminal configurations with the present invention. Like the speakers 55 the microphones can advantageously aimed so that sound bounces off the beamsplitter 6. The addition of optical coatings, such as CRT radiation reduction filters, color filters and contrasts, and glare guard technologies, may be added as well. Also, 3 D displays and Fresnel lenses that expand the size of the display image will readily integrate with this invention. Other modifications will be apparent as new tele¬con¬fer¬encing, video camera, computer, and display technology transforms during this time of global telecommunication transition.

Of course, the teleconferencing terminal used as part of the current invention can be, and preferably is, a multipurpose personal computer running a graphical interface program such as Windows 95®. Therefore, the graphical interface can be used to place calls, select views, etc. That is, if a conference call is undertaken between several conferees, the various conferees can be displayed in separate windows on the screen. One particular conferee can be selected to occupy the entire display 2 by choosing the conferee's window using a keyboard, a mouse, a touch screen, or similar user input means.

Figure 73:
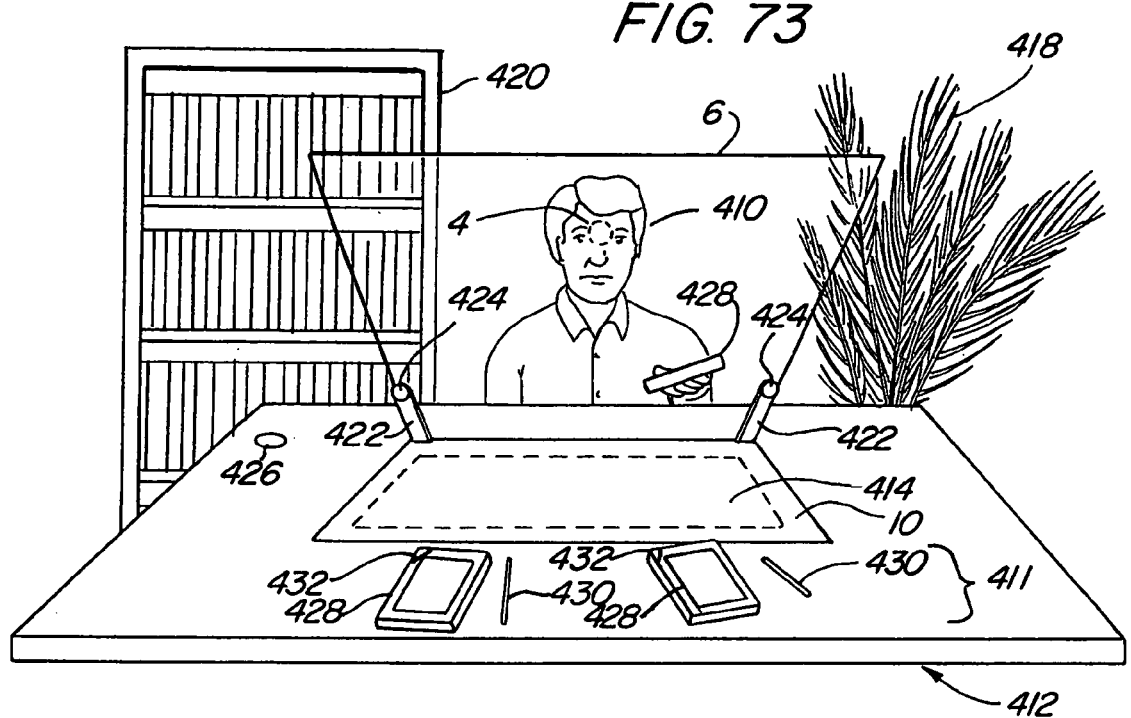
FIG. 73 illustrates the present invention built into a table surface and in a room environment.

FIG. 73 illustrates the present invention demonstrating the appearance of an imaged conferee 410 seen as a reflection of an image bearing screen 414 of display 2 (display 2 not shown since it is embedded in a constructed table 412). The eye contact camera 4 is mounted behind the beamsplitter 6 for capturing eye contact images as described previously. The beamsplitter 6 is supported by a pair of angle supports 422. As described in the original parent U.S. Pat. No. 5,777,665 of this continuation-in-part, the eye contact display is built into a piece of furniture (Col. 5 lines 44-50) and creating the appearance of a floating beamsplitter (Col. 5 lines 44-47). The entire terminal appears to be a clear piece of glass (beamsplitter 6) that is see-through. An advantage of this see-through property is that the environment behind the beamsplitter 6 can be seen, such as a bookshelf 420 and a plant 418. Also, a back edge 416 of the table 412 can be seen through the beamsplitter 6. The back edge 416 and other objects in the environment serves to assist as visual references so that an imaged conferee 410 can be clearly placed and associated within the environment. The impression originally created with the present invention is that of true "virtual presence" where a person can appear to sit on the other side of the desk in the same environment, such as a group conferencing room or office. Likewise, the same effect is observable with this invention when people are sitting around a meeting table. Ultimately, virtual presence simulates natural conversational arrangements involving two or more remotely located people that appear to be sharing the actual space of each conferee. Typical conversational arrangements are, most usually, around a table or over a desk. Other conversational arrangements, such as two or more people conversing while standing, can be simulated in virtual presence using the present invention. Virtual presence requires, to be effective, the see-through aspect of the present invention and consideration of eye contact, cultural distance while conversing, and life-size imaged conferees. Also sound that seems to be generated directly from the imaged conferee's 410 mouth helps in creating this experience of presence (see FIG. 14).

Common to teleconferencing is the use of two displays in which one is used for video and the other for data collaboration, PowerPoint presentations, recorded video and other media content. Commonly these displays are placed next to each other so the conferees are confused when watching the imaged conferee 410 and other imaged conferees (not shown) because they are uncertain if the imaged conferee 410 is looking at their conferencing screen or at the other media screen. FIG. 73 teaches the use of a novel system that uses a media displays 428 in a working zone 411 so that each conferee may look down at the media displays 428 then look up to make eye contact while conferencing by looking into camera 4. The experience is as if conferees are sitting at a table and naturally look down at notes then up to make interpersonal connection with eye contact. The media displays 428 can be interactive with a stylus 430 or any other data input technology. The media displays 428 (as seen in FIG. 73) are configured as potable handheld tablet PCs—one for each local conferee (conferees not shown) and the imaged conferee 410. The media displays 428 have an optional wireless emitter 432 and a second emitter 426 located on the table which is then connected to related computer, media and/or teleconferencing equipment. Optionally other displays, such as notebook and PDA displays, can be used as the media display 428 or in concert with the media display 428. These other displays would then be outfitted with sensors and collaborative software.

Another aspect of virtual presence is that the imaged conferee 410 can be seen life-size which aids further in eliminating distracting elements that are unnatural to everyday conversation, such as speaking to images of people that are, for example, 50% smaller-than-life. In the parent U.S. Pat. No. 5,777,665 life-size imaged conferees is presented as an option that enhances the conferencing experience (Col. 6 lines 60-65) and large displays to produce life-size conferees are also presented (Col. 5 lines 39-43). Of course, any aspect of the present invention can be designed to image smaller-than-life and larger-than-life conferees. For example, a see-though display may be constructed with a 15" flat panel which will image a smaller-than-life person. For many applications, such as PC monitors and videophones, a large display may not be practical. However, the see-through aspect of the present invention will afford a much greater sense of virtual presence than a common display. Also, smaller terminals can be configured to display the imaged conferee 410 within and among visual references of the environment as if the person (though smaller-than-life) is sitting on the other side of the desk and amongst common room objects for associating the placement of the image of the imaged conferee 410. Variations in terminal designs of the see-through aspect of the present invention can be seen in the FIGS. 6-9 of the parent U.S. Pat. No. 5,777,665 and also in the original text.

The constructed table 412 may be any type of common furniture from desks, side tables, boardroom tables, any shaped table and desks, folding tables and desks, cubical systems, credenzas, and the like and kiosks. The present invention can be built in or placed on top of any appropriate furniture. The present invention can also be in its own roll-about housing or other custom made housing. The present invention can, as well, have its various components, such as the display 2 and the beamsplitter 6, custom fitted into a room or a room can be designed specifically around the present invention with separated components.

Sensors 422 (FIG. 73) are optionally included to serve a variety of functions. The sensors can be used to track the movement of the conferee and the camera adjusts to the movement real-time. The sensors 422 can also create an invisible data grid (not shown) so that the conferee 82 (not shown) can point her hand at a specific locale in air in front of the beamsplitter 6 and operate, for example, a graphical user interface. Various technologies, such as microwave and pattern recognition, can create an invisible data grid.

The image blocking film 10, as seen in FIG. 73, is optionally laid upon the image bearing screen 414 and may rest in place simply by gravity. The image blocking film 10 can have a protective piece of covering glass (not shown) above it that can be the size of the image bearing screen 414 or the entire constructed table 412 (not shown). Likewise the image blocking film 10 can be the size of the entire constructed table 412 (not shown). Antireflective coatings can be added to the covering glass to reduce unwanted reflections. As described later for FIG. 74 the beamsplitter 6 can fold down and be used as a table surface. The image blocking film 10 would block the view the display 2 improving the appearance of the beamsplitter 6 table surface. Likewise, as seen in FIG. 13, image blocking film 10 mounted to the back of the beamsplitter 6, when closed upon the image display 2, would block the display 2 from the conferee 82.

Figure 74:
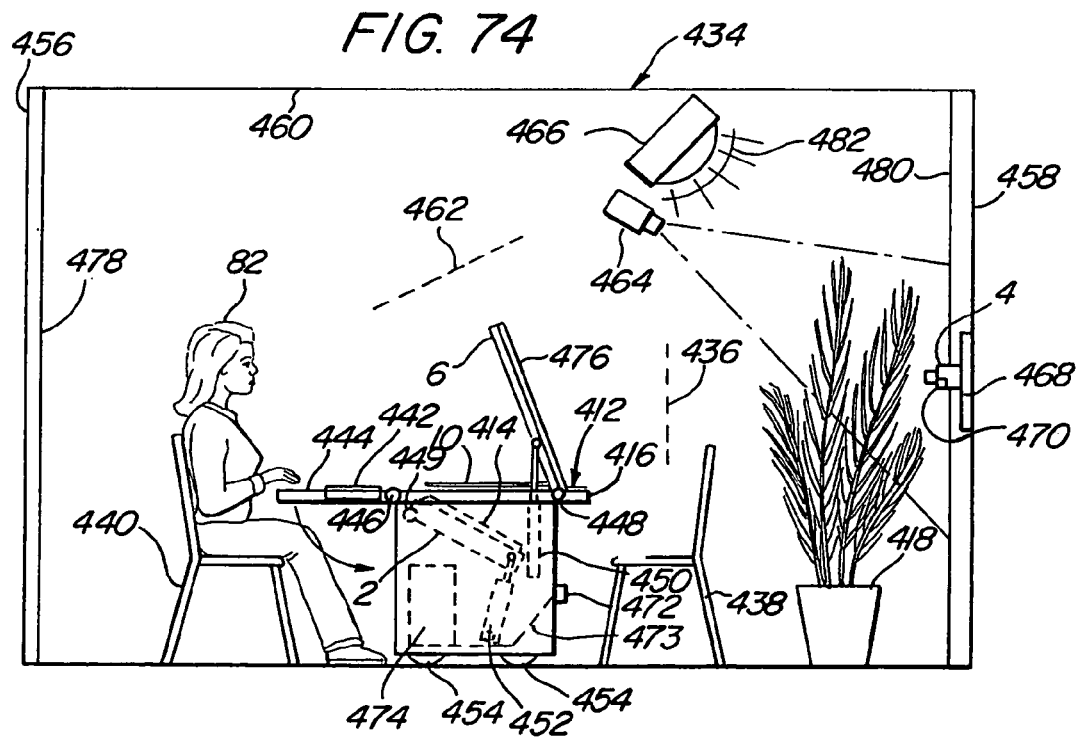
FIG. 74 illustrates a roll-about variation of the present invention in a room environment.

FIG. 74 illustrates the present invention among a room 434. An additional common object that can serve as a visual reference is a chair 438. The chair 438 is optional and is not needed to simulate a person sitting on the other side of the constructed table 412. The visual reference of the back edge 416 of the constructed table 412 along with other common room objects, such as the plant 418, serves quite well in establishing the location of an image reflection position 436. The chair 438 is optional since commonly people do not see the chair when someone is sitting in it anyway. Ultimately the present invention is ideally configured to be used in a common room environment in which the random objects in the room all aid in creating visual references. Even objects on the conferee's 82 side of the beamsplitter 6 serves as a visual reference (i.e., the front edge of the table, desk, etc.). Likewise, in a retail environment the present invention can be configured as a kiosk that has common products and advertising displays in the environment serving as visual references.

FIG. 74 illustrates one possible configuration and that is a roll-about table on wheels 454. The wheels 454 may be simple casters for manual pushing or can be motorized controlled. The beamsplitter 6 folds down toward the image bearing screen 414 making a compact roll-about with a low center of gravity. The side of the beamsplitter 6, opposite the image bearing screen 414, serves as a glass table top when in the closed position. The beamsplitter closes by means of a main hinge 448 and opens smoothly by gas shock spring 450. An extension table ledge 444 hinged by a ledge hinge 446 permits a working surface to be lifted into use and then closed so that the entire terminal can fit through doorways. The extension table ledge 444 also may be detachable and store separate, upon or inside the eye contact terminal. The conferee 82 is illustrated sitting in a chair 440 and seeing-through the beamsplitter 6 to the image reflection position 436 (imaging the imaged conferee 410) positioned on the other side of the constructed table 412. The camera 4 is aligned to capture an image of the conferee 82 through the beamsplitter 6. As shown in the parent U.S. Pat. No. 5,777,665 FIG. 9 the camera 4 can be a completely separate component which permits it to be placed at any distance from the beamsplitter 6 by the consumer or professional installer. The camera 4, though remote, can be attached to a positioning system 468 so that it can be raised, lowered and moved left and right so that accurate eye contact alignment is achieved. Also, the camera 4 can include pan/tilt/zoom features and auto-tracking. The PTZ functionality, as well as the positioning system, can be configured with a remote control operation so that any of the conferees can control the image capturing of camera 4.

FIG. 74 also illustrates the present invention with an optional motorized display positioning mechanism 452 that can raise and lower the display 2 affixed to a front hinge 449. The front hinge 449 can also be moved up and down for further display 2 positioning options (not shown). The mechanism 452 can be attached to the gas shock spring 450 and work in tandem or separate. Those skilled in the art will appreciate the various motorized and non-motorized methods of adjusting the beamsplitter 6 and the display 2 so that the image reflection position 436 can be placed in the desired location. Also, additional movement that can be motorized is the raising and lowering of the beamsplitter 6 and its placement front to back in relation to the display 2 (see FIG. 11 as originally illustrated and described in parent U.S. Pat. No. 5,777,665, Col. 7 lines 64-67 and Col. 8 lines 1-6). If the display 2 in FIG. 74 is slanted away from the conferee 82 and thereby blocking a direct view of the image bearing screen 414 then the image blocking film 10 can be optionally removed.

FIG. 74 illustrates a built-in media display 442 located in front of the conferee 82. The built-in media display 442 is affixed to the extension table ledge 444. An optional shield can cover the built-in media display 442 (not shown). All the previous descriptions related to the media display 428 of FIG. 73 are applied to the built-media display 442.

As illustrated in parent U.S. Pat. No. 5,777,665 the transparent see-through aspect of the present invention was originally illustrated in FIGS. 6-9 as fully configured see-through eye contact products. The sizes of the display 2 in FIGS. 6, 7, and 9 can be of any size ranging from 5" diagonal to 50" diagonal or more. Ideally a 40" plasma panel would be used so that the consumer could purchase the eye contact display and install it themselves and enjoy a virtual presence teleconferencing terminal that is see-through, has eye contact, and images life-size conferees (see Col. 5 lines 35-36 of U.S. Pat. No. 5,777,665 for reference use of a plasma panel). The see-through aspect of the present invention was discussed at some length in the parent U.S. Pat. No. 5,777,665 in regards to the effects of light behind the beamsplitter 6 and how it affects the reflectivity of the beamsplitter 6. Opaque material 50, as seen in FIG. 12, is presented as an option. FIG. 13 presents a method of adding image blocking film to the rear of the beamsplitter 6 to control ambient light and thereby maintain the see-through property of the present invention. To enhance the see-through property of the present invention the parent U.S. Pat. No. 5,777,665 teaches adjusting the optical properties of the beamsplitter (Col. 7 lines 6-9), reducing the amount of light behind the beamsplitter 6 and thereby increasing the luminance of the reflected image (Col. 8 lines 20-24), and by adding lights to illuminate and highlight the area behind the beamsplitter 6 so long as it does not interfere with the reflectivity of the beamsplitter 6 (Col. 10 lines 32-35). FIG. 74 illustrates a room light 466 that serves the very purpose of highlighting the environment behind the beamsplitter 6 so that it is readily apparent through the beamsplitter 6 yet does not interfere with the image reflected on the beamsplitter 6. Ultimately, the art is all about the competition of light which when executed well will clearly show the imaged conferee 410 among the common objects serving as visual references in a common setting, such as a group conferencing room or office, behind the beamsplitter 6. Those skilled in the art will appreciate the obvious potential of elaborate lighting arrangements in fully designed and controlled lit rooms serving as dedicated teleconferencing spaces.

The room 434 of FIG. 74 is preferably a common group teleconferencing space or office rather than a highly controlled environment. The colors of walls, such as a back wall 458, and a ceiling 460, as well as windows (not shown) all can affect the transmission/reflectivity of the beamsplitter 6 for the positive and the negative. Rather than completely changing a room environment in its décor, adjustments to the beamsplitter 6 contrast tint value is preferred. Adjustable and changeable contrast tints of beamsplitter 6 have been deployed in many applications of the present invention with a great deal of success which has maintained the see-through property while simultaneously maintaining a bright reflection on the beamsplitter 6 from the image bearing screen 414. Also, antireflective coatings applied to the back side of the beamsplitter 6 (see parent U.S. Pat. No. 5,777,665 Col. 8 lines 57-60) greatly reduces unwanted reflections that may be captured by the camera 4.

To further enhance the reflectivity of the beamsplitter 6 is by optionally controlling the room 434 environment with a first sheet polarizer 476 and a second sheet polarizer 480 between the conferee 82 and the back wall 458 (FIG. 74). From the conferee's 82 perspective the polarizers can be adjusted to add variable contrast to the reflection of the image bearing screen 414 upon the beamsplitter 6. When standing or looking around the beamsplitter 6 the conferee 82 views only the second sheet polarizer 480. Hence, the environment has not been darkened and the room 434 can retain its original décor with light colored walls. The first sheet polarizer 476 can be adhered to the beamsplitter 6, separate from beamsplitter 6, between the conferee 82 and the beamsplitter 6 (not shown) and can even be worn as glasses by the conferee 82 (not shown). Also a third sheet polarizer 482 can be added to any room lights, such as the room light 466, and windows (not shown). Hence, from the conferee's 82 perspective the combination of the first sheet polarizer 476 and the third sheet polarizer 482 the room light 466, and any other light sources treated similarly, can be partially or completely blocked from view. Also, all the polarizers can be of differing tint values and polarizing properties.

It will be apparent to one of ordinary skill in the art that the present invention may use a variety of techniques to isolate the local conferee 410 from the background, such as a side wall 456 and other room objects such as chair 440 (FIG. 74). For example, only the imaged conferee 410 in FIG. 73 is seen in the reflection on the beamsplitter 6 from the image bearing screen 414 and not the imaged conferee's 410 native environment at his/her distant location. Our original constructions and on-going uses of the present invention have utilized a variety of techniques to isolate the conferee from the background. Of course, chromakey techniques can be used as well as painting the side wall 456 a dark color. Also, 3-D mapping cameras with real-time processing capabilities can be used as well as image processing software. Image processing software, such as taught in U.S. Pat. No. 5,764,306 has the advantage of not requiring adjustments to the room's 434 decorative style. An optional wireless cabling system is seen with a camera emitter 470 and wireless video signal receiver 472 (FIG. 74). The video signal (analog or digital) from the camera 4 is seen entering via a video line 473 into an image processor 474 which may be a common personal computer with video processing hardware and or software which will perform real-time background extraction of one or all the video signals (analog or digital) utilized in the teleconference. Another advantage of real-time background extraction is that the local conferee can adjust the image of the imaged conferee 410 to ideally suit his see-through eye contact display. While the see-through nature of the present invention is enhanced by these common isolating techniques the present invention does not require it. Ultimately, it is the consumers' choice of how they will use and deploy the present invention with a see-through transparent image display.

Another optional method of controlling the background behind the local conferee 82 is with the combined use of the first sheet polarizer 476 and the fourth sheet polarizer 478. A side wall 456 can now be any color and can even have a window (not shown). The combination of the sheet polarizers 476 and 478, the camera 4 can capture any degree of "dark" according to the adjustment between the polarizers. The first sheet polarizer 476 can placed as shown in FIG. 74 or can be closer to the camera 4, affixed to the camera 4 or on the conferee's 82 side of the beamsplitter. The room 434 may also be a clear glass or plastic cubical or videophone booth. All descriptions for the room 434 and the use of polarizers in controlling the environment are applicable to a transparent room and transparent kiosk structures. The polarizers can be arranged so that the public can see the conferee 82 and not see the image of the imaged conferee for a certain degree of conference privacy. Also dimmable electronic shutters, such as polarized suspended particle shutters, can be used as the transparent walls to select the degree of privacy of these rooms from the outside public.

While it is preferred that present invention be built into self-contained products it may be advantageous with very large displays to mount the display 2 above the beamsplitter 6 with the image bearing screen 414 facing downward (see FIG. 7 for one possible configuration). FIG. 74 illustrates one possible placement of display 2 with the image bearing screen 414 facing down as seen in downward screen position 462. Of course, the beamsplitter 6 would be adjusted to accommodate the downward screen position 462 so that the image reflection position 436 is properly placed. The downward screen position 462 can be angled so that the conferee cannot view directly the image bearing screen 414. Also, image blocking film can be added to block the image bearing screen 414 when in the downward screen position 462 (not shown).

Typically the beamsplitter 6, in relation to the display 2, is angled roughly between 30 to 60 degrees to one another. Unusual configurations that are less than 30 degrees or more than 60 degrees are, as well, applicable to all the relevant embodiments and claims of the present invention. Whether the display 2 is in the position as seen in FIG. 74 or in the downward screen position 462 (also seen in FIG. 74) it may be advantageous to tilt the display 2 so that the beamsplitter 6 is more perpendicular to the conferee 82. One advantage is that the beamsplitter 6 would appear to be less slanted. Another advantage is that the area on the camera 4 side of the beamsplitter 6 that is reflected can be minimized and more highly controlled. These unwanted reflections may interfere with camera 4 image capturing. The ceiling 460 and other parts of the environment may need to be altered to reduce the source of the unwanted reflection. Additional uses of sheet polarizers (not shown) can reduce the source of the unwanted reflection as well darkening the source of the unwanted reflection by adjusting lights, painting, adding and removing decorative coverings and so on. Though this may be feasible for some uses of the present invention, out-of-the-box consumer versions will require more sophisticated solutions for reducing unwanted reflections, all of which will be discussed in the forth coming illustrations and description.

Also seen in FIG. 74 is an optional front projector 464 that projects images onto the back wall 458. Instead of projecting onto the back wall 458 a transparent screen, such as a common transparent holographic screen, as well as other common front projection screens can be used. Other displays as well can be used that are not front projection, such as plasma panels. Since the beamsplitter 6 is transparent additional displays seen through the beamsplitter 6 by the local conferee 82 may offer additional productivity such as viewing simultaneously a data collaboration image or simply a video or still that might create a desired environment. Also, the layering of images can create the appearance that the imaged conferee 410 is actually in another setting.

Figure 75:
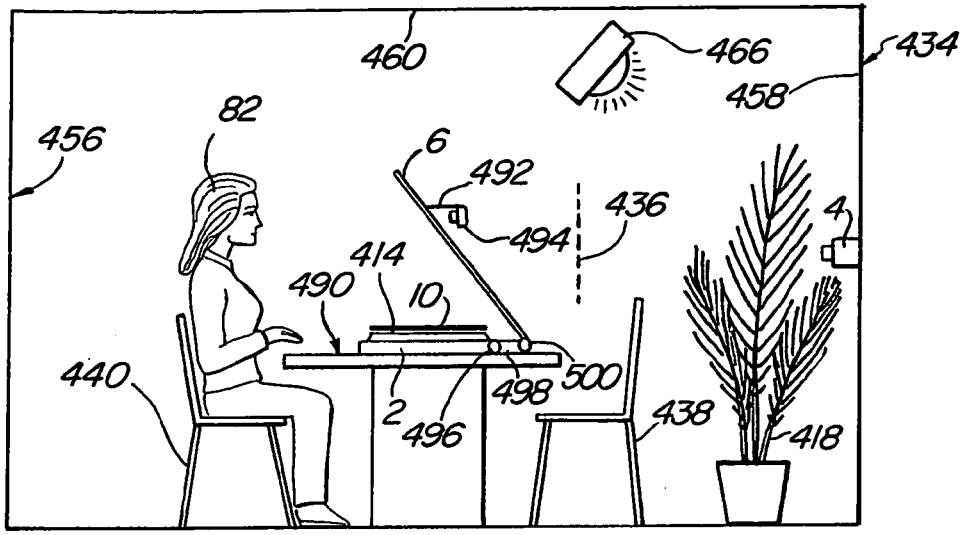
FIG. 75 illustrates a tabletop variation of the present invention in a room environment.
Figure 76:
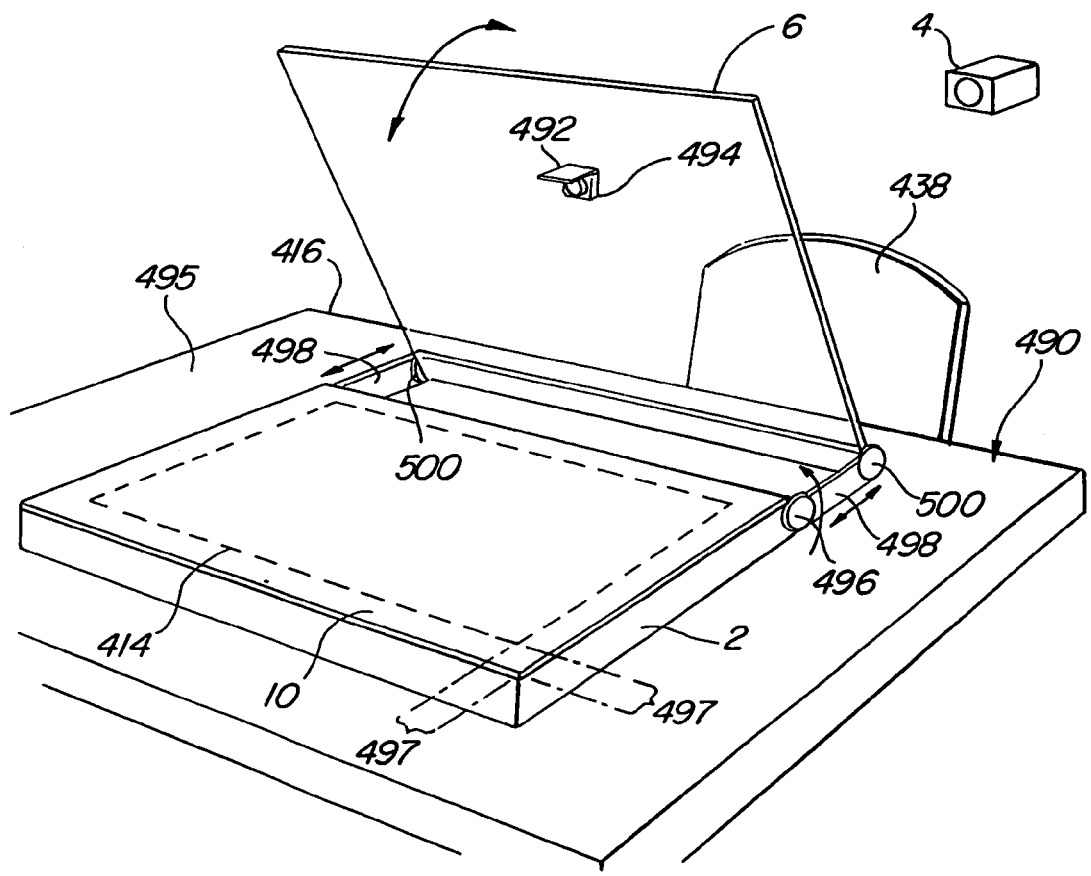
FIG. 76 illustrates a perspective view of FIG. 75.

FIGS. 75 and 76 illustrates a self contained see-through virtual presence display that can be simply placed on a common desk or table 490 that is a variant of the configuration as seen in FIG. 6. Here the display 2 is large enough to display a life-size image and incorporates a swivel first hinge 496 and second swivel hinge 500 connected by rear extensions 498. The rear extensions 498 are extendable allowing for a back and forth adjustment permitting a wide range of beamsplitter 6 positioning. The hinges 496 and 500 permit the beamsplitter 6 to be positioned above and away from the display 2 so that the image reflection position can be positioned as desired among the visual references, such as back edge 416 of the common desk or table 490. Complete positioning of the beamsplitter 6 and the display 2, and consequently the adjustment to the image reflection position, is illustrated in FIGS. 10 and 11 of the parent U.S. Pat. No. 5,777,665. The beamsplitter 6 is also detachable and replaceable with a larger beamsplitter 6 so that more conferees can view the image in the image reflection position 436.

FIGS. 75 and 76 also illustrates the use of a micro camera 494 used instead of camera 4. Micro camera 494 is affixed to the backside of the beamsplitter 6, but can be self supporting and separate from the beamsplitter 6 by a variety methods such as transparent wires. A micro shield 492 blocks unwanted light that may reflect from the camera 4 side of the beamsplitter 6 and affect image capturing by the micro camera 494. The micro camera 494 and the camera 4 are interchangeable as it relates to their features and uses as described in the complete text and all illustrations herein.

Image blocking film 10, though optional, is ideally suited to the configuration as presented in FIGS. 75 and 76. The image blocking film 10 can rest (by gravity or lamination) on the image bearing screen 414. The image blocking film 10 can also be laminated to various clear substrates and may include antireflective coatings. A bezel area 497 on one or more sides of the display 2 are ideally the same color as the common desk or table surface 490. The reflection of not only the image bearing screen 414 is seen but also the bezel 497 and the surface 495. Ideally the bezel is dark and preferably black in color to match the color of black image blocking film, thereby creating the appearance to the conferee's 82 perspective of little visual difference between the image bearing screen 414 and the bezel 497. To further enhance seamlessly combining the image bearing screen 414 and the bezel 497 is to position the image blocking film 10 over the bezel 497 as seen in FIG. 76. To the conferee's 82 perspective both the image bearing screen 414 and the bezel 497 are blocked from view. Not only does this enhance design possibilities and improve aesthetics, but also fully conceals the view of the display 2. The conferee 2, unless informed, may not even be aware that there is an image bearing screen 414. The common desk or table surface 495 is also preferably dark in color or the display 2 can rest on a dark colored mat (not shown). The bezel 497 can also be constructed oversize to reduce the reflection of the surface 495. Likewise, retractable wings can be adjusted from the sides of the display to reduce the reflection of the surface 495 (not shown). Another method to reduce the reflection of the common desk or table surface 495 is to shape the beamsplitter to the minimum desired size and that shape may be trapezoidal or any other desired shape. All of these solutions presented are readily integrated into all the configurations of the present invention such as the canopy display configuration illustrated in FIG. 18.

FIG. 77 illustrates a local conferee's 82 point-of-view where the micro shield 492 and the micro camera 494 are visually minimized so as not to greatly affect the see-through aspect of the present invention. FIG. 78 aligns various components so they remain out of view from the local conferee's 82 point-of-view. A micro pan/tilt device 502 and a wireless video transmitter 506 are aligned behind the micro camera 494 so they are not seen from the vantage point of the local conferee 82. A video line 504 cables the video signal from the micro camera 494 to the wireless video transmitter 506. Video emitter 508 transmits the video signal to a receiving unit (not shown). The micro pan/tilt device 502 is operated remotely by controls (not shown) and received by an infrared receiver 510. Any of the conferees involved in the teleconference can control the functions of the micro camera 494 and zoom lens (not shown), the pan/tilt device 502 and the video transmitter 506. Many methods of wireless transmission are possible, such as microwave, and the signal transmitted may be an analog or digital signal. A battery supply (not shown) can power the micro camera 494 and other components located with the micro camera 494. Ultimately, the goal is minimizing the obstruction of the see-through beamsplitter 6. It is also feasible to embed micro wires (not shown) in, onto or between (laminated layers) of the beamsplitter 6.

An optical transmission area 518 of the beamsplitter 6 is that portion of the beamsplitter that the camera is aimed through (FIG. 77). That optical transmission area 518 may have optical properties different than the rest of the beamsplitter 6. For example, the beamsplitter 6 may be contrast tinted (not shown), by polarization or common tinting, to enhance the reflection of the image bearing screen 414. The contrast tint may affect the image capturing of the micro camera 494 or camera 4. Hence, the optical transmission area 518 would not include contrast tint. The transition of differing optical characteristics in regions on the same beamsplitter 6 can be disguised by, for example, feathering techniques.

FIGS. 79 and 80 illustrate the use of a micro camera hood 512 that contains the micro camera 494. It may be desired to completely enclose the micro camera 494 so that it is not seen inside the micro hood 512 which may have black colored inside walls. The micro hood 512 assists in concealing the camera and removes the intrusion of ambient light from nearly all sides. Optionally, a micro cable bundle 516 supplies power to the micro camera 494 and transmits the video signal.

FIG. 81 illustrates the near complete concealment of the micro camera 494 (or camera 4), the micro shield 492, the micro hood 512, the micro cable bundle 516, and any other components by the luminance reflection of the imaged conferee 410 on the beamsplitter 6. The reflection of the imaged conferee 410 is sufficiently bright enough to block a good portion of the room 434 and cameras 494 and 4 from the conferee's point-of-view. While a conference occurs, the cameras 494 and 4 are concealed when the imaged conferee 410 is seen and the cameras 494 and 4 are exposed when no image is reflected upon the beamsplitter 6.

Camera 4 and 494 in any configuration of the present invention can be concealed by other methods as well. For example camera 4 and 494 can be painted to match the environment or given a non-reflective coating or shape. Antireflective coatings can be added to the lens of the camera 4 and 494 to minimize noticeable reflections (not shown). Also the camera 4 and 494 can be hidden in the environment, such as inside a clock or other spy camera techniques. In the parent U.S. Pat. No. 5,777,665 (Col. 10 lines 23-25) the use of additional mirrors to remove the camera 4 from the line of sight is taught. FIG. 82 illustrates the use of a second beamsplitter 520 so that the reflection of the local conferee can be captured while simultaneously the camera 4 is completely removed from the line of sight of the local conferee 72.

As described in parent U.S. Pat. No. 5,777,665 (Col. 10 line 39) 3-D displays may be incorporated into the present invention. In fact, display 2 may be any kind, of display including auto-stereoscopic and stereoscopic and pseudo 3-D, such as computerized and optical depth enhancement. Display 2 can, as well, be a 3-D front or rear projection system common 3-D supporting screen technologies. If in the case that a front projection beam may interfere with camera capturing of camera 4, polarizers or shutters can be included into the optical pathways. 3-D display technologies are numerous. Preferably the 3-D display is self-contained and does not require passive or active special eye wear (although such technologies have been configured with the present invention). 3-D content can be generated by either image processing of by specific 3-D camera technology and combinations of them both. In such circumstances, image processing hardware and software and 3-D camera technology can be included to the eye contact terminal of the present invention. Hence, it should be expressly understood that camera 4 and micro camera 494 may alternatively be a 3-D camera capturing system. Connection between various terminals of the present invention may include both 2-D and 3-D. For example, one terminal captures 3-D images but does not display 3-D images while the distant and connected terminal displays 3-D images and does not capture 3-D images. All the 3-D displays described thus far are substantially planar in that the image bearing screen 414 is not a dimensional 3-D display formed with concave and convex shapes. While the curved screen of a CRT screen is substantially planar unique 3-D displays may use screens that are highly dimensional forming representations of objects or persons. These unique dimensional 3-D screen displays are readily integrated into the embodiments of the present invention.

As originally described in parent U.S. Pat. No. 5,777,665 the present invention can be built into desks, tables and other furniture (Col. 5 lines 40-50). Logically desks, counters and cabinets built into furniture for retail applications such as kiosks are included. FIG. 83 illustrates the present invention as an eye contact terminal 522 built into a typical desk 528 and constructed for viewing from the location of the conferee chair 440 by the conferee 82. The typical desk 528 may be any kind and shape of desk and can be built into the desk surface of an office cubical. FIG. 84 illustrates a typical credenza 526 with the eye contact terminal 522 built in. The credenza is ideal for group conferences where the conferees sit at another table to view the terminal. The credenza is also ideally suited to be built with wheels so that it can be easily moved to various meeting rooms and offices. FIG. 85 illustrates the eye contact terminal built into a typical table 530 allowing one or more conferees to enjoy eye contact videoconferencing. FIG. 86 is a typical multi-seat table 532 in which each conferee can enjoy their own built-in individual eye contact terminals 522. The use of multiple cameras and dynamic switching can greatly improve the conferencing experience when numerous participants are involved. FIG. 87 illustrates the typical desk 528 which has built in the eye contact terminal 522 and a second eye contact terminal 524. The terminals can be angled to suit comfortable viewing by the conferee 82 and additional conferees. Two terminals can be used to show multiple imaged conferees with eye contact aligned cameras. Also, the second eye contact terminal can be used as a common data collaboration monitor and show other media as well. Two or more displays can be built into any of the furniture illustrated among FIGS. 83-88. FIG. 88 illustrates the eye contact terminal 522 built into a coffee table 534. The conferees relax on a sofa 536 for viewing the eye contact terminal 522. Wheels, for ease of rolling and moving, can be built into any of the furniture illustrated in FIGS. 83-88. The present invention, as well, can be built into a common consumer media cabinet.

Figure 89:
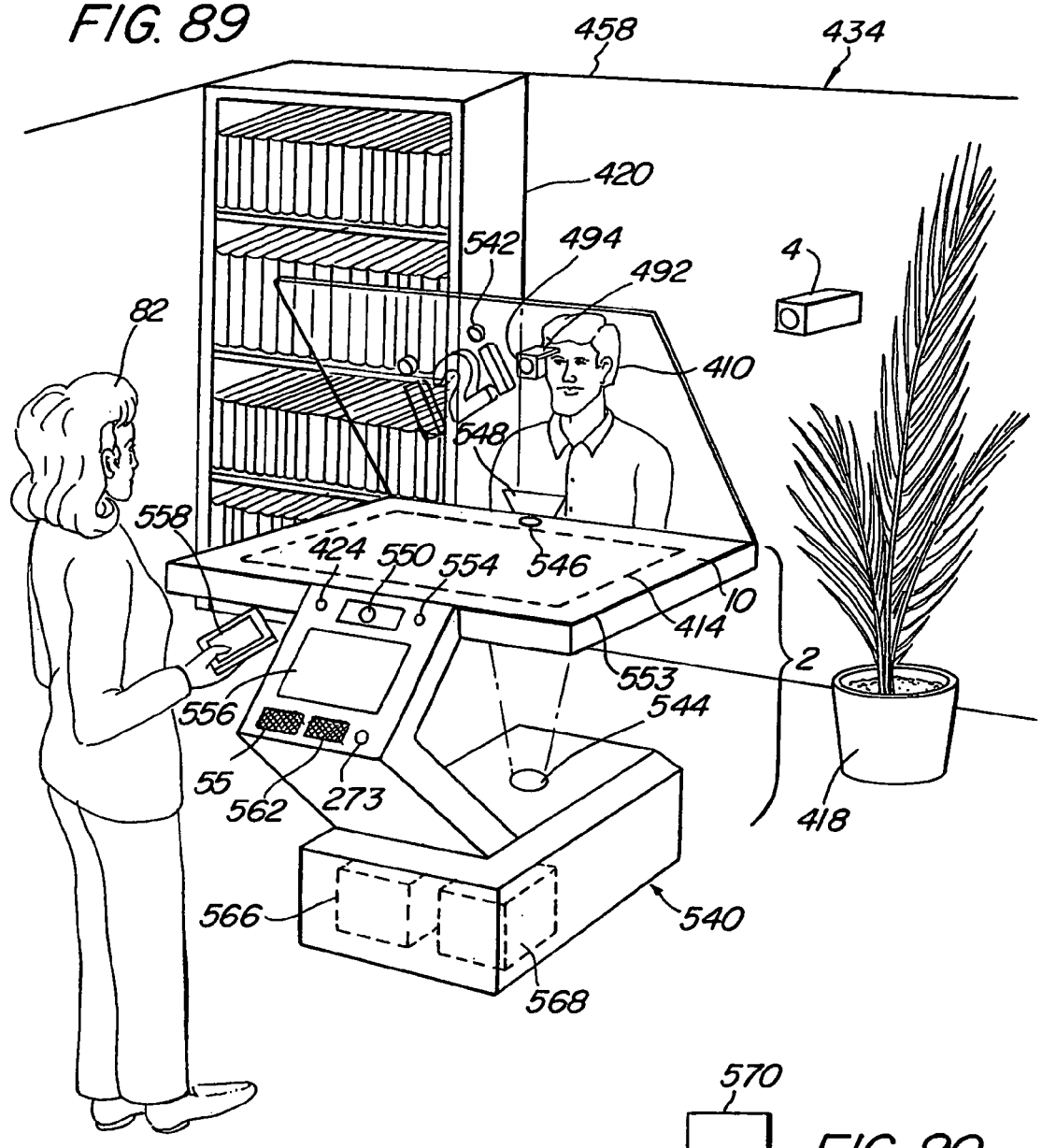
FIG. 89 illustrates the present invention constructed as a podium.

FIG. 89 illustrates the present invention configured as a podium 540. The podium 540 can be used to replace a speaker in front of an audience or it can be used as an interactive kiosk, such as a banking terminal with a videoconferenced teller.

Interactivity can be achieved by numerous means which include an input touch screen 556 which can also serve the functions described for the media displays 428 (FIG. 73) and the built-in media display 442 (see FIG. 74). Also, interactivity has been utilized with a personal digital assistant 558 or other remote wireless capable device that uses a common wireless emitter/receiver 554. The podium 540 can use the camera 4 for eye contact or the micro camera 494 for eye contact. The applications of each as previously described are transferable to the podium 540. Additional conferencing components are included, such as the speaker 55, a microphone 273, sensor 424, generic conferencing system 566, and a computer 568. The podium 540 is ideally a fully self-contained videoconferencing terminal, it may, however, only contain a minimum number of components with other necessary components remotely located. The beamsplitter 6 can be replaceable with a larger beamsplitter 6 so many conferees can enjoy viewing the conference.

Display 2 as seen in FIG. 89 is uniquely combined inside the podium 540; the projector (not shown) is hidden from view under the projection hole opening 544. The projection beam passes through the projection hole opening 544 and forms an image upon a rear projection screen 553 forming the image bearing screen 414. As illustrated, the podium itself comprises the display 2 and permits the projection beam to pass unencumbered by a bulky housing. The podium 540 as illustrated creates a very sleek and thin profile display system. Of course common CRT displays can be used in the podium 540. A housing that encases the CRT would improve the appearance of CRT based podium (not shown). Also, the image bearing screen 414 can be slanted away as seen in FIG. 74. The very configuration as seen and described for FIG. 74 can be used as a podium if elevated from the floor 18 inches to 24 inches approximately. Hence, the features described for FIG. 74 such as a positionable display 2, a folding beamsplitter 6, roll-about and so on are all applicable to variations of the podium 540. Also, other features such as described for FIG. 11 for positioning the beamsplitter 6 in any direction in relation to the display 2 and thereby adjusting the location of the image reflection position 436 will be readily integrated into the podium 540.

The rear projection screen 553 can be fabricated to have a very narrow vertical viewing angle and thus serve to image block from the perspective of the conferee. Fabricated screens for image blocking are described for FIG. 38. The fabrication and selection of an image blocking rear projection screen often includes light directing optics such as, but not limited to, Fresnel lenses, lenticular lenses, holographic substrates and micro prismatic substrates. One advantage to an image blocking rear projection screen is that these screens often have image brightness increases as the vertical viewing angle decreases. Image blocking film 10 is an optional feature with use of the podium 540.

FIG. 89 illustrates the present invention used in the room 434 among common objects such as the book shelf 420 and the plant 418 serving to associate the location of the image reflection position 436. All of the descriptions given for FIGS. 73 and 74 are transferable to the room 434 with podium 540. The teachings of the control of the room environment and modifications to walls, ceilings, lights, room polarization to enhance the image seen and the image captured, various techniques for replacing background, and so on are applicable and extensions of the terminal of the podium 540.

FIG. 89 also illustrates the use of an optional camera 546 that captures a reflection of the local conferee 82 from the beamsplitter 6. An optional angled contrast shield 548 will aid in the reflectivity of the beamsplitter 6 and is sized to match the area where image is captured in the reflection so as to not obscure the see-through quality of the beamsplitter 6. The contrast shield 548 can be feathered into the beamsplitter 6 so there is not a distinct line noticed by the conferee 82. Seen in the front of the podium 540 is a pan/tilt/zoom camera 550 that is optionally in lieu of or in conjunction with camera 4. Both optional camera 546 and the pan/tilt/zoom camera 550 are used when the podium is used in a one to many application where the eye contact aligned camera 4 and/or micro camera 494 is insufficient to capture the line of sight of, for example, a hundred viewers dispersed in a large room. Of course, when the conferee 82 stands close to the podium 540 the cameras 494 and 4 are ideally used.

FIG. 89 illustrates the optional use of a video content 542 that can be viewed in conjunction with or without the imaged conferee 410. Original constructions of the present invention in the form of furniture, desktop displays, and podiums for events and tradeshows utilized a variety of video productions, computer animations, and real-time interactive computer images that created the appearance that videographed objects and animations were floating. A simple black background and reflections, shading, and motion of videographed objects and animations contained in the video content 542 enhanced the floating effect. A common screen saver that adds dimension and a metallic appearance to a typed in word has created the floating appearance of animated content on the present invention in its earliest constructions. A black background has, as well, been commonly used in many applications of videoconferencing to improve the quality of the picture of the conferee 410 since the compression algorithms can work less on developing a background and be focused more on the image of the imaged conferee 410. It is obvious to one of ordinary skill in the video production and computer animation arts on how to create content for the present invention.

Figure 90:
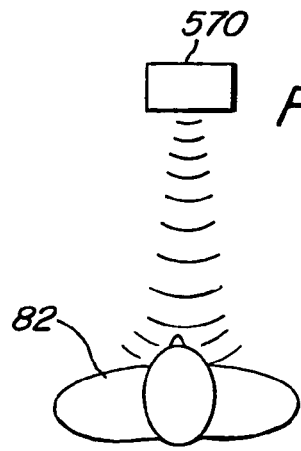
FIG. 90 illustrates a highly directional speaker integrated into the present invention.

FIG. 89 also illustrates the use of a highly directional ultrasonic speaker 562. As seen in FIG. 90 a self-contained highly directional ultrasonic speaker 570 can create an audio beam that when intersected by the conferee 82 produces the sensation of audio being generated only inches away and even the sensation of hearing audio with headphones. The extremely narrow audio beam is especially useful during eye contact videoconferences where one or all of the eye contact terminals are in public spaces and audio privacy is needed. For example, in use with eye contact desktop systems a call center or office cubical where others can listen in on the audio portion of the videoconference, this speaker technology will add privacy without the need to hold a phone receiver or wear a mini headphone. In the podium 540 the highly directional ultrasonic speaker 562 enables a privacy mode for conducting, for example, financial transactions with a videoconferenced bank teller in a public space. In group videoconferencing the ultrasonic speaker technology can be used with individual beams on each conferee creating their own personal audio hearing zone. It is likely the technology will be used together with common speakers creating a general audio conference for all to hear and simultaneously a private audio conference. For example, it is possible to create the natural experience of leaning over to whisper something to the person next to you during a meeting with many people.

FIG. 91 illustrates the present invention in which a controlled environment is seen inside a cabinet 576. Here the conferee 82 looks into the cabinet 576 with visual references, such as the back edge 416 of the cabinet table 572. The parent U.S. Pat. No. 5,777,665 (Col. 5 lines 47-49) teaches the use of incorporating the present invention inside a cabinet and also sideways. A sideways placement can be seen in a virtual presence cabinet 578 (FIG. 92) imaging a standing life-size person (not shown) in the image reflection position 436. A bird's eye view of the virtual presence cabinet 578 is seen in FIG. 93. Display 2 is optionally a large rear projection system consisting of an image projector 580 and a projection mirror 582. Included inside the cabinet 578 is a visual reference object console 574. It is possible that the imaged conferee 410 (not shown) can appear to interact with the console 574 or other objects.

Whether the display 2 is sideways, above or below, the present invention can be configured into rather large systems that image into entire room areas. Beamsplitter 6 can be configured in excess of 20 feet diagonal to achieve this end. The imaged conferee 410 and other imaged conferees can appear to walk around inside the virtual presence room (not shown): Also, conferees from several remote locations can appear inside the virtual presence room. One configuration is that several conferees from differing remote locations all appear to be sitting around the same table in the virtual presence room. Rather than a single large beamsplitter 6 many smaller beamsplitters 6 can be configured to reflect from a single display 2 or many displays 2 to create the appearance that several remotely located conferees are sharing the same physical space in a virtual presence room (perhaps seated around a table). Close attention to camera placement behind the beamsplitter(s) 6 and multiple cameras 4 may be needed to ensure a natural sense of eye contact within a group conversational dynamic. Much effort in the art has gone into configuring group conferencing with multiple displays. The present invention improves upon these efforts by the addition of one or more see-through eye contact virtual presence systems as described herein.

FIG. 94 illustrates the use of a motorized horizontal track 594 to position the micro camera 494 left or right by a clear support rod 592 attached to a slide plate 596. As the conferee 82 moves from a viewing position 586, the micro camera 494 is no longer behind the imaged conferee 410 in the reflected place 584. As the conferee 82 moves into a new view location 588 the imaged conferee 410 appears to be in a new reflected place 590. Hence, the micro camera 494 should move left or right to match the movements of the conferee 82 and maintain correct micro camera 494 placement for eye contact. The system can be configured as an auto-tracking system so that the movement of the conferee 82 is matched by the movement of micro camera 494 left or right. A more elaborate system can move the micro camera 494 up and down if the conferee should move up and down (not shown). Also, the micro camera 494 can have a micro pan, tilt, and zoom to adjust for the conferee's 82 movements as well (not shown). Another advantage is that the micro camera 494 is always concealed from the conferee 82 behind the bright image of the imaged conferee 410

FIGS. 95-101 present a variety of options to enhance the beamsplitter 6. A reflective/transparent optical coating 600 is applied to the display 2 side of the beamsplitter 6. To assist in concealing the edge of the beamsplitter 6 a curved edge 602 removes hard edges which are more noticeable (FIG. 95). Also, the edge of the beamsplitter 6 can be reduced in its appearance by the use of clear glass rather than soda lime glass with a green hue (FIG. 96). A safety film or coat 606 can be added or adhered to the beamsplitter 6 to protect installers and users from broken glass and it adds strength to the beamsplitter 6 (FIG. 97). Safety film or other laminating material 608 common to the optical laminating art can be used to adhere the beamsplitter 6 to a second clear substrate 609 (FIG. 98). Original constructions of the present invention used a variety of laminated substrates to the beamsplitter 6 including clear glass and plastic, tinted glass and plastic, opaque black plastic (FIG. 12), and image blocking film (FIG. 13). A rear antireflective coating or film 610 can be added or adhered to the camera 4 side of the beamsplitter 6 to aid in eliminating unwanted reflections that may affect image capturing by the camera 4 (FIG. 99). A clear film material 612 may comprise the reflective/transparent optical coating 600 (FIG. 100). A contrast tinted clear substrate 614 and/or a contrast tinted clear layer (coating or film) 616 may be added to the beamsplitter 6 to add contrast and increase the reflectivity of the beamsplitter 6 (FIG. 101). Combinations and modifications of the beamsplitter 6 will be apparent to those skilled in the art and each installation of the present invention may benefit from a selection of beamsplitter 6 options.

FIG. 102 illustrates a laminated beamsplitter constructed with the contrast tinted beamsplitter 614 and an ultra-thin chemically hardened beamsplitter 618 similar to the chemically hardened glass beamsplitter 266 as seen in FIG. 41. The beamsplitter 618 is used in the same manner as the beamsplitter 6 in all the embodiments of the present invention. The chemically hardened beamsplitter 618 may also be heat tempered hardened as well. The ultra-thin substrate substantially reduces double images as described in FIG. 40 making it ideal for reflecting very high resolution displays. The beamsplitter 618, since it is so thin, is slightly bendable which will affect the quality of reflecting the display 2. Laminating the beamsplitter 618 to a rigid clear substrate, tinted substrate or dark colored substrate will add the needed support to prevent bending. When laminating to a contrast tinted substrate 614 or an opaque substrate (not shown) a pass-through camera hole 620 is needed (unless the tint value is so low it does not affect image capture by camera 494). Also, this laminated beamsplitter construction is ideal for use in eye contact displays, both large and small, due to the increase in strength for frameless mounting as described later for FIG. 107. Improvements upon the embodiment of FIG. 102 include any of the described variations for FIGS. 95-101.

It may be advantageous to laminate the image blocking film 10 to add a protective layer, to add antireflective coatings and to reduce reflections and increase contrast of the image bearing screen 414. FIG. 103 illustrates the image blocking film 10 laminated to a first adhesion layer 628 to a first clear substrate 630 and a second adhesion layer 624 to a second clear substrate 622. To improve contrast and reduce reflection, the first clear substrate 630 is optionally mounted by an optional adhesion layer applied in area 626 to the image bearing screen 414. FIG. 104 illustrates the image blocking film 10 laminated to the image bearing screen 414 by the first adhesion layer 628 and laminated to the second clear substrate 622 to the second adhesion layer 624. FIG. 105 illustrates the image blocking layer 10 laminated to the image bearing screen 414 by the first adhesion layer 268. The clear substrates 630 and 622 can be plastic or glass, flexible or rigid, and can included tinting within or upon the substrates and antireflective coatings to any sides.

As originally stated in parent U.S. Pat. No. 5,777,665 (Col. 5 lines 5-35) the image blocking film 10 can be any material that performs the image blocking objectives of the present invention. As advancements in the art and new materials become available they will readily serve as image blocking film 10. There are several new image blocking technologies in development and the inventors are assisting these firms in the specifications of these technologies. For example "Black Shelf Film" available from Tomen America Inc., New York, N.Y., has great promise for use with small and large displays. The image blocking is embedded into a lenticular prism with "black shelves." The unusual medium has a slight magnification effect which, if it is applied close to the image bearing screen 414, enhances the depth of the image. As new technologies for image blocking film 10 become available they will be readily integrated into the present invention as taught and is covered within the scope of the present invention. Minor adjustments, such as placing lenticulations and louvers at a slight bias to avoid image distortions with, for example, LCD screen pixel rows, will be apparent to one of ordinary skill in the art.

As seen in FIG. 106 is a dimmable contrast layer 630 that upon an electrical charge can shift from a clear state to an opaque state and degrees between. The use of suspended particles, such as polarized particles, can be used to adjust degrees of tint. FIG. 48 presents the use of polarizers that can be physically adjusted between a clear state to a dark state. Those in the optical art no full well that while adjusting from clear to dark two polarizers there are gradations of tint between. Such application with the present invention is certainly desirable in selecting the degree of tint of the beamsplitter 6 and thereby increasing the reflectivity of the beamsplitter 6 to match a given room 434 environment. The use of an electronically initiated dimmable contrast layer 630 is a further enhancement since physically adjusting polarizers is not needed.

A self supporting beamsplitter 6 is illustrated in FIG. 107. A housing beamsplitter mount 629 assists in creating the appearance of a floating beamsplitter as originally taught in the parent U.S. Pat. No. 5,777,665 (col. 5 lines 45-47). The beamsplitter mount 629 has been used in the present invention configured as videophones, PC monitors and in large group conferencing systems. The beamsplitter 6 is of adequate strength to support an angled position. Lamination of other rigid opaque or transparent substrates to the beamsplitter 6 has also been used in our original constructions to improve strength, safety, and reducing bowing. Also, laminating transparent safety film to the beamsplitter 6 has proved to be highly effective in providing strength and reducing bowing. Many constructions of the present invention have supported a 0.025 inch thick beamsplitter 6 from one edge of the beamsplitter 6. These applications often used 0.025 inch thick glass with the overall dimensions of 6 feet by 4 feet. The present invention can support the beamsplitter 6 from a portion of one edge, a portion of two edges or a portion of three edges (these variations originally illustrated in FIGS. 6, 8 and 9 of parent U.S. Pat. No. 5,777,665). By mounting the beamsplitter 6 directly to one to three sides has greatly improved the overall functionality of the present invention since a surrounding support frame (not shown) has not been used to support the beamsplitter 6. A surrounding support frame would lose the effect of a floating beamsplitter and a surrounding support frame would serve as a visual distraction when viewing the image reflection position 436 located beyond the surrounding support frame. Another method to support the beamsplitter 6 without a support frame is by hanging it with thin wires. To further enhance the appearance of a floating beamsplitter is to include a separation space 628 which is an open space between the bottom of the beamsplitter 6 and the image display 2.

Figure 108:
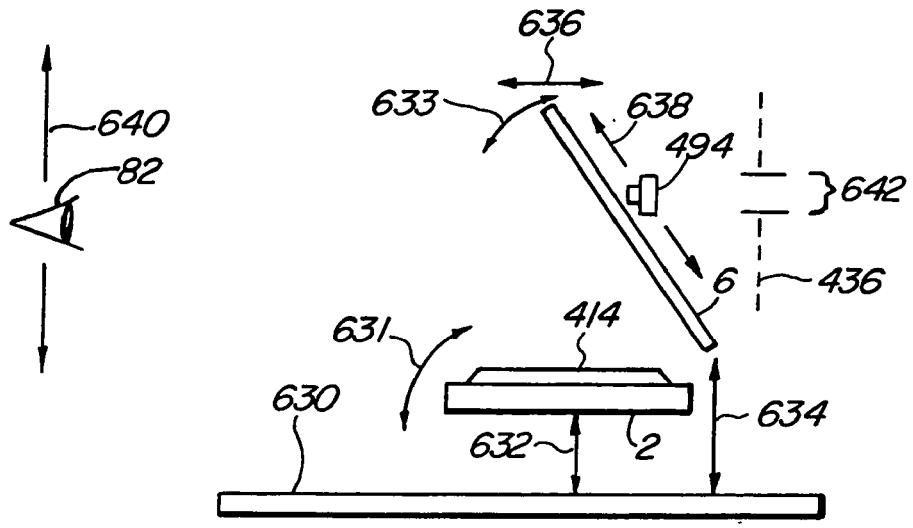
FIG. 108 illustrates various positioning methods to align the camera with the reflection from the conferee's point of view.

FIG. 108 illustrates the present invention with adjustability to accommodate the height of the conferee 82. A generic surface 630 can be the floor, a table or any surface. As the conferee 82 moves up and down or conferee 82 is symbolically represented by many conferees of various heights the position of the conferee 82 can vary (a conferee direction 640). As the conferee 82 is higher or lower to the camera 494, the camera 494 can shift out of an ideal eye contact zone 642 within the image reflection position 436. To resolve this issue the display 2 can be raised or lowered a first direction 632, the display can be tilted by an first arc direction 631, the beamsplitter 6 can be raised or lowered by a second direction 634, the beamsplitter can be tilted by a second arc direction 633, the camera can be raised or lowered up and down by a direction 638 (direction along the angle of the beamsplitter 6 or simply straight up and down), and the beamsplitter can be moved back and forth by a direction 636. Two or more of the adjustments can work in concert to resolve the issue or each can work independently and each can be the sole solution. Also, motorized systems can operate one or more of the directions 632, 634, 638, and 636, as well, as the angle of the beamsplitter.

Figure 109:
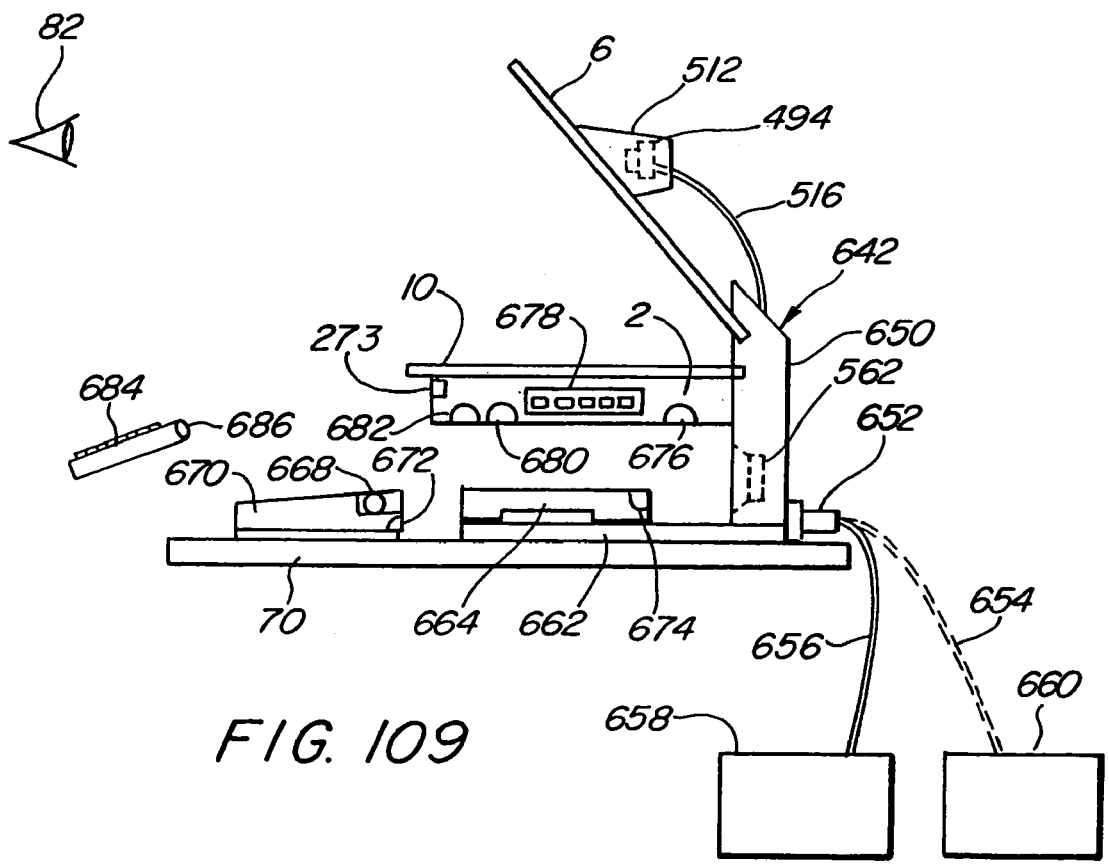
FIG. 109 illustrates an integrated eye contact terminal with a remote PC and videoconferencing appliance.

FIG. 109 illustrates a cable management system of the present invention in which a remote videoconferencing appliance 658 and or a remote PC 660 (with or without videoconferencing capability) is slaved to a sample eye contact terminal configuration 642. Various functionalities inherent to the appliance 658 and the PC 660 are transferred to and through the terminal 642. An appliance cable bundle 656 and a PC cable bundle 654 can be integrated into a custom cable with custom connections, a simple bundle of many cables or the connectivity to the sample eye contact terminal configuration 642 can be a wireless connection (not shown). Functions such as a control pad 678 that would be typically mounted to the appliance 658 or the PC 660 is located on the terminal 642. Other components that would typically be located on the appliance 658 or the PC 660 are a wireless keyboard and mouse emitter 676 wirelessly connected to a keyboard emitter 672 of a wireless keyboard 670, a wireless phone emitter 680 that is wirelessly connected to a phone receiver emitter 674 of a handheld receiver 664, and a remote control emitter 682 wirelessly connected to the remote control emitter 686 of a remote control 684. Other components such as the microphone 273, ultrasonic speaker 562, and the camera 494 can be wirelessly connected to the terminal 642 (not shown). All the above mentioned components can be hard-wired connected, as well, to the terminal 642. Ultimately, the terminal 642 serves as a slave device to the remotely located appliance 658 and/or the remotely located PC 660 possessing critical components that would otherwise be located with the appliance 658 and PC 660. The terminal 642 serving as a slave device also serves as a "bridge" between the appliance 658 and the PC 660 to other components such as the wireless keyboard 670. The on/off control of the appliance 658 and the PC 660 may, as well, be cabled to and through the terminal 642. The described cable management system of FIG. 109 greatly reduces the mess of cables on a desktop and in a group conferencing room when the terminal 642 is constructed as a larger eye contact display. Also, the solutions described integrate readily with off-the-shelf videoconferencing appliances and PCs. Also, shown in FIG. 109 is a keyboard conferencing light 668, a sample terminal base 662 and a sample terminal stem 650. Of course the present invention can be constructed with a videoconferencing appliance and/or videoconferencing PC built in. The added space required, however, may affect the sleek appearance of several desktop designs of the present invention due to the added component bulk.

Figure 110:
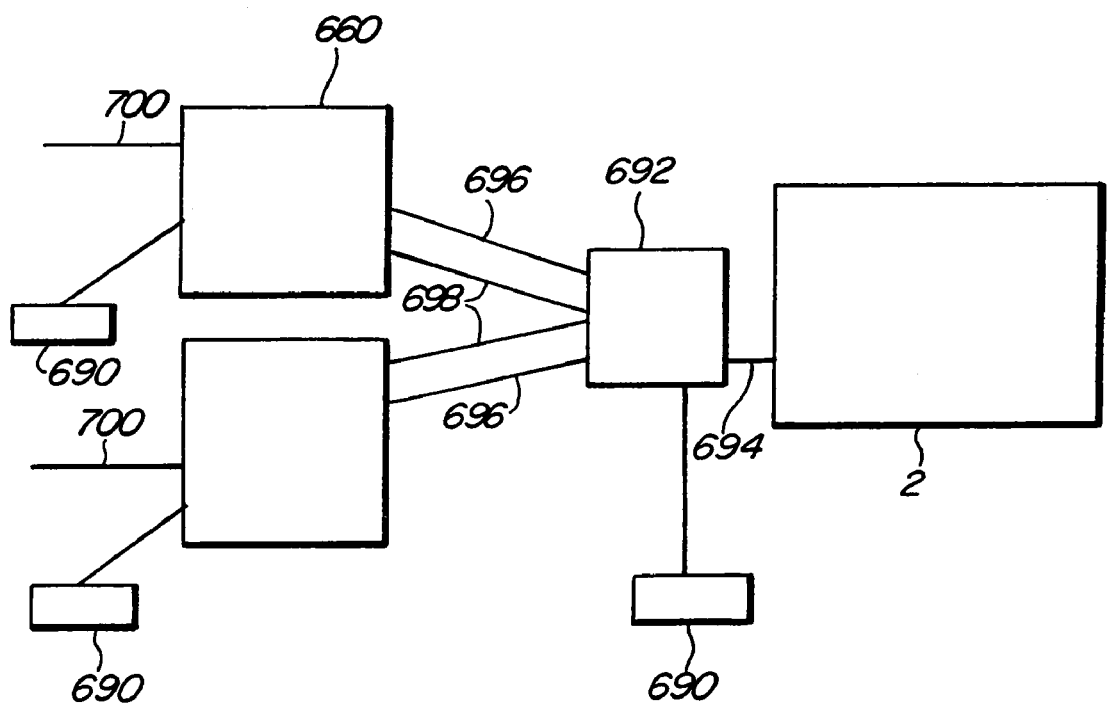
FIG. 110 illustrates the present invention with a multi-format display screen that can display a television image and a computer image.

FIG. 110 illustrates the use of the display as a multi-format display that can display both television video (NTSC, PAL, SECAM, HDTV, and so on) and computer video (VGA, XGA, SXGA, UXGA, and so on). Display electronics 692 is capable of producing both a computer video signal and a television video signal for the particular type of display 2. Enhanced electronics, such as de-interlacers, will greatly improve the quality of television video scaled to be shown on the display 2 with native pixels to show computer video. The display electronics is connected to the display by a signal cable 694. The display electronics 692 receives a television video signal 696 and a computer video signal 698 from either the remote videoconferencing appliance 658 or the remote videoconferencing PC 660. The appliance 658 and PC 660 can be remote or located inside a housing with the display 2 (not shown) and are connected to a common videoconferencing connection via a connection line 700. The display electronics 692 may be located with the display 2 or the appliance 658 or the PC 660. The television and computer video signals 696 and 698 can be digital or analog. Switching between television and computer video modes is initiated by a generic switch 690 connected to one or more of the appliance 658, the PC 660, and the display electronics 692. Switching can be manual, audio initiated and automatically programmed. The generic switch 690 may be wireless and embedded in to functions on a keyboard, remote control, PDA, and so on. The advantages of the dual video display are many. In conferencing the conferee can switch between a television signal videoconference and then view the data collaboration image in its native resolution. Also, consumers are wary of having two displays on their desktops. Hence, the present invention can be configured as a television signal videophone and then switch to serve as the desktop computer monitor. Common videoconferencing uses so little resolution that scaling to high resolution video screens creates significant artifacts. The present invention will afford the use of customized and new generation video display electronics to reach the highest possible quality of low resolution video shown on high resolution displays.

As seen in FIG. 18 of the present invention a notebook computer can be used in a variety ways with the canopy formed by display 2 over the table 70. The notebook's screen can fold all the way back and be inserted under the canopy. The notebook display signal can be routed to the display 2 for viewing any type of video imagery including, of course, videoconferencing. The consumer will appreciate that as software codecs improve the videoconferencing system may be entirely performed by a notebook. The notebook can, as well, not be inserted under the canopy but simply placed in front of the display 2. Now the conferee 82 can view both the eye contact image and the notebook screen for data collaboration. The notebook can create both video signals or a separate videoconferencing PC or an appliance can produce the videoconference seen on the display 2. The camera, as well, might be removable and used both with the eye contact display and the notebook display. Other components can be interchangeable, as well.

As illustrated in FIG. 12 opaque material 50 can be applied to the back of the beamsplitter 6 to enhance the reflectivity of the beamsplitter 6. Preferably this opaque material 50 is a simple black plastic panel that can be removed if the conferee 82 so desires. Also, a black colored light absorbing felt can be added or removed as desired. The opaque material 50 can be used with any of the configurations and embodiments described and illustrated.

All the configurations of the present invention are to be construed as a terminal. Whether the terminal has all components integral in an out-of-the-box product or an elaborate room arrangement where all the components are installed separately and many feet way from one another, they are all eye contact terminals. FIG. 9 illustrates separate components so that the consumer can place components in relation to one another as desired. For example, the camera 4 can be placed a few inches or many feet away. The terminal configurations of the present invention can vary from fully integrated to fully separate.

The present invention may also be used without the camera 4 creating an eye contact image of the local conferee 82 to be transmitted to the distant conferee at a remotely located terminal. Camera 4 may be placed in other non-eye contact areas behind the beamsplitter 6, anywhere in room 434 or within or on the invention's components, furniture, and housings in order to capture an image of the local conferee 82. In this case the present invention can be practiced with all the teachings described including live videoconferencing images being reflected upon the beamsplitter 6 and placing the image reflection position 436 among the room environment with visual references for associating that exact position.

Ideally all conferencing participants at their locations would have one of the described videoconferencing terminals as presented here. It may be, however, that only one or a few in a conference will enjoy the features of the present invention. As the digital revolution continues the present invention will readily integrate with new digital cameras, digital displays and digital networks.

The terminal of the present invention can be used as a public access videoconferencing terminal. The great-great-grandparent U.S. Pat. No. 5,777,665 teaches that the present invention can be configured into numerous types of endpoint terminals including videophones (Col. 6, lines 31-37). Just as the common phone is central to a phone booth, so the present invention, as originally devised, is intended to serve within a videophone booth and other types of public access videoconferencing terminals and kiosks. Until such time that the cost of equipment is low enough for mass consumer saturation, individuals may desire to access a public videoconferencing eye contact terminal for temporary rental. Connected to public or private networks, such eye contact terminals can be readily available in common public areas, such as retail stores and airports forming a network of eye contact terminals that use a variety of eye contact technologies. A monetary transaction system integrated with the present invention would enable quick access to other videoconferencing terminals. A monetary transaction system (not shown) can include one or more of a money receptacle, credit card swipe, data entry screen or pad for inputting financial information and verbal methods of input directly to a microphone connected to an audio interpretation device or a live operator.

The present invention can be configured with any type of display 2 including projection, both front and rear, CRT and any type of flat panel technology. In other words if a device produces an image usable for videoconferencing then it is applicable to the present invention. In such circumstances where the display 2 consists of a projector and a screen the screen is what is placed at an angle of between about 30 and 60 degrees with the beamsplitter 6. The projector, whether front or rear projection arrangement, can be placed far from the beamsplitter 6, even hidden in the ceiling, the floor, table, desk or terminal housing. The projector could even be mounted on the other side of the room. Given the wide latitude of potential projector placements in relation to the beamsplitter 6 the screen of display 2 is what is critical to the angle placement with the beamsplitter 6 and all display 2 projector applications of the present invention should be understood as such.

FIG. 111 illustrates several embodiments of the present invention. Camera 4 is mounted for eye contact in a podium housing 724 capturing a reflection of the conferee 82 on the beamsplitter 6. A transparent image projection screen 722 creates the floating image appearance of the imaged conferee 410. As was previously described for the FIGS. 73 and 74 and elsewhere in this text the image conferee 410 may be presented in a black field appear to be floating in a room among real room objects. The same effect can be achieved with the transparent image projection screen 722. Transparent image projection screen 722 is preferably a holographic projection screen well known in the art and can be either front projection or rear projection. Other screen technologies that provide a transparent image can be equally suited for the present invention. Projector 580 is shown for illustration is in one of many possible placement positions. An optional opposing contrast shield 721 is used to increase the reflectivity of the beamsplitter when the camera 4 captures an image of the conferee 82 upon the beamsplitter 6. Podium housing 724 is shown only for illustration and the housing can be any type of eye contact terminal including any type of furniture, desktop, hand held device, etc. An alternative camera 726 may be used instead of camera 4 if eye contact for some applications is not a requirement.

FIG. 111 also illustrates the use of a portable background 720 which is used for any see-through beamsplitter 6 application of the present invention. The portable background 720 serves three primary functions. First, it provides a visual reference point beyond the imaged conferee 410 so that it will enhance the appearance that the image conferee 410 is not confined to an image display but shares the same room space. Secondly, the portable background 720 provides a highly controlled area so that contrast of the imaged conferee 410 reflected upon the beamsplitter 6 can be maintained. And thirdly, because of the contrast enhancement, the image will appear brighter to the conferee 82. Ideally the critical area 728 is black or dark colored so that the image conferee 410 image is seen against that dark color and thereby improving contrast of the image conferee 410. The critical area 728 could be in the shape of the image conferee 410 or widened for critical "dark" area as viewers observe the image from oblique angles. The critical area 728 could have some graphic elements and need not necessarily be one continuous color hue. It may also be an advantage to place the critical area 728 close to the image reflection position 436 (see FIG. 74) and then the portable background 720 can be placed further back beyond the eye contact terminal. The critical area 728 may comprise a shield placed on the beamsplitter 6 or just behind it and that shield may also contain the camera 4. The critical area 728, when formed as shield, may also be approximately the shape of the imaged conferee 410 and that shield may be configured as a substrate that can alter between states of transparency and opaqueness. Still further the portable backdrop 720 can conceal the camera 4 (not shown) when used in the configuration of being aimed through the beamsplitter 6 which reflects the display 2 or through the transparent image projection screen 722.

FIG. 112 illustrates the present invention in a group conferencing mode with two or more camera 4 and two or more display 2 making a display array 738 in a group eye contact terminal 730. With multiple displays many conference participants can be seen on the beamsplitter 6. These participants can be all from one location or from many distant locations creating a continuous presence multipoint conference. Two or more camera 4 behind the beamsplitter 6 can be positioned at whatever optimal position is necessary to carry on the best experience. In many circumstances it may be preferable to have a camera 4 associated with each display reflected by the beamsplitter 6. In other circumstances two camera 4s may be placed in the dual camera position 734 where one camera captures half the room and the other camera captures the other half of the room. It is also useful to split a single camera 4 image to be placed on two or more displays 2.

Dual camera position 734 is ideal to create the most accurate horizontal eye contact. The wider the display the more frustrated eye contact becomes because the conference participants will look at a person at one end of the display and not the camera in the center of the display array 738. This can be solved by placing two or more cameras on linear actuator tracks 736 so that the cameras can be adjusted to whatever locations best suits a particular application. For example if only two display 2 images are seen (the middle two of the array display 738) then the dual camera position 734 may be ideal. If four displays are operating it may be best to position the cameras further out with the farthest display. The linear actuator track 736 can be fully automatic and correspond to remote controls or preprogrammed controls (also including panning, tilting and zooming controls). A method to eliminate the need the for a linear actuator track 736 is to place many cameras in appropriate eye contact locations then switching occurs between cameras for a given conference arrangement.

The controlled background 732 is used when more then one camera is capturing several conference participants. Though the camera may create a perfect line up of participants across the table, when one of the participants gets up from his seat his image could be seen from more then one camera as a result of camera capture overlap of the background. This is not a problem if the there are two cameras in the dual camera position 734 with each camera capturing one half of the room and background. When there is a camera capture overlap of the background 732 it is preferable that the background appear not overlapped when displayed on display array 2. Many methods can achieve this such as orienting room décor and wall color to match so that it does not appear overlapped when looking at the display array 738. Image processing techniques such as blue screen or image isolating techniques can be used to achieve the same ends. Also in the case when a person does walk across the back of the room image processing techniques could remove or synthesize the images so it appears that only one image of the person is seen even though multiple cameras are capturing the same image from differing perspectives.

Ultimately what is experienced by the configuration in FIG. 112 if a distant site has the same configuration is an extension of the local conference room with the distant conference room. That extension is not necessarily with matched décor but rather as if a window unto another room exists and the display technology all but disappears out conscious awareness. To further aid is this projection screens can be used that are bezeless or other bezelless display technology can be used. Display array 738 is optionally seen as arced which assists all the local conferees to see the display array 738 at a minimum oblique angle. Though shown with the display array 738 facing upward it may as well be reversed and faced down toward the beamsplitter 6.

FIG. 112 need not be applied to just group but could also be applicable for a single user terminal with two more displays and two or more cameras. It could also be configured as a desktop system, as portable and also built into many different types of furniture. The configuration of FIG. 112 can also have a transparent beamsplitter 6 so that many imaged conferees could be seen among room objects such as described for FIGS. 73 and 74 and elsewhere in the text. A high contrast shield can be placed behind the beamsplitter 6 for increasing the contrast of the image (not shown). The beamsplitter 6 could also be in sections and creating the option for many modular sections (not shown) that can be added to as desired for a given application. The multiple cameras 4 can also be used in conjunction for creating stereo images for display on 3-D displays or requiring 3-D glasses to view. FIG. 112 should be understood that only one camera minimally be needed with two or more of the display 2. Also only one display 2 is needed with two or more of camera 4. It should be expressly understood that configurations of the present invention that uses multiple displays or multiple cameras will benefit from all of the other embodiments herein in taught in the illustrations and description.

FIG. 113 illustrates beamsplitter 6 configured as a heat stretched Mylar beamsplitter 742. The stretching occurs through applied heat shrinking the Mylar plastic and thereby stretching the film to form a flat mirror. The Mylar frame 740 serves to hold the Mylar 742 from all sides. The heat process can be conducted with portable heaters (not shown) that can be used at the installation site and thereby create beamsplitters much larger than doorways, windows, and elevators would otherwise permit passage. FIG. 114 illustrates a tension stretching system with tension frame 744 with rubber tensions sections 745 pulling equally tension stretched mylar beamsplitter 743. The tension stretching can be by any means including springs and other stretching methods. FIG. 115 illustrates a memory plastic substrate 746 that can be rolled up and then when released from a roll returns to a rigid flat memory position forming a flat beamsplitter surface 748. The beamsplitter coating can be a laminated Mylar beamsplitter or the coating can be applied directly to the memory plastic substrate. FIGS. 113-115 all permit the ease of fabricating beamsplitter 6 at the installation site, reduce expense of the beamsplitter 6 and reduce the complexity of shipping where fragile glass beamsplitters require greater care in handling.

FIG. 116 illustrates the use a micro light trap contrast shield 750 to improve the reflectivity of the beamsplitter 6 and also improve the contrasts of the reflected image from display 2. The light trap material is typically a black fibrous material that absorbs light in such a way as to maintain the darkest black even when ambient light may be impinging upon it. Micro light trap material can be at its most simple black velvet fabric and at its most sophisticated carbon fiber material used in laser devices to absorb light.

FIG. 117 illustrates the use of a scrolling text system that can be used to cue text for the user of the present eye contact videoconferencing invention. Scrolling text 752 is seen overlaid upon the imaged conferee 410 permitting the conferee 82 (not shown) to see both simultaneously. In so doing the conferee 82 can view the imaged conferee 410 and also read from a prepared scrolling text 752 and maintain perfect eye contact the entire time. Various scrolling systems can include computers to perform the scrolling and the video overlay. The conferee 82 can control the speed of the controlling through one of many different methods. The conferee 82 may also select to not overlay the scrolling text and switch between a scrolling text mode and a videoconferencing mode with the image of the imaged conferee 410 on the beamsplitter 6.

Another embodiment seen in FIG. 117 is a trapezoidal beamsplitter shape 753. This shape is applicable to any configuration of the present invention and offers several distinct advantages. One advantage is it reduces the amount of display 2 bezel, desk surface, table surface, carpet or ceiling reflected and seen in the beamsplitter 6 by the conferee 82 (not shown) depending on the particular configuration of the present invention. By shaping the beamsplitter 6 more narrow toward the display 2 it keeps the beamsplitter 6 as small as possible reflecting at minimum the display 2 image. The beamsplitter 6 then widens at the top forming a trapezoid beamsplitter shape 752. The wider portion at the top is useful because it enables a wider viewing angle of the display 2 upon the reflection of the beamsplitter 6 by conferee 82 (not shown).

FIG. 118 illustrates the use of a Control Terminal with at least a video teleconferencing system 762, display control input system 760 and a collaborative computer signal system 758. The Control Terminal controls the Receive Terminal that consists of at least a second video teleconferencing system 756, and a display control system 754 for operating the display 2 image output as seen on the beamsplitter 6. From the Control Terminal a teacher, for example, can control the Receive Terminal and thereby affect the image output of display 2. For further example the teacher selects from the display control input system 760 a display format that then is signaled via connection line 766 (hardwired or web-addressed connectivity) to the display control system 754 to switch between the output of the collaborative computer signal system 758 via computer signal line 764 or the video teleconferencing signal connection line 768 and thereby effecting the signal type sent over line 770 to the display 2. With the present invention a teacher (for example) can control the distant display 2 by switching between, for example, NTSC and XGA. The advantage is live switching of the remote display 2 affords native resolution for the given signal format. More advanced features include remotely accessing the full array of the display 2 features including on/off. A more advanced system includes side-by-side XGA with video, picture-in-picture and transparency of video over computer image. Also the picture-in-picture mode can create the appearance of a computer data window over the shoulder of the imaged conferee 410 (not shown) and appear like broadcast TV. As seen in the figure the second video teleconferencing system 756 is connected to the display control system by a signal line 771.

FIG. 119 illustrates a variant of display 2 herein referred to as pass-by reflective projection eye contact display. The projection beam from projector 580 passes by, but not through, the beamsplitter 6 onto a front projection screen 776. The front projection screen 776 can be flat or dimensionally shaped. The camera 4 is aimed through both the beamsplitter 6 and the projection beam to capture eye contact images of conferee 82. The advantages of pass-by reflective projection includes allowing the projection beam to take up the same space as the beamsplitter 6 and thereby making the system much smaller than if the projection pathway was somewhere else (such as below or above the display). Various keystone correction techniques may be employed to ensure the image on the front projection screen 776 is properly shaped. While ideal for applications with a transparent beamsplitter 6 as seen in FIGS. 73 and 74, and elsewhere, an optional contrast background 780 can be used to improve the reflectivity of the beamsplitter 6. Still further to reduce the reflection of ambient light such as ceiling lights light block 778 can be used. The entire pass-by reflective projection display can be built as one integral device or separately with parts mounted in part into tables, desks, podiums, etc. and a projector mounted in the ceiling for only one example. FIG. 120 illustrates the present pass-by reflective projection display configured as a desktop terminal with an additional projection fold mirror 779. The entire pass-by reflective projection display can be configured as a self-contained desktop terminal housing (not shown) and can also be configured to fold up compact when not in use (not shown) in either the desktop, furniture of larger room based versions. All of the embodiments of the present invention are applicable to a display 2 based upon the pass-by reflective projection pathway.

Another embodiment of FIG. 119 is a front camera position 774 used when in some applications eye contact may not be needed. Still further a lower camera position 772 enables the camera to be lowered on the beamsplitter 6 so when the present invention is used in the transparent mode the camera is concealed behind the reflection of the bust of the imaged conferee 410 (not shown). Although in this configuration eye contact alignment is not ideally directly behind the eyes of the imaged conferee 410, the camera 4 is, though, concealed behind a portion of the reflected image. This is especially useful for any configuration of the present invention whether it uses pass-by reflective projection or any in other type of display. When in a transparent mode of use the camera 4 can be lowered to shoot through the bust portion of the imaged conferee 410. Then in a high contrast mode with, for example, the contrast background 780 or the micro light trap contrast shield 750 (FIG. 116) or opaque material 50 (FIG. 12) the camera 4 can be positioned behind the ideal eye contact region. Pass-by reflective projection eye contact is also useful when a large room display is required that needs to be up to and beyond 20 feet wide.

FIG. 121 illustrates a generic example of the present invention that can be folded up to roll through doorways as seen in FIG. 122 upon wheels 454. Ideally the folding functionality will reduce the horizontal width creating a narrow device for transport and storage. While certain components can be removed to achieve this ends it is possible, as illustrated, to leave the entire device intact. Beamsplitter 6 tilts up upon a back hinge 782. The display 2 folds up upon a back display hinge 784, a front reflection tray 790 folds down with a tray hinge 786. Other components can also be stowed in the same such as rack mount peripherals, lights, microphones, speakers, etc.

FIG. 123 illustrates the ideal camera placement zone 792 at the image reflection position 436. Camera 4 is seen in this bird's eye view placed over the beamsplitter 6 with the display 2 underneath (not seen). The straight-on conferee 794 looks directly into the camera 4 while looking into the ideal camera placement zone 792 (which would be the eye location of the imaged conferee 410 (not shown). A troublesome issue arises for conferees viewing from the extreme left conferee 798 and the extreme right conferee 796 for they do not look into the camera 4 when viewing the ideal camera placement zone 792. FIG. 124 resolves this problem by placing the camera farther back at the image reflection position 436 so that all the conferees can make eye contact and look into the camera 4. Camera position 800 though is ideal because it ensures the overall terminal can be as small as possible. A mechanism to move the camera back and forth from being over the beamsplitter 6 and to, or at least closer to, the image reflection area 436 is a useful embodiment. Specific mechanical systems can include motors or simply be a manual modification of the camera placement. Another method to resolve the issue is to use multiple cameras (FIG. 125) with differing perspectives for each conferee as seen in left position 803, right position 802 and middle position 801. Here all the conferees can view the ideal camera placement zone 792 but the cameras are all still over the beamsplitter 6 (maintaining a smaller terminal size). Another method not shown is to place a mirror at the plane of reflection and capture and reverse the direction of the camera 4 so it captures an image off the mirror yet remain over the beamsplitter 6.

Figure 126:
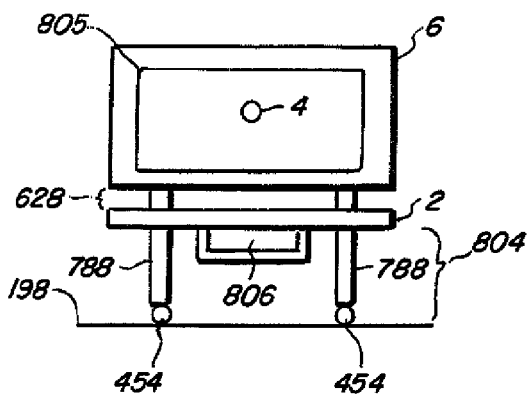
Figure 127:
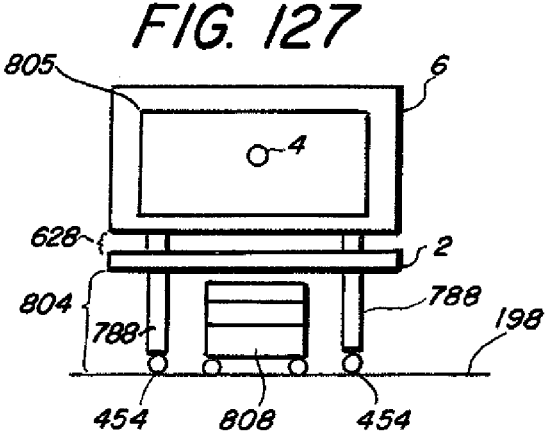
Figure 128:
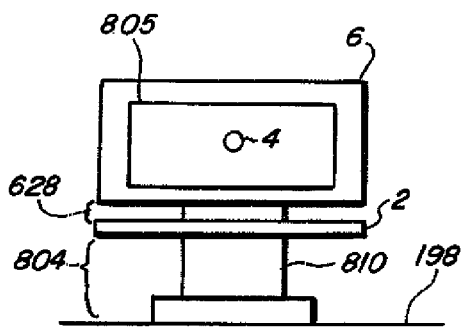
Figure 129:
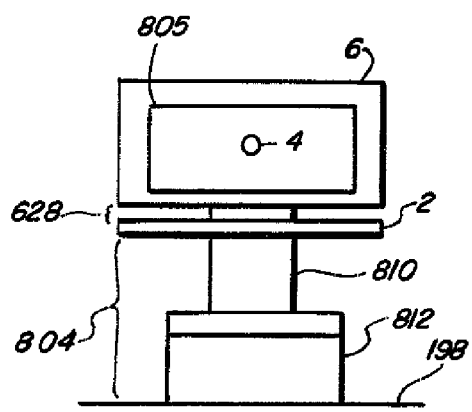

FIG. 126 illustrates the present invention configured as a roll-about for either personal or group conferencing use. Display 2 is best served as a plasma panel, or other slim display technology. Such slim profile display technology permits the configuration of forming a canopy over the floor 198 as signified by an open canopy area 804. Not only does the open canopy area 804 improve overall aesthetics of the present invention by cutting down on the appearance of bulk it also provides a functional area for component rack 806. FIG. 127 further takes advantage of the open canopy area 804 by permitting a separate component rack 808 to be stored underneath the display 2 in the open canopy area 804. For reference a reflected image 805 of display 2 is seen upon the beamsplitter 6. Side support legs 788 are directly affixed to the wheels 454 and serves as the base structure holding up the beamsplitter 6, the camera 4 and the display 2. FIG. 128 offers another methodology for forming the open canopy area 804. Pedestal support rack 810 serves as both a component rack (not seen) and as the main structural support for the display 2, the beamsplitter 6 and the camera 4. Wheels can also be included beneath the pedestal support rack 810. FIG. 129 presents a height raising system with a pedestal section 812 that can raise and lower the entire terminal to table height or to podium height or at any desired height from the floor for any particular application. As the terminal raises so also does the useful open canopy area 804 increase. The pedestal section 812 can be raised and lowered manually or by a motorized or other type of lift-assist mechanism. FIG. 126-129 also illustrates optionally the separation space 628 as described for FIG. 107. The separation space 628 permits the conferee 82 to view the room environment between the beamsplitter 6 and the display 2 creating an improved focal point of the imaged conferee 410 by being isolated away from the display 2 (not shown).

Figure 130:
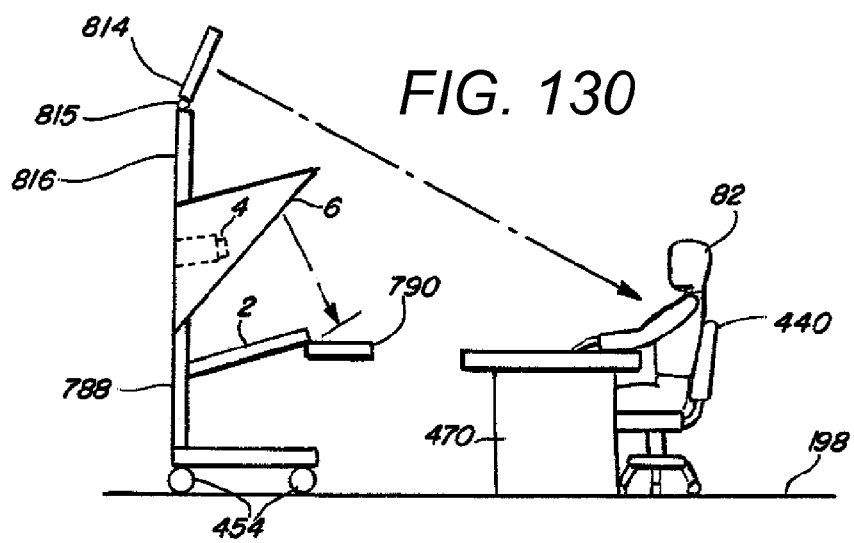

FIG. 130 illustrates a directable light 814 that can tilted by light hinge 815 and be raised and lowered and swiveled by an extension rod 816. Proper lighting is the hallmark of excellent videography. As light technology improves and low light sensitive cameras improve they will be readily integrated to all configurations of the present invention. Technologies that use invisible spectrum light to the human eye can also be deployed with cameras tuned to receive that wavelength of light are also applicable. Generally a soft bank of color corrected florescent bulbs is ideal for this or any videoconference application. The directable light 814 when retracted can be folded down upon the camera cavity and removed completely from the view of the conferee 82.

Figure 131:
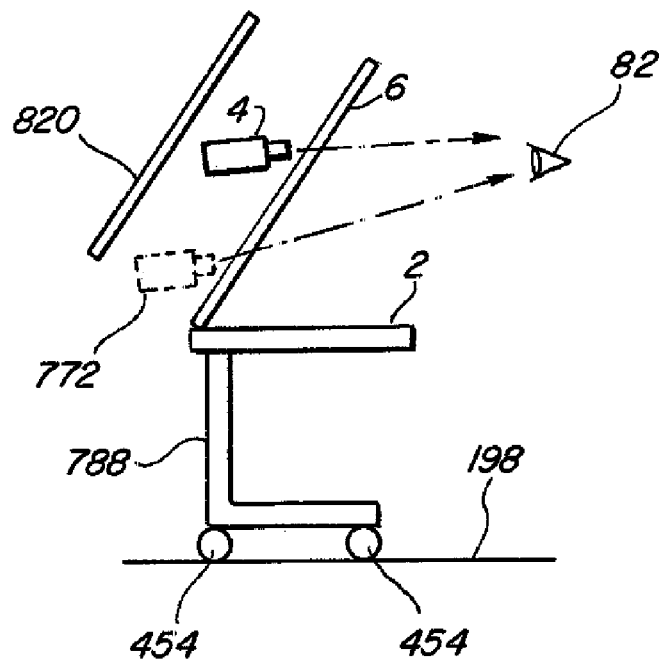

FIG. 131 illustrates the present invention serving in two functional modes. As previously described for pass-by reflective projection (FIGS. 119 and 120) the present invention is convertible between a transparent system where the room behind the beamsplitter 6 can be seen by the conferee 82 and also a high contrast mode where a generic contrast shield 820 can be added for high quality deep black level video. When used without the generic contrast shield 802 the camera 4 can be positioned into the lower camera position 772 which is the area covered by the reflected bust of the imaged conferee 410 (not shown). This may also include repositioning a small camera housing as well (not shown). In the high contrast mode the generic contrast shield 820 is laid to the back of the beamsplitter 6 and the camera 4 is positioned to the proper eye contact region behind the beamsplitter 6. The generic contrast shield 820 can be as simple as a black piece of plastic or be a micro light trap fiber material or a smoked piece of plastic that is partially transparent or as advanced as an electronic adjustable substrate that can switch between gradations of transparent and contrast opaque.

FIG. 132 illustrates another embodiment of the present invention which conceals an eye contact terminal 836 behind a false wall 830 so that it appears to be built-in. False wall 830 is positioned in front of the eye contact terminal 836 inside of an upgraded room 834. The false wall 830 is made modular, easily changeable to various décor styles and to accurately match the eye contact terminal 836 size so as to give the appearance that the eye contact terminal is apart of a permanent built-in audio/visual wall. Ideally the false wall 830 can be easily removed for access to the eye contact terminal 836. Doorway 832 is shown for reference leading into the upgraded room 834.

FIGS. 133-135 illustrate various modes of image display as seen in the reflected image 805 originating from the display 2. FIG. 410 illustrates the image of the imaged conferee 410 which can switch to a side-by-side video image with a data image (FIG. 134) then switch to a picture-in-picture view (FIG. 135). Also not seen is the reflected image 805 changing completely to a data screen yet the audio of the videoconference can continue and also a transparency mode where the video image is overlaid on the data image. In the picture-in-picture mode the small picture can be either the data image or the video image. It is also possible to have two video signals or two computer signals of which one is used for conferencing and the other is used for presentation information or another conferencing image. Switching from various modes can be automatic or manual either by the conferee 82 or the imaged conferee 410 and or a conference operator. As the image conferee 410 changes position on the reflected image 805 it is preferable that the camera remain behind the image conferee 410 eyes. In FIG. 133 the camera is located typically in the center and about ⅓ down from the top of the image. For FIG. 134 the camera moves to the side as the image conferee moves to the side. And in FIG. 135 the camera moves behind the picture-in-picture with the image of the imaged conferee 410. Camera movement can be manual, motorized or multiple cameras can be affixed behind the beamsplitter 6 in all the preset locations (not shown).

While previously in this text the present invention has been detailed at length for configuration as a desktop device there are other additional elements related to the design on the desktop if a very large flat panel is used. For example a 20" diagonal or larger flat panel may best lay flat on the desk and then the beamsplitter terminal section 66 can fold down upon the display 2 and the keyboard 60 (or any human interface device) as shown in FIG. 136. Beamsplitter terminal section 66 can also be just a beamsplitter 6 used for a transparent mode of use or with a tinted layer as well to add contrasts (not shown). Double hinge 846 (FIG. 137) not only permits the beamsplitter terminal section to lift up to proper angle in relation to display 2, but also it permits the display 2 to be lifted at an angle essentially then blocking the display 2 image from the conferee's 82 direct observation. Certainly, if so desired, image blocking film 10 can be used as well (not shown). Support base 848 supports the display 2 and the beamsplitter terminal section 66 at their proper angles when in use. Another embodiment is to use a lift-assist hinge 852 so that the entire display 2 can raise from a closed position as seen in FIG. 136 to an open position as seen in FIG. 138 permitting the display 2 to form a canopy over the desktop. A mini-stiff hinge 850 permits adjustability of the angle of the beamsplitter terminal section. The lift-assist hinge 852 can be a spring or other mechanism to assist the lift process. It is also possible that there is no assist feature and the entire display can be manually positioned to form a canopy over the desktop.

FIG. 139 illustrates the advantages of a camera 4 that has digital panning and tilting over a common mechanical method. A required mechanical area 856 is the approximate area needed for the camera to shoot through the beamsplitter 6 (not shown) as it relates the reflected image 805. As a result of this substantial required mechanical area 856 the housing that contains the camera 4 needs to be considerably larger than the camera 4. The advantages of a digital panning and tilting technology is that the camera housing need only be slightly larger than the camera 4 as illustrated by a border 854. The smaller border 854 as compared with required mechanical area 856 affords greater latitude in housing configuration designs. Digital pan/tilt cameras often have image sensors with greater resolution than the actual output resolution so that there is not a noticeable reduction in image quality. Also image processing techniques are commonly deployed to ensure the image is not reduced in overall resolution as a result of digital based panning and tilting.

The size of the camera 4 and its protrusion from the beamsplitter 6 creates several problems when the beamsplitter 6 is intended to be lowered and the back side serves a working surface for a table, desk, credenza and other furniture. FIG. 140 illustrates a slanted top 860 that conceals the camera entirely so no camera 4 or camera housing is seen protruding above the slanted top 860 when lowered by a main hinge 196. Now the conferee 82 can enjoy the entire top as a working surface. Still further for reference the display 2 is shown slanted away from the conferee 82's view so that the conferee 82 can not see the image on the display 2. This is an alternate method of image blocking other than using image blocking film 10. More complicated mechanical system can also be used that permits the beamsplitter 6 to be hinged and it folds back with the camera 4 beyond the slanted top 860 (not shown). Ultimately the expectation is to eliminate any protrusion of the camera 4 or a camera housing that would affect the continuous flat working surface for the conferee 82 to use when the unit is closed. FIG. 141 offers another option and that is using a thick table top 864 that encapsulates the camera 4 so that there is not a protrusion of the camera 4 affecting the useable work surface. Still further, FIG. 142 presents a detachable camera hood 870 that detaches the hood and the camera 4 from a modified table top 866 which is then stowed inside a generic housing 862 through an access opening 874. A slide plate 872 plugs the hole so that the entire table surface is useable when the camera 4 and the detachable camera hood 870 are removed. The generic housing 862 is any type of furniture that serves in a functional mode of permitting a useful desk top, table top or any type of horizontal furniture top surface.

All of the embodiments of the present invention are applicable to the reflected conferee 82 eye contact configuration, as well as the reflected display 2 eye contact configuration. FIG. 17 originally detailed one version of reflecting an image of the conferee rather than reflecting an image from the display 2 upon the beamsplitter 6. FIG. 143 illustrates the display 2 behind the beamsplitter 6 and the camera 4 is aimed up to the beamsplitter 6 that has the reflection of the conferee 82 (not shown). A reflected conferee terminal support 882 holds in position the display 2, the beamsplitter 6, a reflection control shield 888, and a camera contrast shield 886. The reflection control shield 888 is a black or dark substrate that eliminates unwanted reflection upon the beamsplitter 6 that might be seen by the conferee 82. The camera contrast shield 886 ensures the highest reflectivity of the beamsplitter 6 so that the camera 4 does not capture images through the beamsplitter 6. Typically the camera contrast shield 886 is made of a black substrate so that camera will capture images that are only reflected by the beamsplitter 6. The camera control shield 888 forms a canopy above the floor permitting a versatile component space 880. That space 880 can permit a permanent rack system (not shown) or provide an open area for a separate rack system to store underneath the open canopy area 804. FIG. 144 illustrates the same configuration of FIG. 143 except that the camera is aimed down onto the beamsplitter 6 instead of up as is illustrated in FIG. 143. FIGS. 143 and 144 also illustrates optionally the separation space 628 as described for FIG. 107. The separation space 628 permits the conferee 82 to view the room environment between the beamsplitter 6 and in this case between either reflection control shield 888 or the camera contrast shield 886 creating an improved focal point of the imaged conferee 410 by being isolated away from the display 2 (not shown).

FIG. 145 illustrates a side view of FIG. 143 with the front reflection tray 790 which is optional. A control display 884 is also optional and can be a separate display and input means (such as touch screen technology) that can operate at least one of a collaborative computer hardware and software, a video-conferencing communication hardware and software, a speaker, a microphone, a light, the display 2, and the camera 4. A touch screen interface can as well be incorporated into the control display 884. FIG. 146 is a side view of FIG. 144. FIG. 147 is a folding system for either the configurations seen in FIGS. 143-146. Here the elements are folded up (or can be removed—not shown) to decrease the horizontal terminal size so that it can fit through doorways and also is smaller for more compact storage. A big double hinge 892 permits the beamsplitter 6 to fold up as well as the reflection control shield 888. The front reflection tray is folded down by the use a stiff tray hinge 894. The camera contrast shield 886 is folded by a shield hinge 890. FIG. 148 functions as described for FIG. 129 which presents a height raising system with pedestal section 812 that can raise and lower the entire terminal to table height or to podium height at any desired height from the floor for any particular application. As the terminal raises so also does the useful open canopy area 804. The pedestal section 812 can be raised and lowered manually or by a motorized or other type of lift-assist mechanism.

FIG. 149 illustrates a generic reflected conferee housing 900. Illustrated is a generic working surface 903 of which when it folds down serves as a desk, table, credenza or other furniture working surface. The surface closes by an extra stiff hinge 902 which allows the display 2, the generic working surface 903, the beamsplitter 6 to fold down upon the camera 4, and the reflection control shield 888. The reflection control shield 888 is optional if the cavity of the generic reflected conferee housing 900 is sufficiently dark colored inside. The camera contrast shield 886 can be folded by a hinge (not shown) or can be a collapsible cloth material that simply bunches up or rolls up when it folds down between the beamsplitter 6 and the display 2. The top mounted camera 4 version is seen in FIG. 150. Here the camera 4, the reflection control shield 888 and the beamsplitter 6 all fold toward display 2 by top mount stiff hinge 189. Then display 2 folds down by the extra stiff hinge 902 upon the camera contrast shield 886. The camera contrasts shield 886 is optional if the cavity of the generic reflected conferee housing 900 is dark colored in the cavity.

FIG. 151 illustrates a desktop reflected conferee terminal where a graduated stiff hinge 901 permits the display 2 to fold down upon the beamsplitter 6 and also upon the reflection control shield 888. The camera contrast shield 886 can fold down by a hinge (see FIG. 153 by a front shield hinge 910) or can be a black fabric material that can roll up or bunch up when it is folded down. The beamsplitter 6 when closed covers the keyboard 60 as an option. FIG. 152 illustrates the top mounted camera 4 where the reflection control shield 888 and the beamsplitter 6 fold upon the display 2 by wide top hinge 903. The display 2 is then folded down upon the camera contrast shield 886 by the graduated stiff hinge 901. FIG. 153 also permits a direct view of the display 2 when the beamsplitter 6 and the camera contrast shield 886 are folded down.

FIG. 154 illustrates the reflected conferee eye contact configuration with multiple display array 914 and a multiple camera 916 mounted to a horizontal linear actuator track 918. The entire system is supported by a wide support structure 912 which can be any type of furniture or for that fact any stylish design. For details on specific functionality see the text for FIG. 112 of which all is transferable to this reflected conferee eye contact configuration of this FIG. 154. Certainly one camera 4 (not shown) could be used with multiple displays or one display 2 (not shown) with two or more cameras represented by the multiple camera 916. This configuration can also be used for one person or many and is also applicable to a desktop configuration (not shown) rather than a floor standing configuration.

All of the reflected conferee configurations of the present invention such as those illustrated in FIGS. 143-159 (but not limited to these figures) are cross applicable to all of the embodiments of the reflected display configuration fully illustrated in the figures and described throughout the text. These include, but not limited to, building the terminal as a piece of furniture, roll-about, foldable, changeable display from computer to television image, remotely controlling the display and its image output, scrolling text presentation, pan/tilt/zoom cameras, monetary transaction systems, laminated beamsplitters and all other beamsplitter improvements, use with secondary displays with input means, cable management systems, etc.

All of these cross applicable embodiments from the reflected display embodiments to reflected conferee configurations are also relevant to a beamsplitter 6 that is used to reflect the image of the conferee 82 and that beamsplitter 6 covers only partially the image of the display 2. A partially covering beamsplitter 6 (not shown) has the advantage of protruding less from the front of the display 2 and thereby reduce the overall terminal depth. A partially covering beamsplitter 6 can actually have edges, such as the top and/or bottom edges of the beamsplitter 6 visibly intersect the image on the display 2 from the conferee 82 perspective. Certainly, though, visibly intersecting ways to conceal the intersection is desirable. One method of eliminating the visible intersection is to fabricate the beamsplitter 6 with a parallel portion then gently arc out to a flat camera capture zone which is the part of the beamsplitter at an angle to the display 2 (not shown) having then in total two planes. Still further an additional parallel portion can be used as well forming three distinct planes, one parallel on the bottom then an angled portion for camera capturing the reflection of the conferee 82 then another parallel portion on the top. This two or three plane beamsplitter 6 has the advantage of not having any visible edges intersecting the image of display 2 from the perspective of the conferee 82. Typically the beamsplitter 6 will be oriented anywhere from 25-80 degrees and usually 45 degrees to the image display 2 and this same angular relationship is also similarly equivalent if the partial beamsplitter 6 is used in front of the display 2.

As seen in FIG. 31 the present invention can be hung on the wall 162. An embodiment of the present invention is to attach the eye contact terminal to a wall with a bracket system so that it can be either manually or robotically motorized to be positioned back and forth from the wall (not shown). This is applicable to not only small videophones but also large eye contact terminals up to 20 feet wide. Ideally in a group conference the eye contact terminal, when not in use, retracts away from a conference table to permit people to sit on both sides of the table. The eye contact terminal, when in operation, mechanically moves from the retracted position against the wall closer to the conference table (away from the wall) so that the imaged conferees can appear to sitting around the table. Another configuration does not attach the terminal to the wall, but rather has self-standing modules that permit the retracting mechanical motion. Still further the present invention when mounted on wheels can achieve the same retracting feature by manual or robotic means (not shown).

As seen in FIG. 17 the reflection control shield 888 was not used and is an optional embodiment of the present invention. The reflected conferee configurations of FIGS. 143-154 need not include the reflection control shield 888. In such a case, the beamsplitter 6 will reflect the table or some other part of the office or meeting room environment.

FIG. 155 illustrates the imaged conferee 410 whose image is isolated in a black field. The grandparent (U.S. Pat. No. 6,710,797) of this present invention for FIG. 74 describes at length isolating techniques so that the imaged conferee 410 appears in a black field. All these techniques from complex image manipulated isolation to chromakey to a simple black painted side wall 456 background are relevant to the reflection control shield 888 backdrop effect as seen in FIG. 155. The imaged conferee 410 appears to be superimposed in front, within or behind the backdrop depending upon the plane of reflection relative to the plane of the display 2 displaying the image of the imaged conferee 410. Since the surrounding image of the imaged conferee 410 on display 2 is black, the superimposed reflection of the reflection control shield 888 will become the dominant visible image in the reflection around the conferee 2 if the reflection control shield 888 is substantially bright and colorful.

FIG. 155 illustrates the camera 4 being aimed first at a small mirror 920. The purpose of this small mirror 920 is to correct the mirror inverted image from the reflection of the beamsplitter 6. Of course, many cameras have mirror invert capability in its electronics so the small mirror would be unnecessary. Also image signal flip appliances or computer software can process the video camera signal and correct the mirror inversion so that the image appears correct when displayed.

Another embodiment, as seen in FIG. 155, is to control unwanted reflection of the room environment on the beamsplitter 6 by modifying the reflection control shield 888 as a backdrop that is reflected on the beamsplitter 6 and superimposed with the imaged conferee 410. In this embodiment, the reflection control shield 888 serves as a backdrop superimposed with the image of the conferee 410.

The reflection control shield 888, when black or dark in color is a type of clarity enhancing backdrop. The black or darkly colored reflection control shield 888 rejects unwanted light from being reflected upon the beamsplitter 6 and thereby improves the clarity of the beamsplitter 6 from the perspective of the conferee 82. Still further, the reflection control shield 888 is configurable into a wide choice of backdrop experiences. 2-D and 3-D static image graphics that are front lit or back lit have been utilized for the present invention. Also, full motion and full color image displays have been utilized. Also, real object sceneries (not shown) have been deployed in the present invention all reflected by the beamsplitter 6 to create a backdrop visible by the conferee 82.

FIG. 155 further embodies a reflection back plane 921 that extends to the left and right of the display 2 and may optionally extend on the top and the bottom of the display 2 and thereby surround the display 2. The reflection back plane 921 is a black or dark colored background to enhance the reflection of the reflection control shield 888 backdrop. The display 2 is preferably housed in the reflection back plane 921 so that the bezel of the display 2 is not seen. The principle goal is to create a seamless black area that extends from the display 2 black image around the imaged conferee's 410 image with the reflection back plane 921. If the bezel of the display 2 were seen through the beamsplitter 6 it would reduce the effectiveness of seeing the imaged conferee 410 appearing to be in a scene with the back drop made possible by the reflection control shield 888. As seen in FIG. 155 the reflection control shield 888 is dimensional and creates a reflection on the beamsplitter 6 that appears dimensional enabling the imaged conferee 410 to appear to float in the dimensional backdrop.

The reflection control shield 888 may be constructed out of wood, plastic, metal, glass, to name only a few possible material choices. The reflection control shield 888 can be flat or dimensional. When dimensional, as seen in FIG. 155, a multitude of shapes may be utilized to best afford the creative choice for a dimensional backdrop seen in the reflection of the beamsplitter 6. As seen in FIG. 155 the reflection control shield has three sides to create a substantial depth cue when seen in the reflection on the beamsplitter 6. Ledges and others shapes as well will suffice (not shown). Still further real objects such as books and forced perspective scenery simulating an office (not shown) are just a couple of the myriad of options for the reflection control shield 888 backdrop. Ultimately it is a matter of staging design for what look is best for the imaged conferee 410 to appear to reside within.

The camera contrast shield 886 (FIGS. 143-159) should be understood as a light absorbing element that is dark in color. Black light trap material is ideal for this application so that as little light as possible would interfere with camera 4 image capturing of the refection of the conferee 82 on the beamsplitter 6. The camera contrast shield 886 need not be attached to the terminal but can be mounted elsewhere independent of the terminal housing and may even be a darkly painted surface, such as a room ceiling (not shown).

As illustrated in FIGS. 143-159, the conferee can see through beamsplitter 6 to see the display 2 and also can see the room environment to the left and right of the display. In FIG. 155, the plant 418 is seen through beamsplitter 6 as well as any other room environment objects, such as chairs and bookshelves (not shown). This see-through property affords the entire terminal configuration to be as minimal in appearance as possible yet retain a wide enough beamsplitter 6 for sufficient viewing angles to the left and right.

A primary embodiment of the present invention is to construct it so that there are no side walls to the left or right between the display 2 and the beamsplitter 6 as seen in FIGS. 143-159 and specifically illustrated in the perspective view of FIG. 155. As a result, many of the advantages discussed for the embodiment of FIG. 73 (grandparent U.S. Pat. No. 6,710, 797) are realized permitting at least a portion of the room environment to be seen through the beamsplitter 6. The room environment has common objects, such as a plant 418, serving as a visual reference of the residing location of the display 2 and the reflection of the reflection control shield 888 backdrop when viewed by the conferee 82 through the beamsplitter 6. The image display 2 can be the stock manufacturer's display or can be built into a surrounding custom bezel or housing. Certainly, side walls (not shown) are applicable to other configurational embodiments of the present invention and may be used as desired.

The embodiment of FIG. 155 can be any type of configuration as described in the entirety of this invention in its parent, grandparent and, great grandparent's patents. The present invention, including all embodiments described for the reverse configuration of reflecting the display 2 on the beamsplitter 6, as described herein, are applicable to FIG. 155. So the embodiment of FIG. 155 may also be configured into one of many possible combinations of this invention's embodiments. For example, the configuration of FIG. 155 may be built into furniture, including tables, desks, boardroom tables, podiums, cubicles, and so on. It may be foldable as described for FIG. 147 for ease of moving and compactness for storage. The embodiment of FIG. 155 is preferably on wheels so that it may be easily moved about. The display 2 may be any type of display including flat panel and front and rear projection and any type of 3-D display, stereoscopic or auto stereoscopic, or volumetric display system.

The camera 4 and optionally the small mirror 920 can be repositionable to capture an image from many areas upon the beamsplitter 6. For example, if the image conferee 410 were to move to differing location on the display 2, the camera 4 could be manually, mechanically, remotely, and by auto-track locating to the ideal eye contact zone for image capturing. Also, the camera 4 can be adjusted in and out from the plane of reflection, so that the camera could simulate being far behind the display 2, located at the plane of display 2, and in front of the display 2. The entire discussion of FIGS. 123-125 and the ideal camera placement zone 792 are transferable and applicable to the reflected conferee 82 configuration of FIG. 155.

FIG. 156 illustrates a desktop configuration that utilizes the reflection control shield 888 as a dimensional backdrop. A first shield depth plane 928 corresponds to a first reflected plane 934 behind the image display 2. A second shield depth plane 926 corresponds to a second reflected plane 932 shared with the image display 2. A third shield depth plane 924 corresponds to a third reflected plane 930 in front of the image display 2. The resulting effect is that the image of the conferee 410 appears to be in a 3-D dimensional backdrop scene. While it is preferred that the depth cues of each reflected plane be seen, they can be configured with only one reflected plane or any combination of reflected plane or any nuance of multiple planes behind or in front of the display 2. The reflected planes 930, 932, and 934 are shown reflected upon the reflection back plane 921.

FIG. 156 further illustrates exposing the room environment at a top opening 927. From the conferee's 82 perspective he can look through the beamsplitter 6 and see the room environment above the image display 2 and also any surrounding housing, such as the reflection back plane 921. The camera contrast shield 886 is tilted at the back up to expose the opening 927 viewable by the first conferee 82 sitting on a conferee table 936. Similarly, an opening below the display 2 and the reflection back plane 921 will expose the room environment (not shown) to the conferee 82.

FIG. 156 further shows the media display 428 (as described for FIG. 73) positioned below the image display 2 and between the conferee 82 and the image display 2. While shown mounted in front of the configuration of FIG. 156, it may also be table/desk mounted or resting on a table/desk or is built into a table/desk. The media display 428 may also be a simple touch screen display that controls one or more aspects of the terminal and related audio/visual gear.

The reflection control shield 888 can be configured into a multitude of optional appearing backdrops and utilizes numerous visual cues to achieve the desired effect of the image conferee 410 appearing to be superimposed in a backdrop. FIG. 157 illustrates a variety of methods to create a backdrop. For example, graphics (not shown) can be illuminated by a front light 938 or back lit by a back light 940. The graphics can be full color or muted in colors. Dimmers can be attached to the lights 940 and 938 to adjust the brightness of the graphic images. Alternatively, any type of a generic image display 936 can be used. There can be multiple displays that make up the reflection control shield 888 or a single display. The generic image display 936 can also be a front or rear projection system onto standard screen(s) or even a dimensionally shaped projection screen (not shown). The generic image display 936 can be 2-d or also, any type of 3-D technology and volumetric display technology. The generic image display 936 may show any type of imagery and may be full motion coordinated to the image of or voice of the imaged conferee 410. The reflection control shield 888 may also be real objects reflected onto the beamsplitter 6, such as a bookshelf or the staged scenery set of an office (not shown). Still further, the reflection control shield 888 need not be dimensional. It may be a single 2-d plane with a static graphic or an image display that is located at, for example, the first shield depth plane 928, as described and illustrated for FIG. 156.

The luminous intensity of the reflection control shield 888 may interfere with the image of the imaged conferee 410. Those skilled in the creative staging arts will appreciate that the backdrop effect should be carefully staged, so that the image of the conferee 510 does not appear to be washed out. Typically, it is best to have the brightness and most colorful part of the reflection control shield 888 backdrop towards the sides and then become less bright and less colorful near the center, where the image of the imaged conferee 410 is superimposed. Also, viewing angles should be observed as the superimposed image of the imaged conferee 410 shifts to the left or right over the reflected backdrop.

A primary embodiment of the present invention is to create an alterable reflection control shield 888 that can switch from a visible backdrop in the reflection of the beamsplitter 6 to a dark mode. Certainly, it would be ideal if both the imaged conferee 410 and the conferee 82 share the same type of conferencing system. In such a case, each can enjoy the benefits of the backdrop effect as described herein. However, common videoconferencing rooms do not have ways to isolate the image of the distant conferee in a black field nor would it be advantageous to do so. In such a case, the common videoconferencing image that has a typical meeting room or office in the picture would interfere with the reflected backdrop. In this case, the conferee 82 has the ability to selectively control the reflection control shield 888 from a first visible backdrop mode and then a second dark mode as desired (not shown). Simple switches, remote controls, software commands, voice control and so on can initiate the mode switching. Also, an image analysis system can be deployed to analyze any particular incoming image signal to determine if the imaged conferee 410 is in surrounding black image or not. The system then would automatically adjust the reflection control shield 888.

Camera concealment housing 942 is also seen in FIG. 157. The housing 942 is black or dark in color and minimizes the reflection of the camera 4 lens and body on the beamsplitter 6 that may be viewable by the conferee 82. A black painted camera may suffice. Fewer camera body sides and smooth camera bodies with no hard edges are also preferred to hind the camera 4. The lens of the camera may also include an antireflective layer or lens adaptor to reduce unwanted reflections from the lens.

FIG. 158 illustrates the present invention in the alignment of the reflection control shield 888 with the reflection back plane 921. It may be advantageous to construct the reflection back plane 921 to match the dimensional shape of the reflection control shield 888. In such a case, the reflection on the beamsplitter 6 of the reflection control shield 888 will reflect upon the matched shape of the reflection back plane 921. This assists in ensuring the reflected backdrop effect does not shift off the left and right of the reflection back plane 921 as seen from differing viewing angles by conferee 82. For example, the right side configuration of FIG. 158 shows corresponding edge and depth cues. A front shield edge 948 reflects to the same point in space as a back plane top 950. A back shield edge 944 reflects to the same point in space as a back plane bottom 946. A front shield depth point 952 reflects to the same point in space as a back plane top depth point 954. A back shield depth point 958 reflects to the same point in space as a back plane bottom depth point 956. Of course, the dimensional shape of the reflection control shield 888 and the reflection back plane 921 illustrated can be altered to any other shape as desired. Also, the system can also be configured where just the left and right edges are aligned and not the depth portions.

FIG. 159 illustrates the reflection control shield 888 backdrop above the beamsplitter 6 and the camera 4 aimed down upon it. This configuration is applicable to any configurations into rolling carts, furniture, and desktop systems. As shown in FIG. 159, a large room system can be constructed showing a standing and life-size imaged conferee 410 (not shown) communicating to the standing conferee 82. In this configuration, the display 2 may be any type of display, including rear projection. Alternatively, front projection can be deployed where display 2 is configured as a front projection screen projected upon by one of two methods. Method one is pass-by projection where a projector 962 has a beam that passes-by the beamsplitter 6 onto the front projection display 2. Alternatively, pass-through projection passes through the beamsplitter 6 onto the front projection screen display 2 from a projector 960. Both pass-by and pass-through projection should be expressly understood as a variant of display 2 and is applicable to any embodiment of the present invention where display 2 is utilized. The embodiment of FIG. 159 may be utilized in large interactive and immersive environments where it is necessary to communicate with people and seen conferenced in large room environments, such as training rooms, classrooms, scientific labs, 3-D immersive environments, and so on. Also, the reflection control shield 888 backdrop may be built into the ceiling and separate from the beamsplitter 6. In such a case, the backdrop reflection can be configured to appear many feet deep into a room area and the imaged conferee 410 appears to be in the room standing and even walking about.

The alignment of the camera 4 is preferably in the eye contact zone, capturing a reflection of the conferee 82 on the beamsplitter 6 while the conferee 82 makes eye contact with the image of the imaged conferee 410 displayed on the display 2. Those skilled in the art will appreciate the depth and breadth of the embodiments described for the reflected display 2 configurations described throughout this text and shown in numerous figures and how those embodiments are directly applicable to the reflected conferee 82 configurations as seen in FIGS. 17 and 143-159.

FIG. 111, discussed previously, illustrates the transparent image projection screen 722. The screen may be any type of transparent projection medium, including scrim and lightly diffused surfaces. The transparent image projection screen 722 is a variant of display 2 and any and all embodiments in the present invention for display 2 can be the transparent image projection screen 722. The transparent projection display 722 may be rear projection or front projection. Other display technologies are, as well, to be understood as under the umbrella definition of display 2. For example, the display 2 may be any type of 3-D display technology, including auto-stereoscopic and stereoscopic 3-D.

The promise of the information superhighway from a decade ago is just now making it to homes. The promise has been that telecommuters and teleworkers can stay at home and not waste natural resources and their time traveling. The problem is that without in-person interaction, teleworking is just not as effective as being their in the corporate office, forming teams of people sharing all the psychosocial benefits of seeing people in the eye.

While broadband access has been prolific and now well saturated into homes, there still remain hurdles to receiving quality high speed and quality data networks to homes. One hurdle has been the poor quality of service to the home, which translates into lost packets of data and thereby, flawed video. Another hurdle has been the lack of high bandwidth upload speeds. Many service providers put choke holds on upload speeds. Another hurdle has been the cost to procure and lease synchronous T1 lines into homes. So the vast majority of videoconferencing from homes has been web cameras with little windows on the computer screen. This experience is far from simulating being there in person. All the embodiments of this present invention have the technological aim to truly simulate a sense of "telepresence." Telepresence includes substantially life-size images ("substantially" includes, in some configurations, less then life-size or slightly more then life-size), true eye contact, and the placement of the image conferee 410 within the conversational space, as if, for example, sitting around a meeting table (i.e., not on a display hanging on the wall on the other side of the room).

Telepresence is a holistic approach to visual collaboration that seeks to achieve the sense that the imaged conferee 410 is as if they are actually present in the room even though he may be on the other side of the globe. Telepresence is in most respects similar to "virtual presence" as described for FIG. 73. Common videoconferencing falls short from this experience. All of the embodiments of the present invention are configurable to enable this telepresence experience. To complete the experience, though, additional issues need to be included to create true telepresence. One primary issue is in providing a network to homes that can be affordable, have high speeds in both download and upload, and has a high standard of quality of service (QoS) for minimal packet loss over data networks.

The public internet is not a QoS network, so quality cannot be assured. Someday the Internet 2 may resolve this problem to homes. "A telepresence network system" has been deployed by the inventors that offer a high QoS network to homes, creating virtual communities in the shared high QoS network. Dedicated lines have been procured overcoming the obstacles of the local provider's networks and the public internet's lack of QoS. As a part of this virtual community, for example, a master school teacher from her home regularly conferences using the terminal configuration of the present invention with another terminal configuration of the present invention located at an elementary school. True telepresence is experienced including eye contact, correct image distance as if sitting around a meeting table, and near life-size images.

As a part of this "telepresence network system", there are three primary operational versions (but not limited to these three) for use in homes for a complete visual collaboration session of seeing people and sharing data. The first operational mode is a dedicated private network or other high QoS network, such as IPv6 brought into a home that is used for both video images, so that conferees can see each other, and audio, so they can hear each other, and also shares a data connection for running collaborative software between the conferees. A second operational mode is a dedicated private telepresence network or other high QoS network, such as IPv6 that is used primarily for video and audio, so that conferees can see each other and a second network that uses the public internet or other network for data collaboration. The secondary public network affords the ability to have a backup network for video if needed for video and an ability to call other public network sites that may not be on the high QoS network. A third mode is using the public internet with the terminal configurations of the present invention. Here the video/audio and the data collaboration share the same network, although they may be accessed by a separate connection (perhaps combined in a hub in the conferee's home or in a telepresence terminal).

Central to the network design is consideration for data collaboration. While a data collaboration screen may share the display 2 of the present invention as seen in FIGS. 134 and 135, it is more ideal to have the display 2 for the imaged conferee 410 and the media display 428 (FIG. 73) for data collaboration. So the terminal configuration and usage is ultimately interrelated to the network design to fulfill a true telepresence experience.

Telecommuting has been growing substantially year by year. Telepresence is ideal to bring virtual teams together without having to transport their brain mass to a physical building complex. Instead of forcing employees to go to work, telepresence systems can empower people to create virtual corporations and organizations where the staff is geographically dispersed but shares all the same psycho-social benefits of being there in person, being made possible by true telepresence. To connect a home to another home or a home to an organization's building, careful attention needs to be given to the network design and its integration with the telepresence terminal to create a complete telepresence network system. FIGS. 160 and 161 describe telepresence networks embodied in the present invention and have, as well, been described in their various elements throughout the body of this present invention's text and the parent, grandparent, and great grandparent patents of this invention.

FIG. 160 illustrates a local telepresence terminal 990 and a distant telepresence terminal 992. Each telepresence terminal includes: an image capturing device, an audio pick-up device, and an encoder for encoding video and audio signals for transmission over a network. Still further, each terminal includes a decoder for decoding data information representing both video and audio for presenting a video signal on an image display and presenting an audio signal on a speaker. Still further, is an eye contact means for aligning the video camera capturing an image of a local conferee that is looking at the eyes of the distant conferee on the image display. Still further, the telepresence terminal creates a substantially life-size image of a distant conferee. Finally, each terminal has, optionally, a means to display data collaboration by use of a codec appliance or a computer with data collaboration software.

FIG. 160 illustrates an embodiment of the present invention which has a video-audio network connection 994 connected to a generic network 995 which enables bidirectional audio and visual content between the local telepresence terminal 990 and the distant telepresence terminal 992. The terminals 990 and 992 are connected by the generic network 994 which may the Internet, Internet2, LAN, WAN, MAN, VPN, ATM, and communicating via an IP protocol such as h.323 or a telephone network using a single phone line or ISDN via the protocol H.320 or other protocol. It is preferred that the generic network 995 is a "quality of service" (QoS) dedicated connection to ensure no image degradation. The video and audio at each terminal is encoded and transmitted to the other terminal and decoded by a codec 999 at each location. The codec 999 may be a conferencing appliance or a PC-centric conferencing system. The video-audio network connection 994 may be any type of connection such as a phone line, ISDN, satellite dish, wifi, wimax or other wireless technology, DSL and its variants, to name only a few.

Also, connected between the terminals 990 and 992 is a second network connection 996 for data collaboration made possible by a collaboration computer 1000. The collaboration computer 1000 may alternatively be a codec appliance (not shown). Alternatively, the collaboration computer may be connected directly to the codec 999. Still further, the collaboration computer 1000 may be integral with the codec 999. The second network connection 996 may be a simple data hub (not shown) joined with the video-audio network connection 994 in the telepresence terminals 990 and 992 or may use dedicated phone line(s) directly connected to the generic network 995.

Data collaboration is, in part, defined as the ability to at least one of share documents, interact with documents and interact real-time with collaborative software between the local and distant conferees. The data collaboration is displayed a on a TV or computer screen at each terminal 990 and 992, which may be the display 2 or the media display 428.

FIG. 161 illustrates an embodiment of the present invention where the telepresence terminals 990 and 992 have the video-audio network connection 994 connected to the generic network 995 and communicating via the codecs 999. Further, the terminals 990 and 992 have each the collaboration computer 1000 connected by the second network connection 996 to a second network 1003. The second network 1003 is preferably a common broadband connection over the public internet for collaboration. The QoS problems of the public internet are less of an issue for collaborative software than for real-time displaying of video. The video-audio connection to the generic network is preferably a dedicated private network where high QoS is assured to minimize data loss and image degradation. In such a network, it is preferred that access to the public network is minimized or eliminated to assure security and high QoS. The second network 1003 also can serve as a redundant network in case the generic network 995 was not functioning or if another terminal is outside a "dedicated private telepresence network." In such a case, the telepresence terminal can switch over to call out over the public internet.

FIG. 162 illustrates a telepresence network 1002 that is preferably a high QoS network that guarantees an acceptable level of packet delivery real-time, so that video and audio is not degraded. However, the telepresence network may be any type of network including the internet. The telepresence network 1002 is the central spoke of a virtual community of conferees using a true telepresence terminal 1006 (sharing the same definition as the local and distant telepresence terminals 990 and 992 of FIGS. 160 and 161). The telepresence network connects homes, offices, meeting rooms, and even rental telepresence facilities into a virtual community where virtual teams can fully interact and collaborate.

In FIG. 162 the telepresence network 1006 is routed to and through a TNOC 920 "telepresence network operations center." The TNOC 1004 enables all codec data traffic from the true telepresence terminals 1006 to be processed by its specialized services, configured for true telepresence terminals 1006, such as bridging and multipoint communications.

A primary embodiment of the present invention is the true telepresence terminals 1006 provides, at a minimum, true eye contact between conferees and a substantial life-size images to simulate the requirements of telepresence for use with the telepresence network 1002. Still further, all the true telepresence terminals 1006 are based on an established configuration of image size, image placement, and camera capturing, so that all the true telepresence terminals 1006 connected to the telepresence network 1002 correctly interoperate. Specifically, the camera 4, as described throughout this present invention text, is optically configured by the use of beamsplitter 6 to seemingly originate from the eye region of the image conferee 410 assuring eye contact among all conferees. If the camera 4 is located other than the eye region of the imaged conferee 4, eye contact between conferees will not occur. So a commonality in configurational design is necessary to assure that all the true telepresence terminals 1006 are configured similarly to display similar size images and those images, when displayed on the display 2, will align with the camera in the eye region of the displayed conferee (for example, see FIGS. 73 and 133-135).

Optionally, the commonality of the true telepresence terminals 1006 may include background image preparation as explained for FIG. 73 to isolate the image of the conferees on a black or other controlled background. By doing so the see-through beamsplitter 6 effect of FIG. 73 and the reflection control shield 888 backdrop effect of FIGS. 143-159 will all be standardized among the community of true telepresence terminals 1006 that are connected to the telepresence network 1002. By doing so the imaged conferee 410 is viewed superimposed either among a room environment or among a backdrop in a room environment.

The telepresence network 1002 may include all the data collaboration features, collaboration computers 900, media displays 428 and all its options, various network architectures and functionality as described for FIGS. 160 and 161 and previous to that the introduction of the "telepresence network system." This includes the second network connection 996 and/or a second network 1003 integrated with the communications design of the telepresence network 1002.

A telepresence service center 1010 is connected to the telepresence network 1002. The service center 1010 contains one or more telepresence terminals 1006 with the same telepresence configurational commonalities as explained for the telepresence terminals 1006 assuring seamless use among all conferees in the virtual community. Located at the telepresence service center 1010 are live service telepresence video operators assisting conferees using the telepresence network 1002 and optionally their telepresence terminal 1006. The service center need not have true telepresence terminals 1006 if live operator services are not required.

The telepresence service center 1010 provides one or more of the following benefits to the conferees utilizing the telepresence network 1002 in conjunction with the TNOC 1004: bridging services with the telepresence terminals 1006 in and/or out of the telepresence network 1002, multipoint connectivity services with the telepresence terminals 1006 in and/or out of the telepresence network 1002, video mailbox, live operator(s), technical help desk, always on connections, scheduling services, bandwidth adjustments, status and availabilities of connected conferees, remote network and telepresence equipment maintenance, translation service where a translator facilitates from his own true telepresence terminal 1006 with two or more conferees with terminals 1006, digital recording of telepresence sessions for playback on true telepresence terminals 1006 or other display systems, and access to other commercial services. Access to the telepresence service center 1006 and/or the telepresence network 1002 and/or the TNOC 1004 can be fee-based on a use-per-need basis for an individual service or can be included into service packages. Additional services can also be offered, such as entertainment delivery, online gaming, and competitions, such as global chess matches or poker tournaments. Also webcasting events and seminars, and even TV broadcasting for live distribution into TV networks can be services included with the telepresence network 1002.

One use of the true telepresence terminal 1006 is to have a simplified connectivity where when it is turned on it automatically connects to the telepresence service center 1010. Scheduling and availability of telepresence terminals 1006 can be listed on display menus, as well as a directory, and live operators can also optionally engage telepresence sessions with other terminals 1006. The connection between the terminal 1006 and the network 1002, when not transmitting audio and video through the telepresence network 1002, can adjust automatically in bandwidth and lower to the data connection needed to see on screen menu data originating form the telepresence service center 1010. The onscreen menu (not shown) may be the media display 428 and also display all the other features and benefits of the "telepresence network system" and the offerings of the telepresence service center 1010.

The telepresence network 1002 is conceived to link to homes, but may be used for other application specific needs. For example, the telepresence network 1002 can be a secure network for banking applications with conferee tellers with full interactive transaction capabilities, including cashier check dispensing and withdrawing money. Loans can also be applied for with a conferee loan agent with the ability to sign documents and transfer electronically from the true telepresence terminal 1006. All relevant customer service industries can benefit from the telepresence network 1002 and the true telepresence terminal 1006. Medical services including diagnosis, treatment, dispensing pharmaceuticals and other medical equipment, such as an EKG device, can be configured as a part of the true telepresence terminal 1006. Distance learning and corporate training can, as well, benefit from the true telepresence terminal 1006 and the telepresence network 1002. Still further, the telepresence terminal 1006 can serve as an interactive kiosk that can include all the benefits of kiosk peripheral functions, such as dispensing products, reading credit cards or purchasing services, such as airline tickets. The true telepresence terminal 1006 has also been used as a job interviewing device so that employers can interview candidates eye to eye via the telepresence network 1002. The true telepresence terminal 1006 has, as well been utilized for security systems, allowing personnel and guards to interact with people at remote locations and optionally record interactions. The true telepresence terminal 1006 is an invaluable tool for remote interrogations and as a crisis management communication tool because of its superior human factor design enabling natural communication with eye contact.

The following claims are thus to be understood to include what is specifically illustrated and described above, what is conceptually equivalent, what can be obviously substituted and also what essentially incorporates the essential idea of the invention. Those skilled in the art will appreciate that various adaptations and modifications of the just-described preferred embodiment can be configured without departing from the scope of the invention. The illustrated embodiment has been set forth only for the purposes of example and that should not be taken as limiting the invention. Therefore, it is to be understood that, within the scope of the appended claims, the invention may be practiced other than as specifically described herein.

We claim:

1. An eye contact teleconferencing terminal for allowing a first conferee to maintain eye contact with a second conferee imaged by the teleconferencing terminal, the teleconferencing terminal comprising:
   an image display with an image bearing surface;
   a semireflective transparent panel forming an angle of between about 30 and 70 degrees with the image display for viewing by the first conferee the image bearing surface through the semireflective transparent panel;
   a video camera disposed on a side of the semireflective transparent panel opposite the image display, the video camera capturing a reflection on the semireflective transparent panel of the first conferee who is disposed on a camera-side of the semireflective transparent panel;

an ambient light shield disposed on a side of the semireflective transparent panel opposite the camera, the camera aimed toward the shield through the semireflective panel to increase the reflectivity of the first conferee on the semireflective transparent panel; and a second display observed by the local conferee for collaborating data, the second display positioned between the local conferee and the semireflective transparent panel and positioned so as to not obstruct the first conferee from viewing the image bearing surface through the semireflective transparent panel.

2. An eye contact teleconferencing terminal for allowing a group of first conferees to maintain eye contact with a second conferee or group of second conferees imaged by the teleconferencing terminal, the teleconferencing terminal comprising:

an image display with an image bearing surface;

a semireflective transparent panel forming an angle of between about 30 and 70 degrees with the image display for viewing by the first conferee the image bearing surface through the semireflective transparent panel;

a plurality of video cameras disposed on a side of the semireflective transparent panel opposite the image display, the video cameras capturing a reflection on the semireflective transparent panel images of the first conferees who are disposed on a camera-side of the semireflective transparent panel; and a light absorbing camera contrast shield disposed on a side of the semireflective transparent panel opposite the cameras, the cameras aimed toward the shield through the semireflective panel to increase the reflectivity of the first conferee on the semireflective transparent panel.

3. An eye contact teleconferencing terminal for allowing a first conferee(s) to maintain eye contact with a group of second conferees imaged by the teleconferencing terminal, the teleconferencing terminal comprising:

a plurality of image displays with an image bearing surfaces;

a semireflective transparent panel forming an angle of between about 30 and 70 degrees with the image displays for viewing by the first conferee(s) the image bearing surfaces through the semireflective transparent panel;

a video camera disposed on a side of the semireflective transparent panel opposite the image displays, the video camera capturing a reflection on the semireflective transparent panel of the first conferee(s) who is/are disposed on a camera-side of the semireflective transparent panel; and an ambient light shield disposed on a side of the semireflective transparent panel opposite the camera, the camera aimed toward the shield through the semireflective panel to increase the reflectivity of the first conferee on the semireflective transparent panel.

4. An eye contact teleconferencing terminal for allowing a first conferee to maintain eye contact with a second conferee imaged by the teleconferencing terminal, the teleconferencing terminal comprising:

an image display with an image bearing surface;

a semireflective transparent panel forming an angle of between about 30 and 70 degrees with the image display for viewing by the first conferee the image bearing surface through the semireflective transparent panel; and a video camera disposed on a side of the semireflective transparent panel opposite the image display, the video camera capturing a reflection on the semireflective transparent panel of the first conferee who is disposed on a camera-side of the semireflective transparent panel;

an ambient light shield disposed on a side of the semireflective transparent panel opposite the camera, the camera aimed toward the shield through the semireflective panel to increase the reflectivity of the first conferee on the semireflective transparent panel; and a room environment viewable by the first conferee through the semireflective transparent panel in at least one of to the left, the right, the bottom, and the top of the image display.

5. The teleconferencing terminal of claim 4 wherein the image display is built integral to a surrounding housing.

* * * * *